(12) United States Patent
Vautrin et al.

(10) Patent No.: US 11,870,475 B2
(45) Date of Patent: Jan. 9, 2024

(54) AUDIO PLAYBACK MANAGEMENT OF MULTIPLE CONCURRENT CONNECTIONS

(71) Applicant: Sonos, Inc., Santa Barbara, CA (US)

(72) Inventors: Jodi Vautrin, Boston, MA (US); Matt Pandina, Boston, MA (US); Elizabeth Dolman, Boston, MA (US); Ken Hu, Boston, MA (US); Jason Yore, Santa Barbara, CA (US); Matthew Moore, Seattle, WA (US); Ted Lin, Cambridge, MA (US); Richard Bannon, Seattle, WA (US); Chris Babroski, Boston, MA (US); Robert Bermani, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/486,424

(22) Filed: Sep. 27, 2021

(65) Prior Publication Data

US 2022/0103941 A1 Mar. 31, 2022

Related U.S. Application Data

(60) Provisional application No. 63/084,796, filed on Sep. 29, 2020, provisional application No. 63/157,309, (Continued)

(51) Int. Cl.
*H04B 1/16* (2006.01)
*H04R 1/02* (2006.01)
(Continued)

(52) U.S. Cl.
CPC ....... *H04B 1/1646* (2013.01); *H04L 12/2834* (2013.01); *H04N 21/43615* (2013.01);
(Continued)

(58) Field of Classification Search
None
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| EP | 3142389 A1 | 3/2017 |

(Continued)

OTHER PUBLICATIONS

AudioTron Quick Start Guide, Version 1.0, Mar. 2001, 24 pages.
(Continued)

*Primary Examiner* — Paul W Huber
(74) *Attorney, Agent, or Firm* — Fortem IP LLP; Benjamin Urban

(57) ABSTRACT

Examples described herein relate to management of concurrent audio streams from different sources. Portable playback devices, such as wearable wireless headphones and earbuds, as well as portable battery-powered speakers, may include multiple network interfaces for connection to different types of networks, such as an 802.11-compatible network interface for connection to wireless local area networks (e.g., Wi-Fi® networks) and an 802.15-compatible network interface for connection to a mobile device via a personal area network (Bluetooth®). Via such connections, the playback devices may receive two or more concurrent streams. By managing these streams according to playback policies, the portable playback devices may play the user's intended audio without necessarily requiring user input to explicitly select among the concurrent streams.

20 Claims, 30 Drawing Sheets

Related U.S. Application Data filed on Mar. 5, 2021, provisional application No. 63/157,312, filed on Mar. 5, 2021.

(51) Int. Cl.

| | |
|---|---|
| *H04R 3/12* | (2006.01) |
| *H04L 12/28* | (2006.01) |
| *H04R 5/02* | (2006.01) |
| *H04N 21/436* | (2011.01) |
| *H04R 5/04* | (2006.01) |
| *H04R 25/00* | (2006.01) |
| *H04S 7/00* | (2006.01) |
| *H04R 5/033* | (2006.01) |

(52) U.S. Cl.
CPC .............. *H04R 1/028* (2013.01); *H04R 3/12* (2013.01); *H04R 5/02* (2013.01); *H04R 5/04* (2013.01); *H04R 25/407* (2013.01); *H04S 7/308* (2013.01); *H04L 2012/2849* (2013.01); *H04R 5/033* (2013.01); *H04R 2420/07* (2013.01)

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B2 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,275,307 B2* | 9/2012 | Doyle, III | H04R 5/04 455/3.06 |
| 8,483,853 B1 | 7/2013 | Lambourne | |
| 8,554,058 B2* | 10/2013 | Liu | H04N 5/76 386/293 |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2018/0020313 A1* | 1/2018 | Morishita | H04S 7/304 |
| 2019/0238981 A1* | 8/2019 | Harris | H04R 3/12 |
| 2020/0076939 A1 | 3/2020 | Lambourne et al. | |
| 2021/0334065 A1* | 10/2021 | Denis | G10L 25/51 |
| 2021/0376880 A1* | 12/2021 | Carrigan | H04R 1/1041 |
| 2022/0070584 A1* | 3/2022 | Christensen | H04S 7/30 |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Search Report and Written Opinion dated Jun. 1, 2022; International Application No. PCT/US2021/052591; 20 pages.

\* cited by examiner

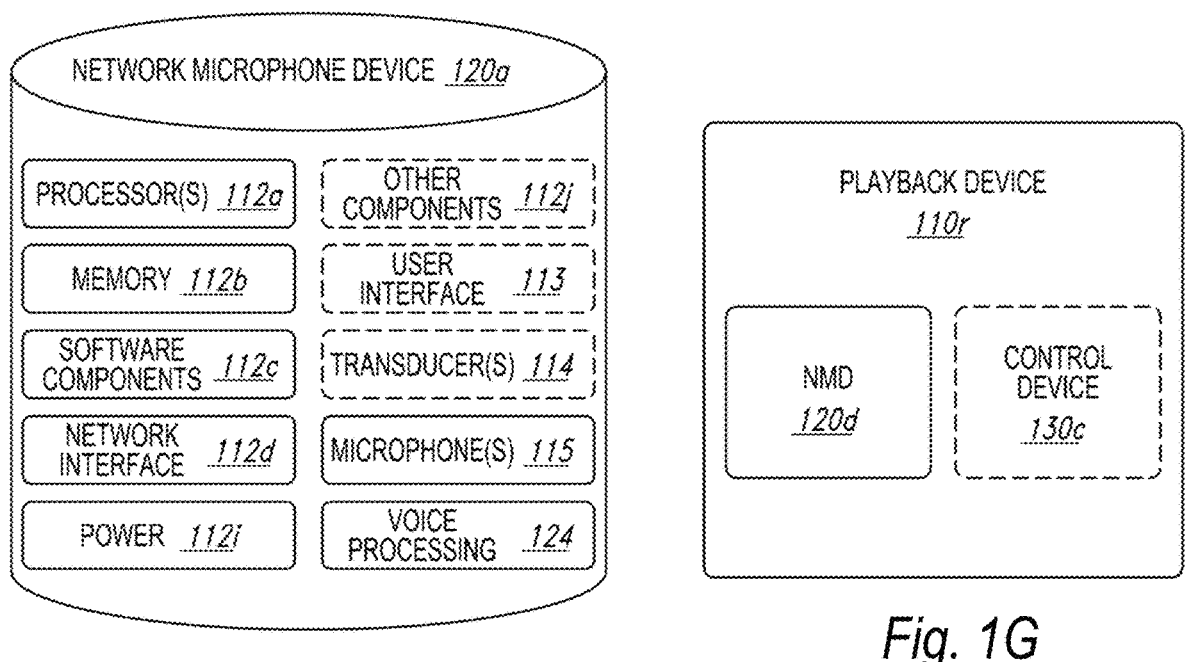
Fig. 1F
Fig. 1G
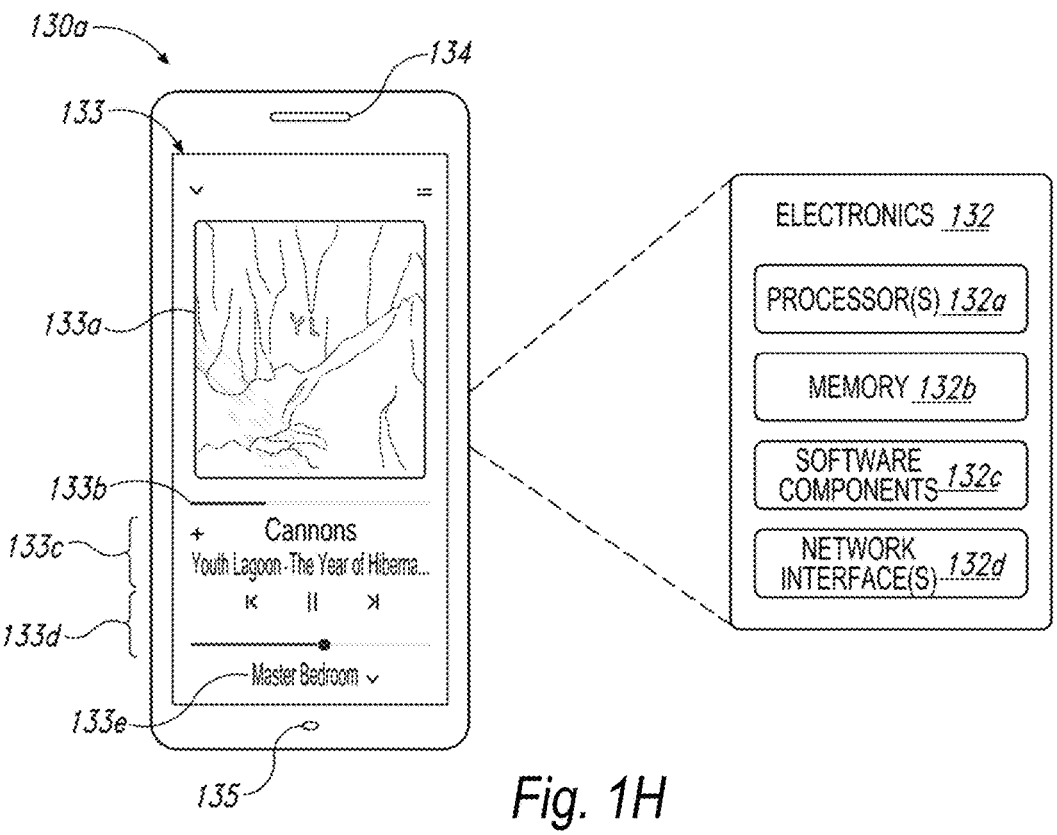
Fig. 1H

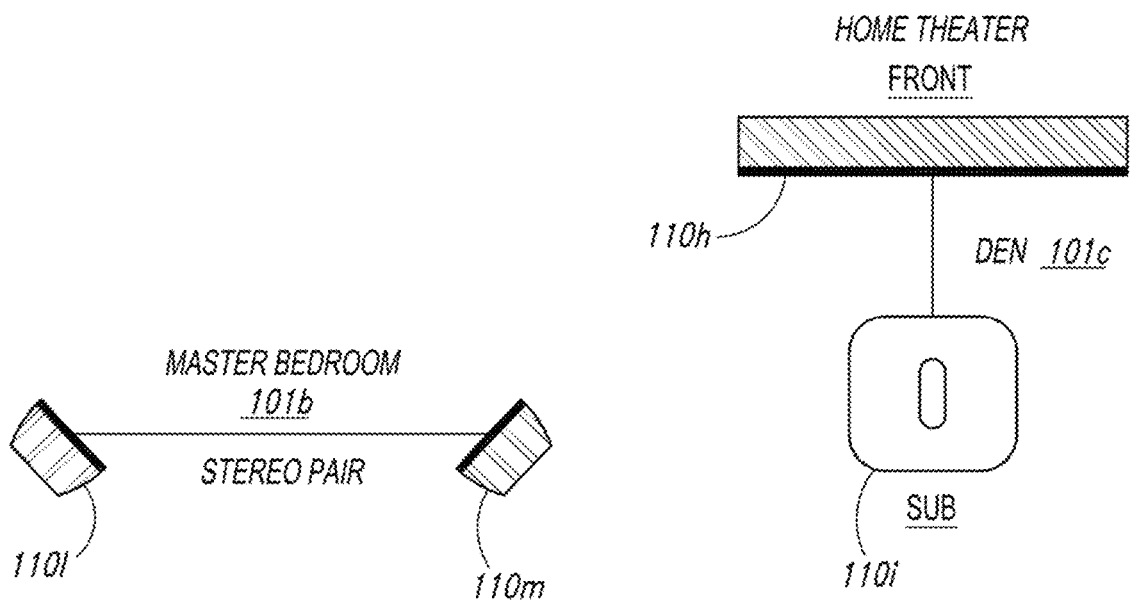
Fig. 1I
Fig. 1J
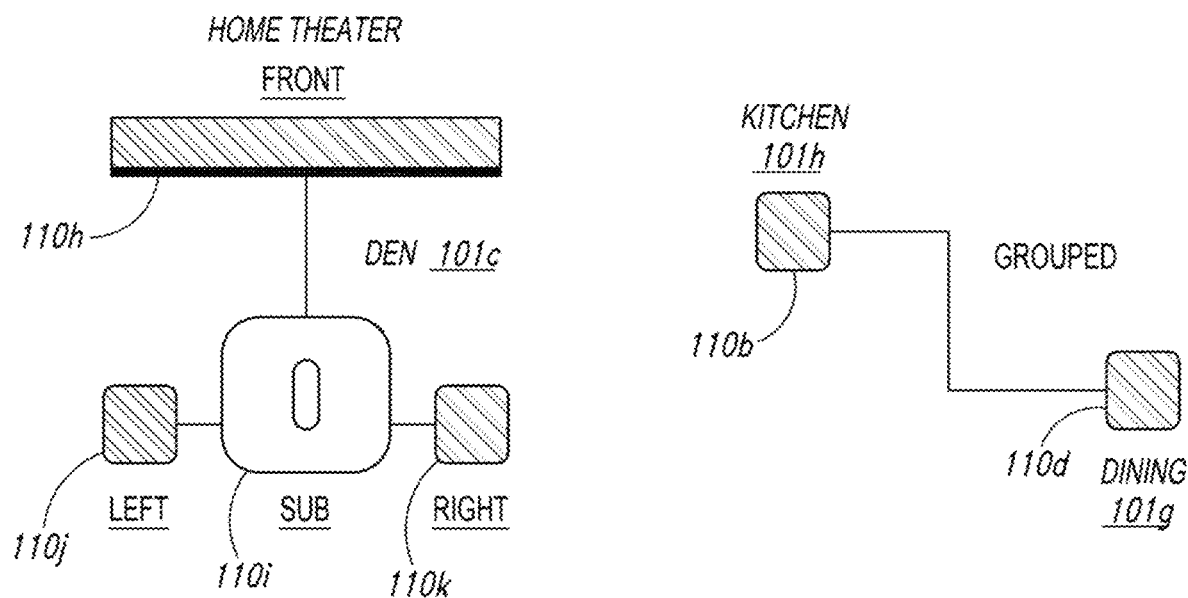
Fig. 1K
Fig. 1L

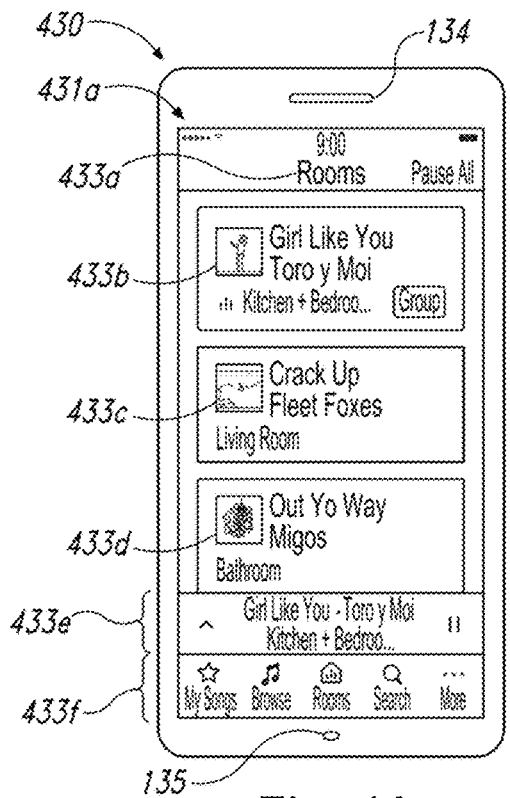
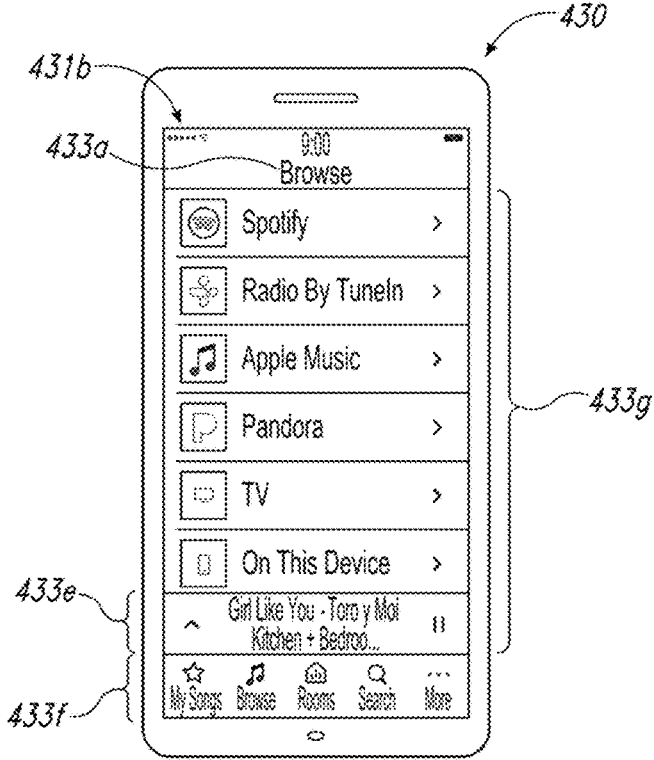
Fig. 4A
Fig. 4B
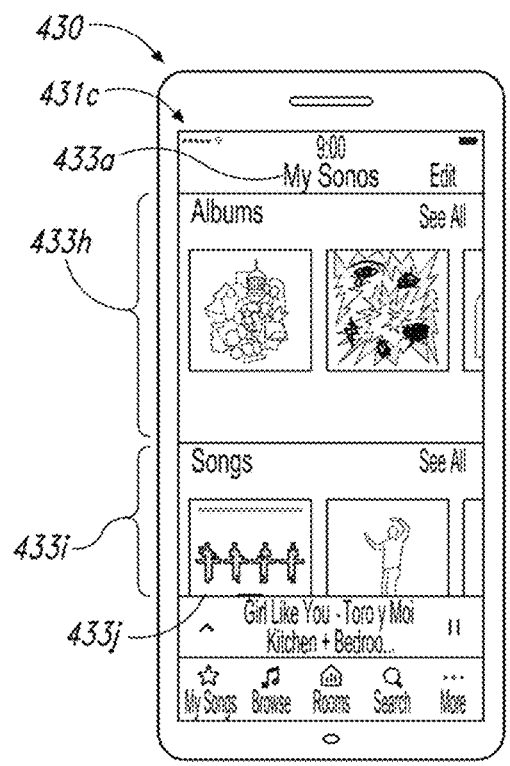
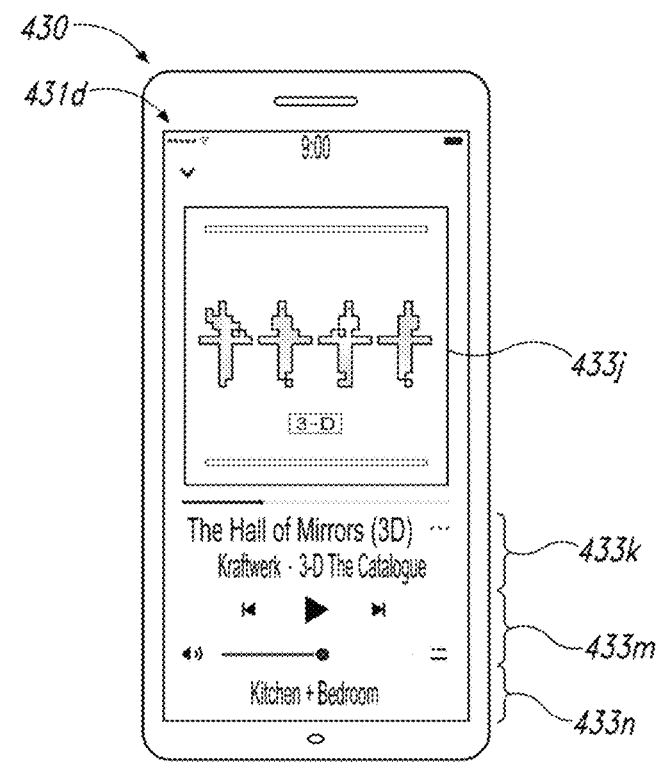
Fig. 4C
Fig. 4D

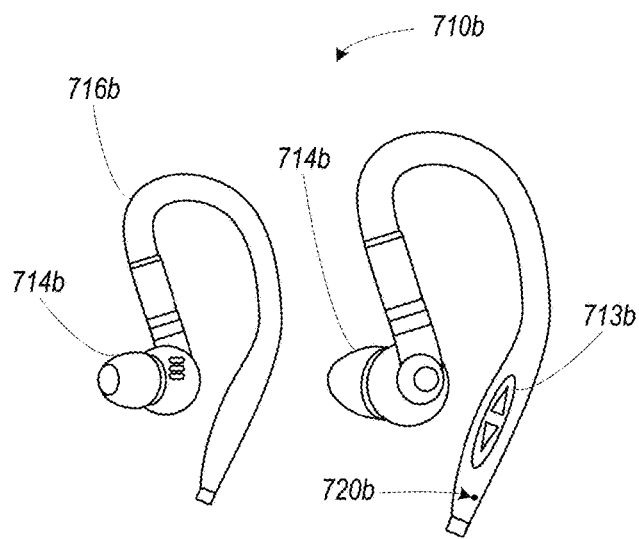
Fig. 7D
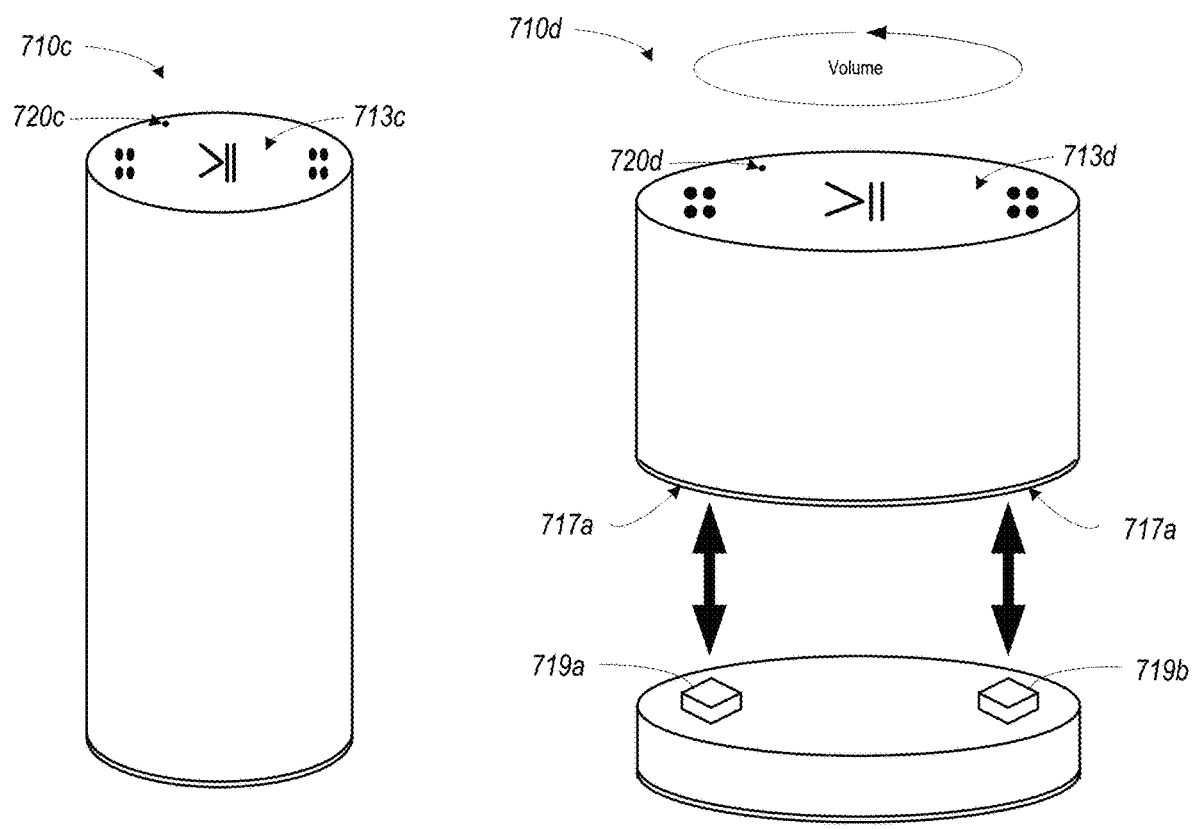
Fig. 7E
Fig. 7F

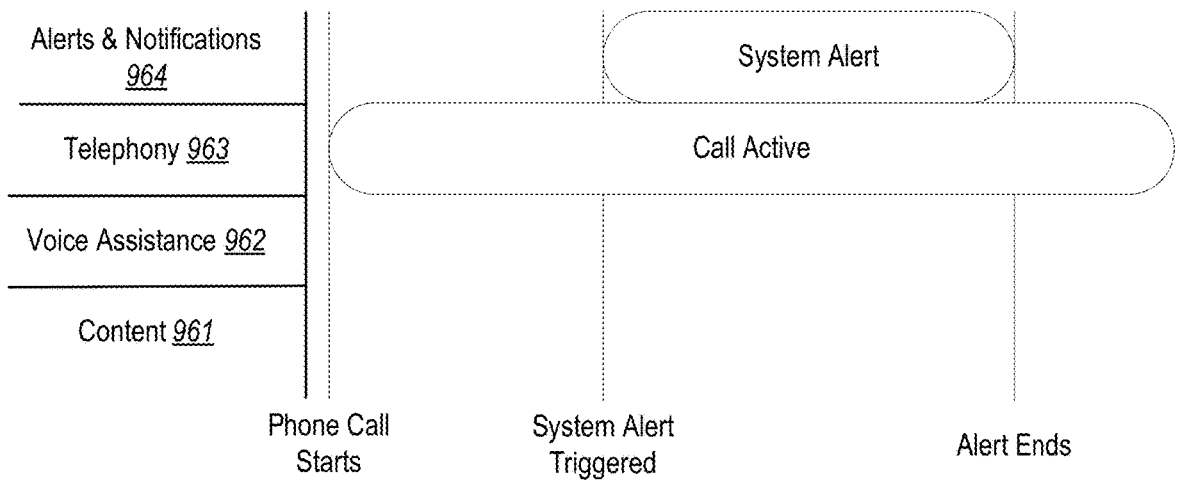
Fig. 9G
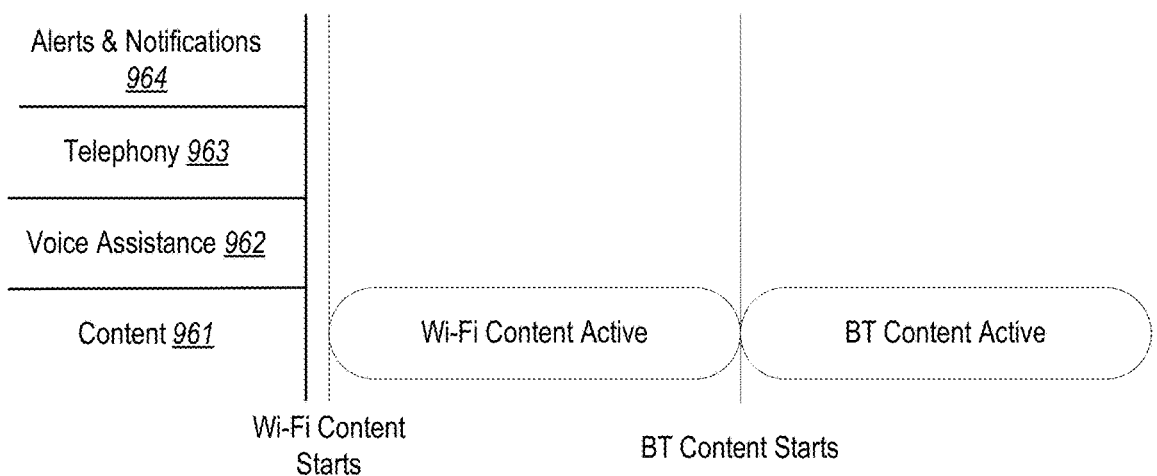
Fig. 9H
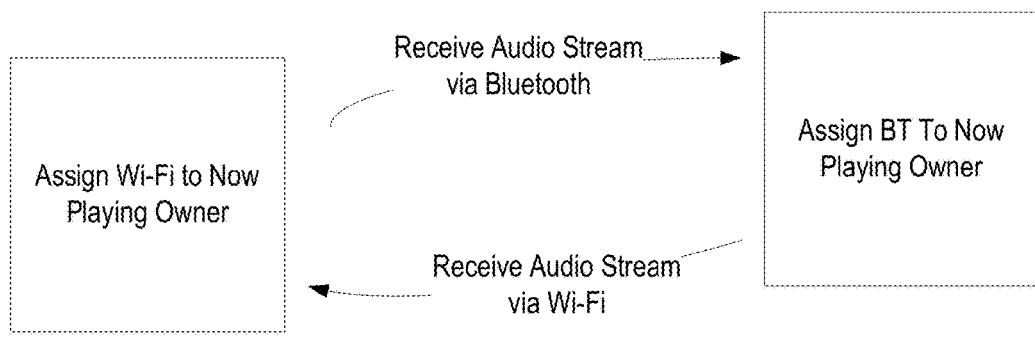
Fig. 9-I

AUDIO PLAYBACK MANAGEMENT OF MULTIPLE CONCURRENT CONNECTIONS

CROSS-REFERENCE TO RELATED APPLICATIONS

This application claims the benefit of U.S. provisional Patent Application No. 63/084,796, filed on Sep. 29, 2020, entitled "Concurrent Audio Playback Management," U.S. provisional Patent Application No. 63/157,309, filed on Mar. 5, 2021, entitled "Audio Playback Management of Multiple Concurrent Connections," and U.S. non-provisional Patent Application No. 63/157,312, filed on Mar. 5, 2021, entitled "Audio Playback Management of Multiple Concurrent Connections," each of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1-I, 1J, 1K, and 1L are schematic diagrams of corresponding media playback system zones.

FIGS. 4A, 4B, 4C, and 4D are schematic diagrams of a control device in various stages of operation in accordance with aspects of the disclosed technology.

FIG. 7D is a front isometric view of a portable playback device implemented as earbuds configured in accordance with aspects of the disclosed technology.

FIG. 7E is a front isometric view of an ultra-portable playback device configured in accordance with aspects of the disclosed technology.

FIG. 7F is a front isometric view of an ultra-portable playback device with a device base configured in accordance with aspects of the disclosed technology.

FIG. 9G is a diagram illustrating example management of audio streams in accordance with aspects of the disclosed technology.

FIG. 9H is a diagram illustrating example management of audio streams in accordance with aspects of the disclosed technology.

FIG. 9-I is a diagram illustrating example management of audio streams in accordance with aspects of the disclosed technology.

Figure 1A:
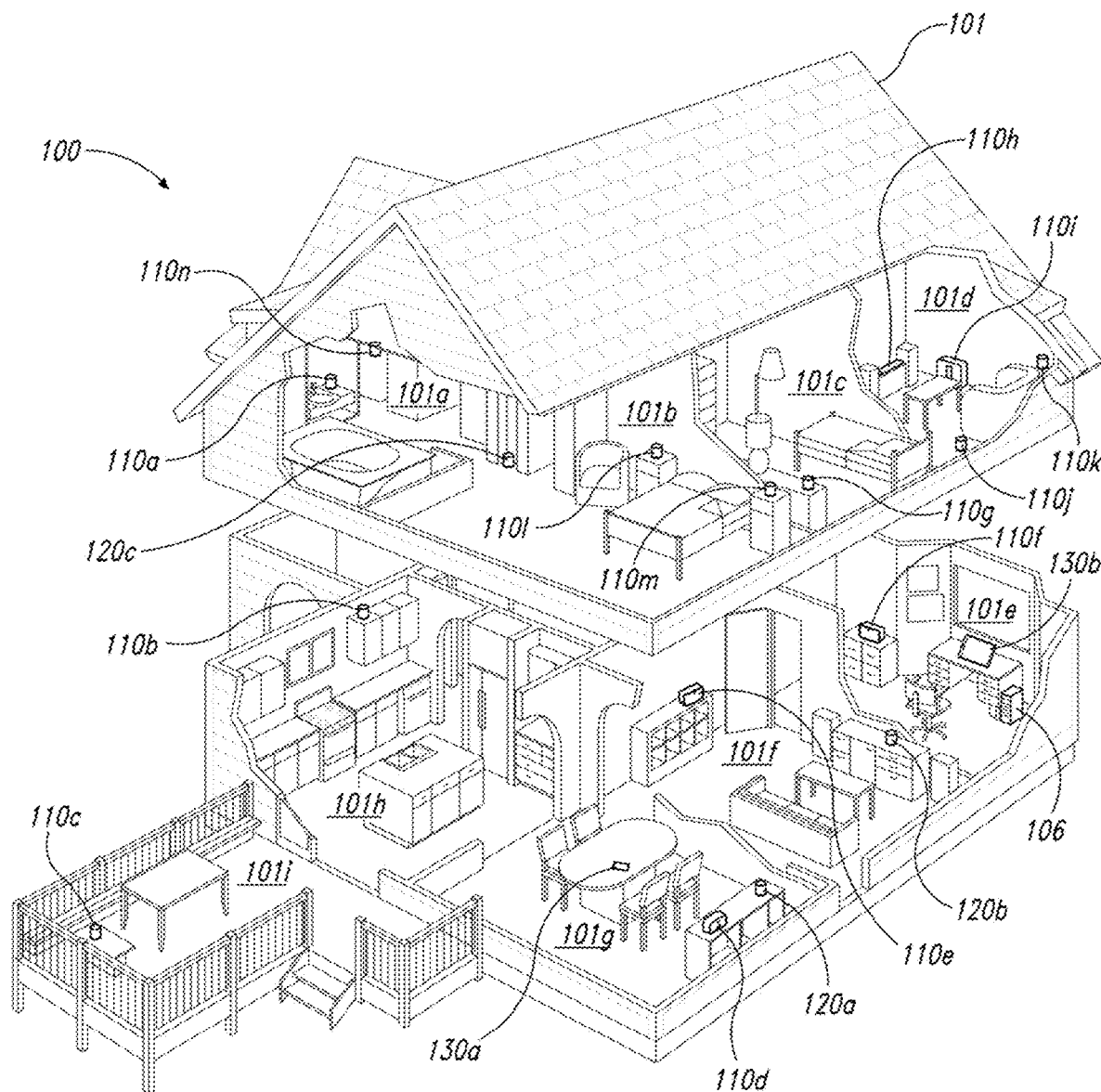
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Examples described herein relate to management of concurrent audio streams from different sources. Portable playback devices, such as wearable wireless headphones and earbuds, as well as portable battery-powered speakers, may include multiple network interfaces for connection to different types of networks, such as an 802.11-compatible network interface for connection to wireless local area networks (e.g., Wi-Fi® networks) and an 802.15-compatible network interface for connection to a mobile device via a personal area network (Bluetooth®). Depending on the networks available, a portable playback device may establish connections to a wireless local area network (WLAN), a personal area network (PAN), both, or neither. The portable playback device may use such connections for various features such as streaming audio content or interacting with voice assistant services.

In an example, a portable playback device may receive more than one audio stream. For instance, the portable playback device may receive a first audio stream via a Wi-Fi connection and a second audio stream via a Bluetooth connection. Moreover, example portable playback devices may receive audio streams including content, but also other types of audio such as alerts, notifications, telephony (e.g., phone calls), and voice assistant audio. Playing more than one of these audio streams concurrently may cause the streams to interfere, which may decrease user enjoyment or cause the user to miss certain audio. At the same time, requiring users to actively select audio streams may be cumbersome, especially on a wearable or portable playback device with limited space for a control interface.

To avoid such issues, example techniques relate to management of concurrent audio streams. Streams of different types may be categorized into categories based on content type (e.g., alerts and notifications, telephony, voice assistant audio, and content) and assigned respective priorities. Playback policies may be defined based on these respective priority levels and control how concurrent streams are managed.

In particular, example portable playback devices may use the relative priorities of categories to determine what audio signal(s) to play and/or how to play the audio signals when more than one audio signal is received concurrently according to playback policies. In some cases, per such policies, higher priority signals will stop (e.g., pause or silence) playback of lower priority signals so that the higher priority signals can be played (and heard) by listeners. Alternatively, in some cases, lower priority signals are ducked and played back concurrently with the higher priority content. Yet further, in some cases, later received lower priority signals may interrupt certain higher priority signals (e.g., one level higher) but not interrupt other higher priority signals (e.g., two or more levels higher).

Moreover, to manage concurrent audio streams including content (e.g., concurrent Wi-Fi and Bluetooth) streams, example portable playback devices may implement a "last-in wins" policy. That is, the last arriving audio stream to a portable playback device is assigned as a now playing owner, such that the content from that stream is played back by the portable playback device. For instance, if a Bluetooth audio stream interrupts a Wi-Fi audio stream, the Bluetooth audio stream becomes a "now playing" owner. Then, if another Wi-Fi audio stream (or an audio stream from another source altogether) interrupts the Bluetooth stream, that audio stream becomes the now playing owner. Such a policy may apply to concurrent audio streams including content, as well as additional or alternative categories of audio content.

One difficultly in implementing such a policy is that a Bluetooth connection generally forms an open, unidirectional audio stream. This stream does not necessarily include actual audio content. Instead, when no application (or the operating system) is playing back audio, the Bluetooth audio stream includes silence. As part of managing the now playing owner, example systems described herein my determine whether the Bluetooth connection includes content using silence/non-silence detection on the Bluetooth audio stream, as well as other information received in association with the stream (e.g., events according to a Bluetooth profile).

Other example techniques relate to management of playback commands. Example portable playback devices may be controlled in several different ways, such as via a physical, on-housing control interface, via Bluetooth from a paired mobile device, or over Wi-Fi from a control device. Management of playback commands may involve carrying out a command from any of these different controllers, as well as updating controllers of other types of any change in state caused by carrying out a playback command.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 includes one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 includes a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E, as well as FIGS. 1-I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones.

Example synchrony techniques involve a group coordinator providing audio content and timing information to one or more group members to facilitate synchronous playback among the group coordinator and the group members. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
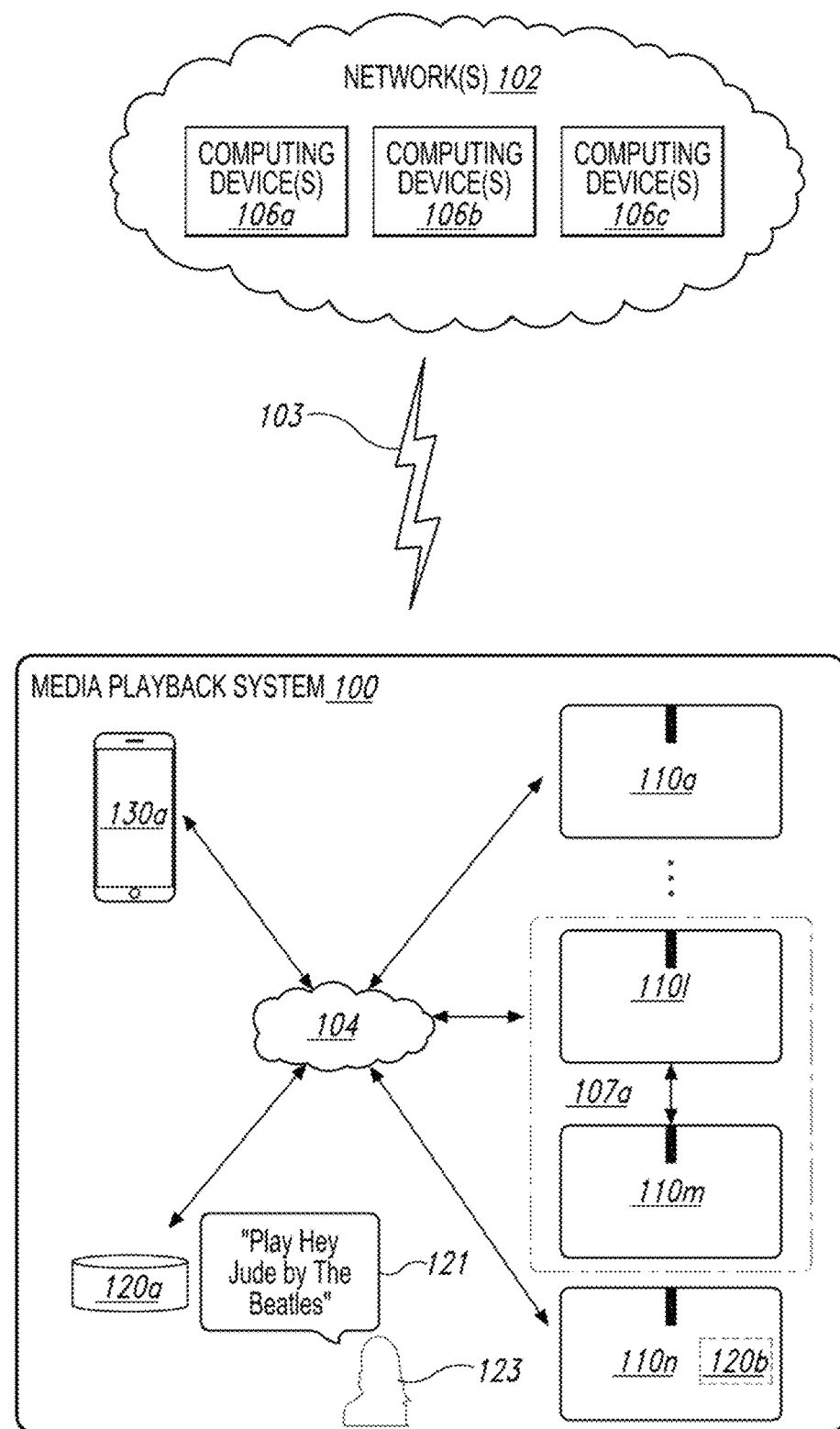
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 includes computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers.

Moreover, while the cloud network 102 is described above in the context of a single cloud network, in some embodiments the cloud network 102 includes a plurality of cloud networks comprising communicatively coupled computing devices. Furthermore, while the cloud network 102 is shown in FIG. 1B as having three of the computing devices 106, in some embodiments, the cloud network 102 includes fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 includes a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 includes an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* includes a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* includes one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
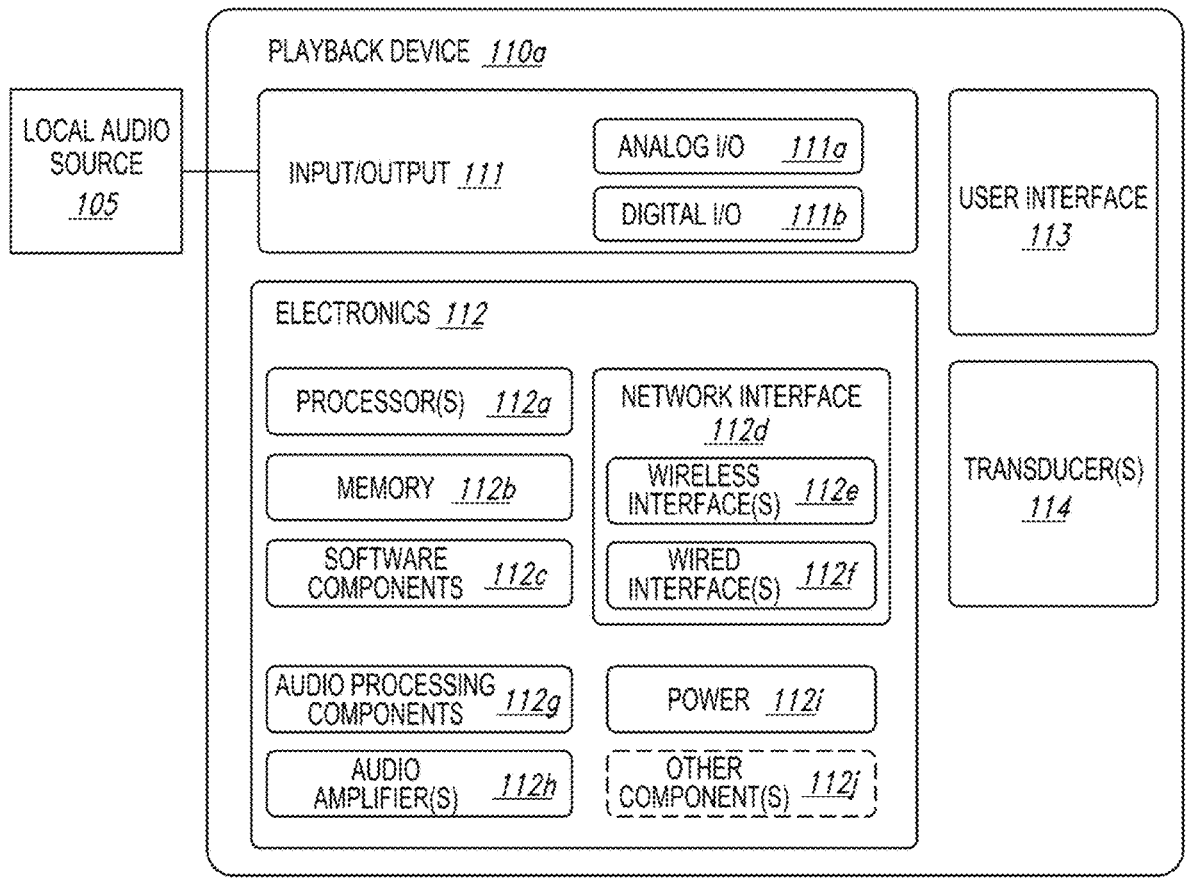
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* includes a Sony/Philips Digital Interface Format (S/PDIF) communication interface and/or cable and/or a Toshiba Link (TOSLINK) cable. In some embodiments, the digital I/O 111*b* includes an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further includes electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a*-*c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d includes one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
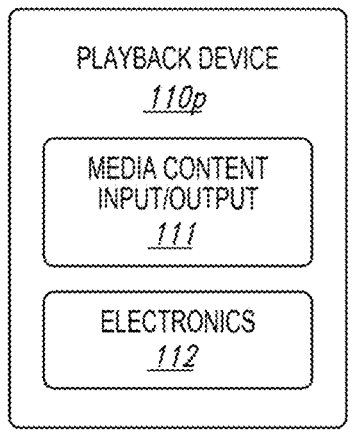
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 includes wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
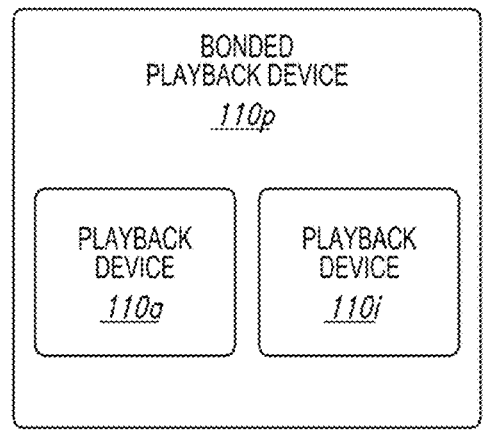
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q includes a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally includes other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a includes an Internet of Things (IoT) device such as, for example, a thermostat, alarm panel, fire and/or smoke detector, etc. In some embodiments, the NMD 120a includes the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a includes a smartphone (e.g., an iPhone™, an Android phone) on which media playback system controller application software is installed. In some embodiments, the control device 130a includes, for example, a tablet (e.g., an iPad™), a computer (e.g., a laptop computer, a desktop computer), and/or another suitable device (e.g., a television, an automobile audio head unit, an IoT device). In certain embodiments, the control device 130a includes a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 includes a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
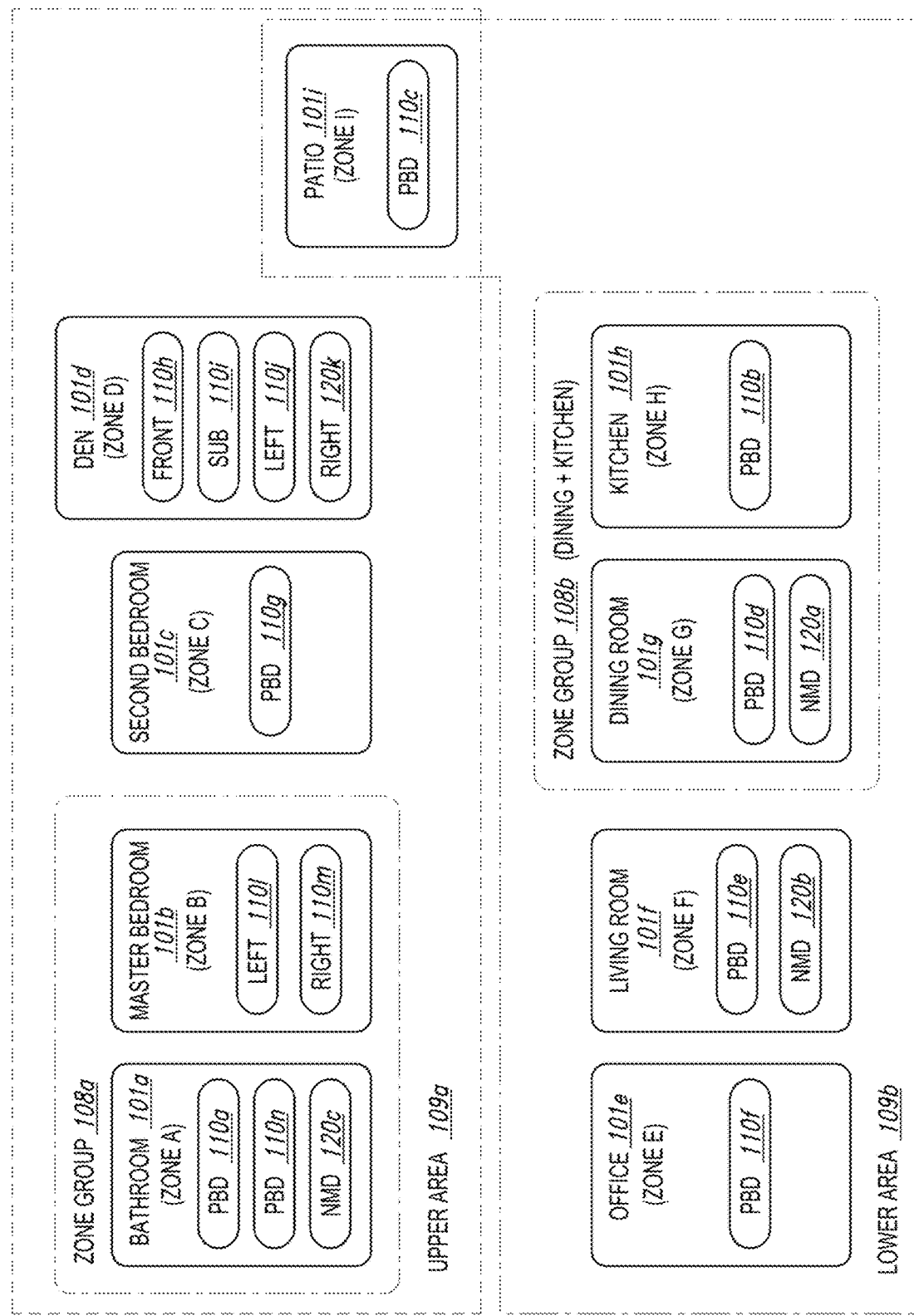
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 might not implement Areas, in which case the system may not store variables associated with Areas.

In further examples, the playback devices 110 of the media playback system 100 are named and arranged according to a control hierarchy referred to as home graph. Under the home graph hierarchy, the base unit of the home graph hierarchy is a "Set." A "Set" refers to an individual device or multiple devices that operate together in performing a given function, such as an individual playback device 110 or a bonded zone of playback devices. After Sets, the next level of the hierarchy is a "Room." Under the home graph hierarchy, a "Room" can be considered a container for Sets in a given room of a home. For example, an example Room might correspond to the kitchen of a home, and be assigned the name "Kitchen" and include one or more Sets (e.g. "Kitchen Island"). The next level of the example home graph hierarchy is "Area," which includes two or more Rooms (e.g., "Upstairs" or "Downstairs"). The highest level of the home graph hierarchy is "Home." A Home refers to the entire home, and all of the Sets within. Each level of the home graph hierarchy is assigned a human-readable name, which facilities control via GUI and VUI. Additional details regarding the home graph control hierarchy can be found, for example, in U.S. patent application Ser. No. 16/216,357 entitled, "Home Graph," which is incorporated herein by reference in its entirety.

III. Example Systems and Devices

Figure 2A:
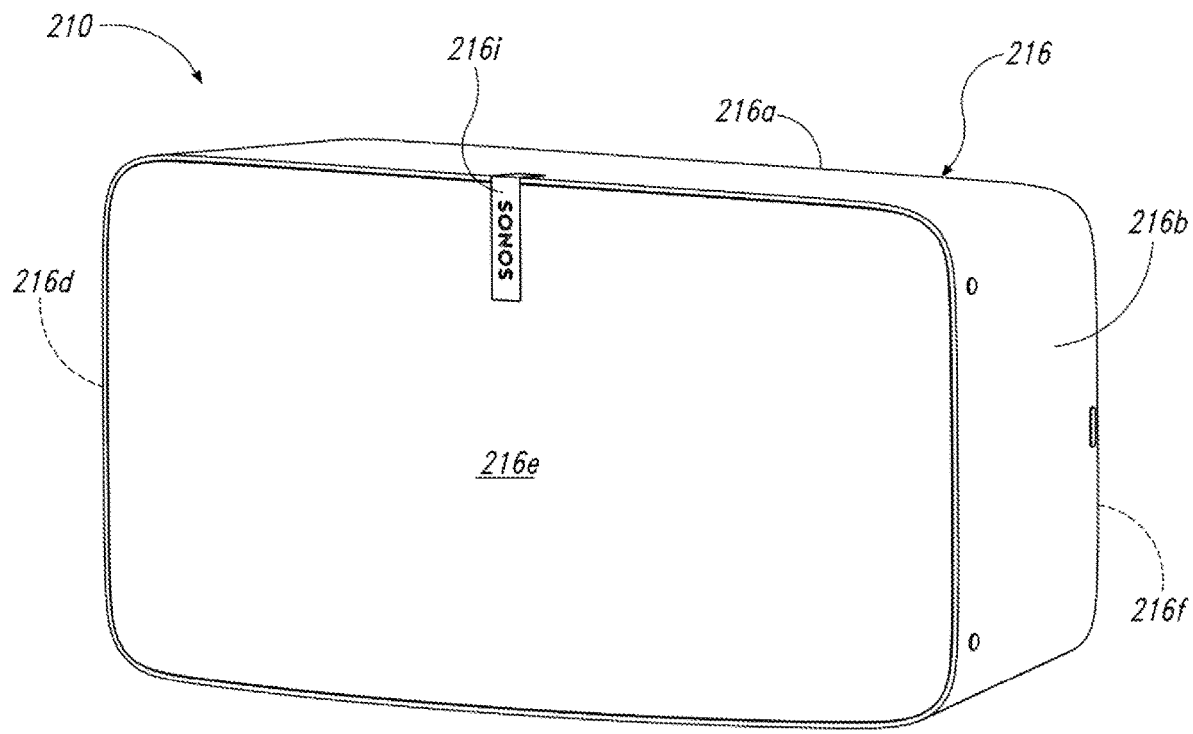
FIG. 2A is a front isometric view of a playback device configured in accordance with aspects of the disclosed technology.
Figure 2B:
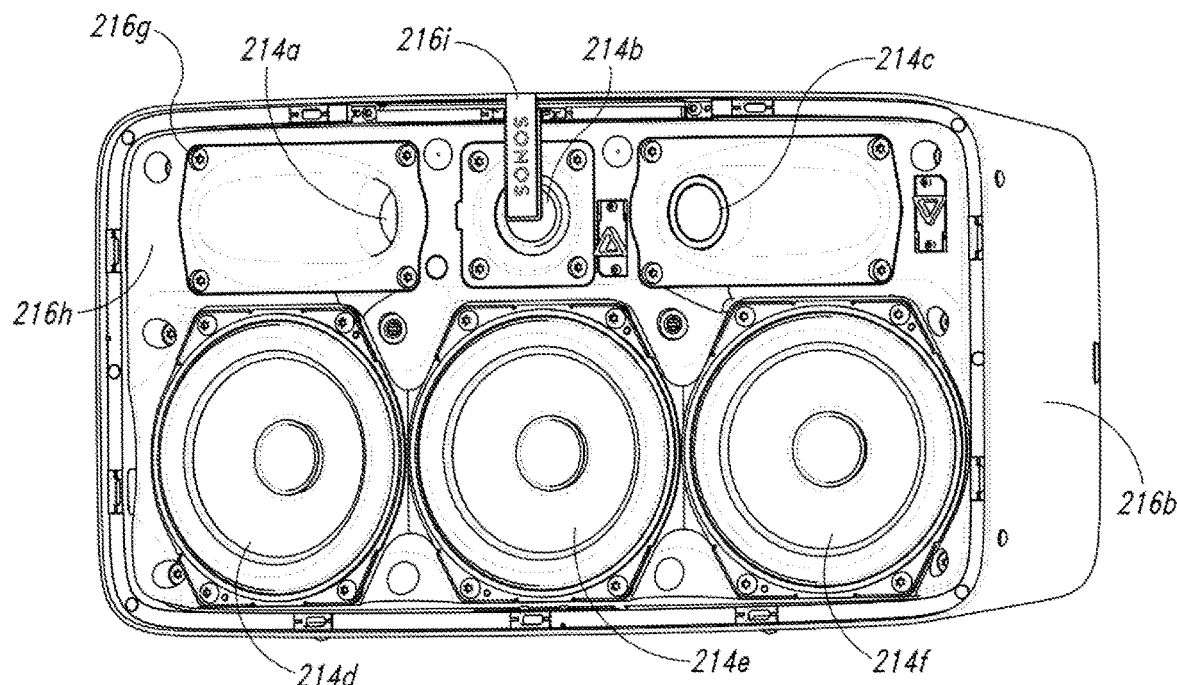
FIG. 2B is a front isometric view of the playback device of FIG. 3A without a grille.
Figure 2C:
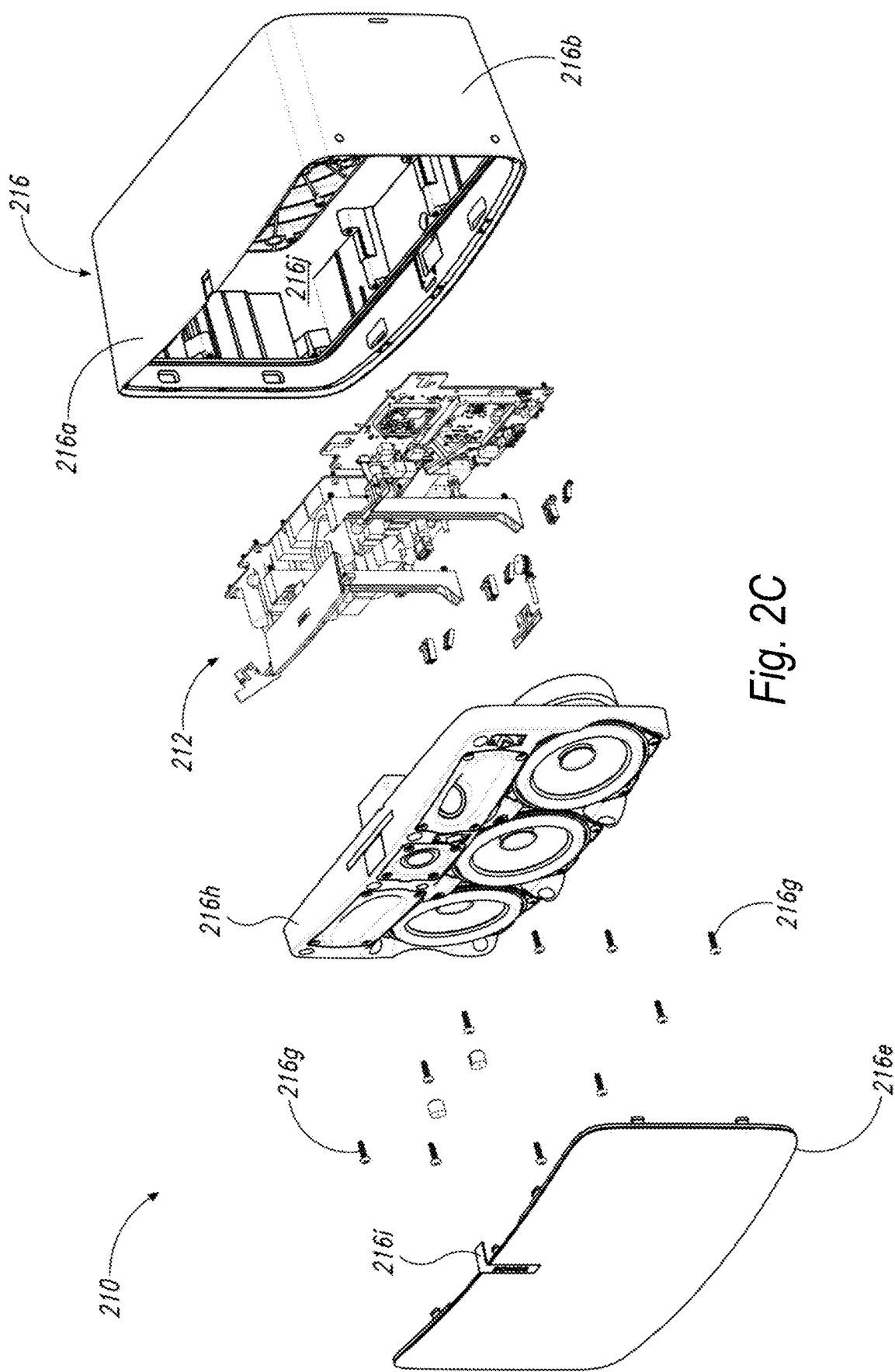
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 includes a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
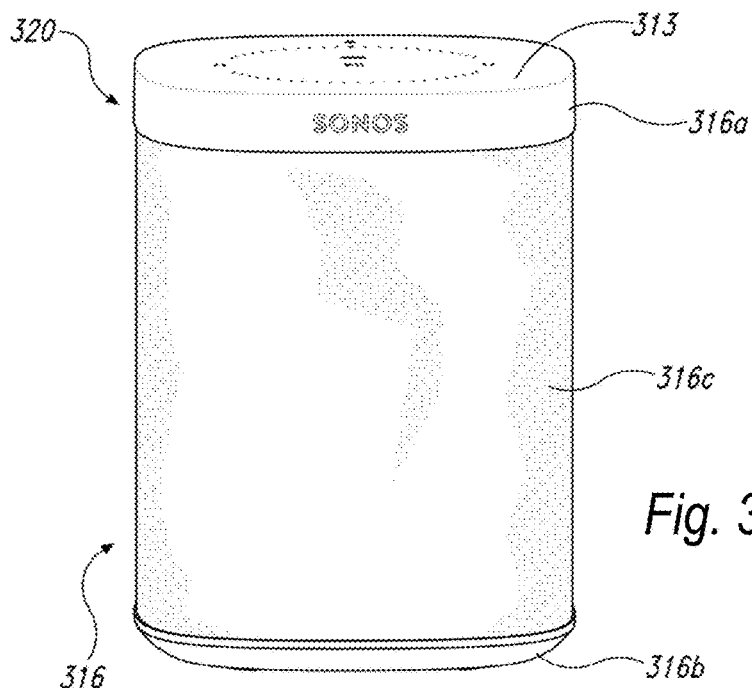
FIG. 3A is a front view of a network microphone device configured in accordance with aspects of the disclosed technology.
Figure 3B:
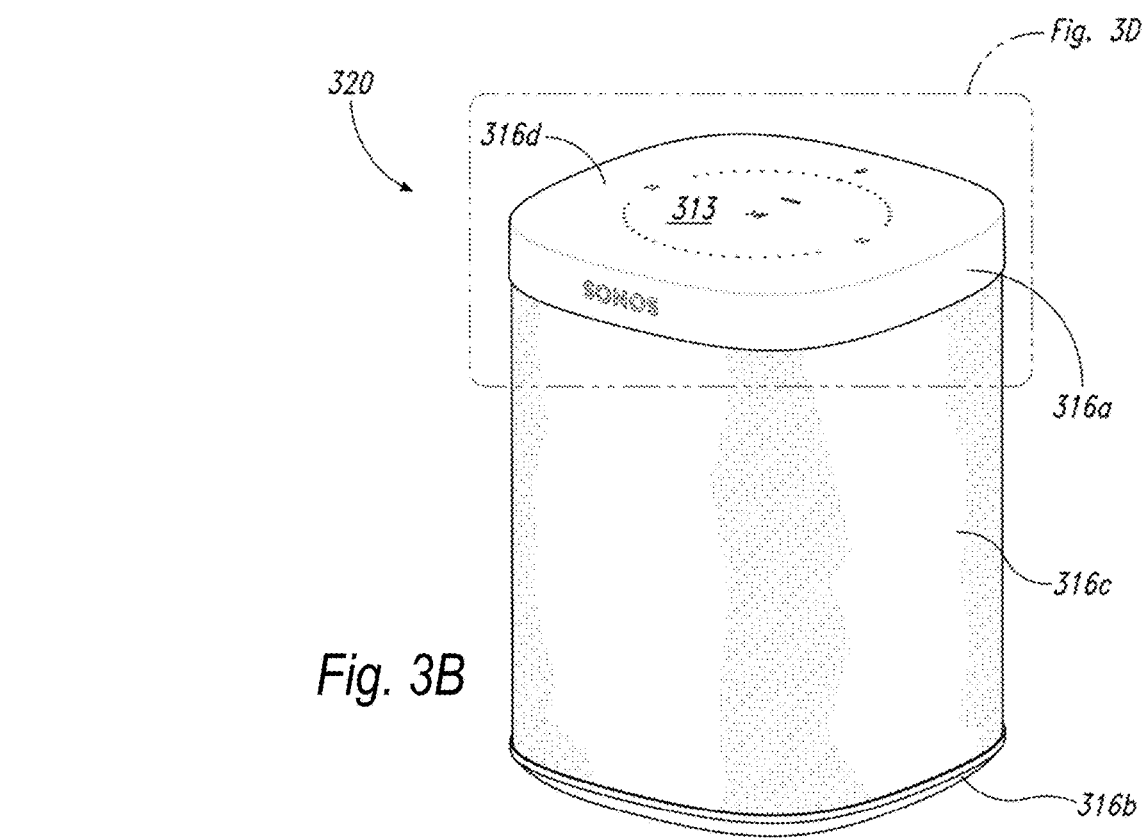
FIG. 3B is a side isometric view of the network microphone device of FIG. 3A.
Figure 3C:
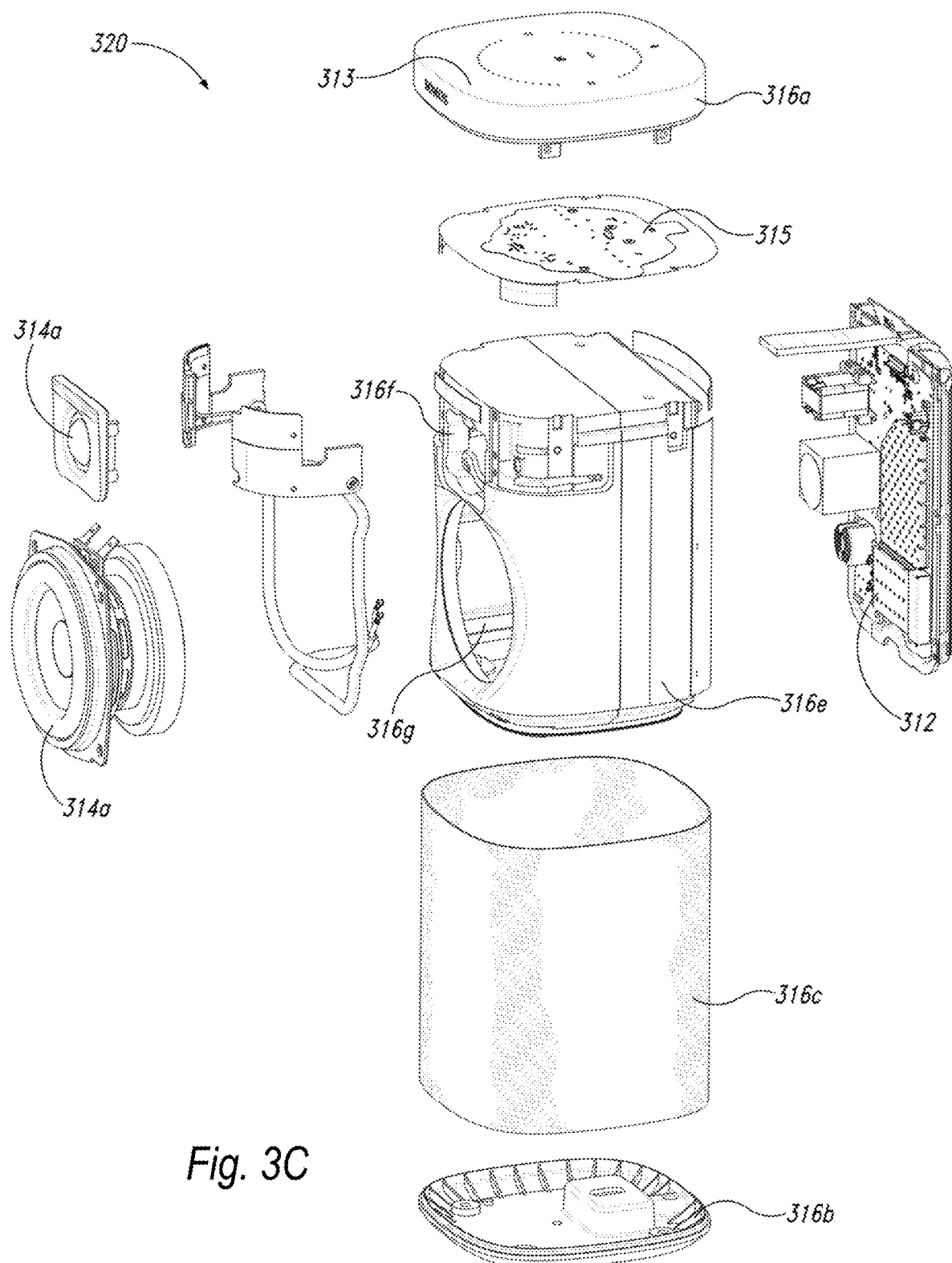
FIG. 3C is an exploded view of the network microphone device of FIGS. 3A and 3B.
Figure 3D:
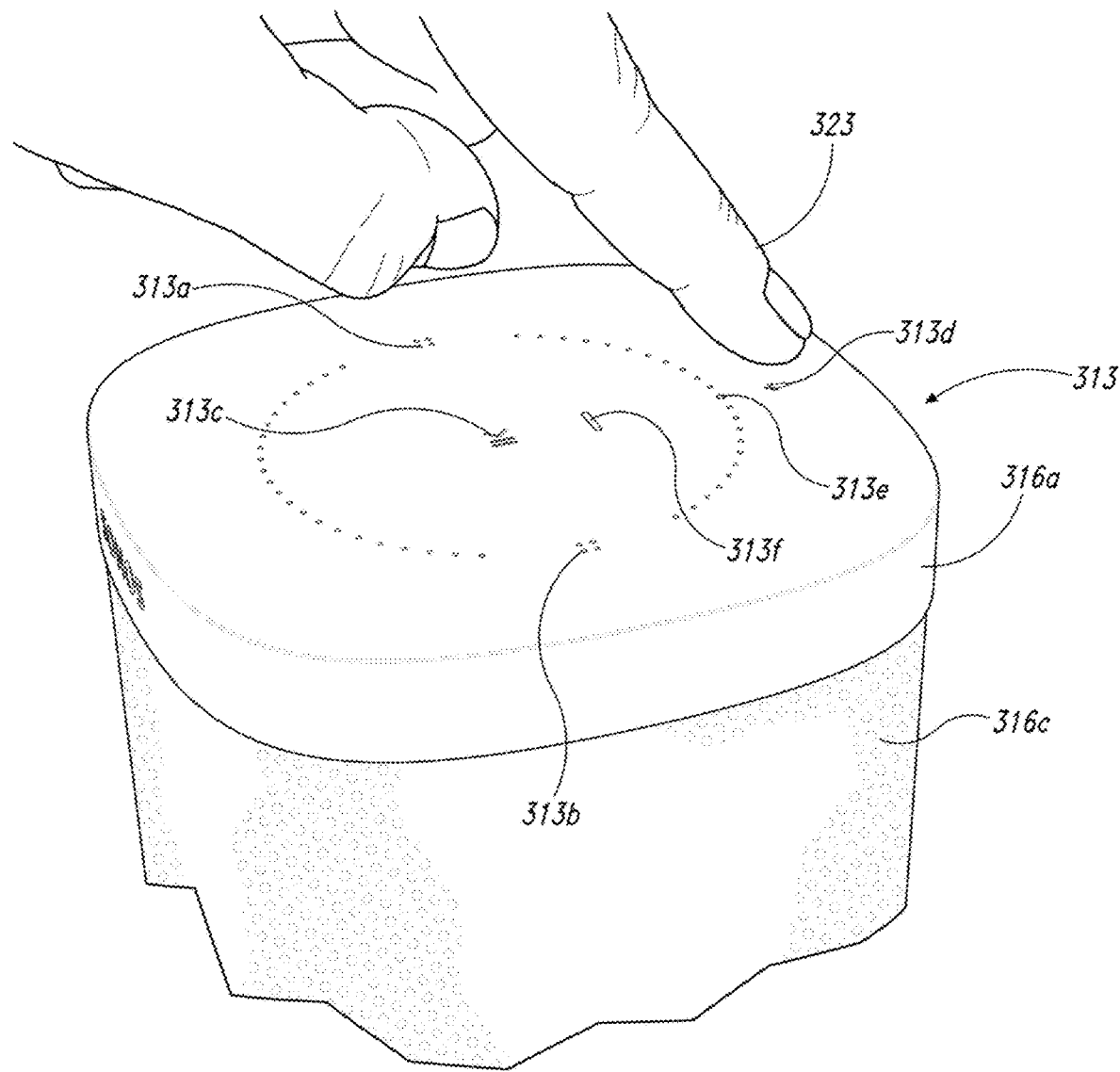
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
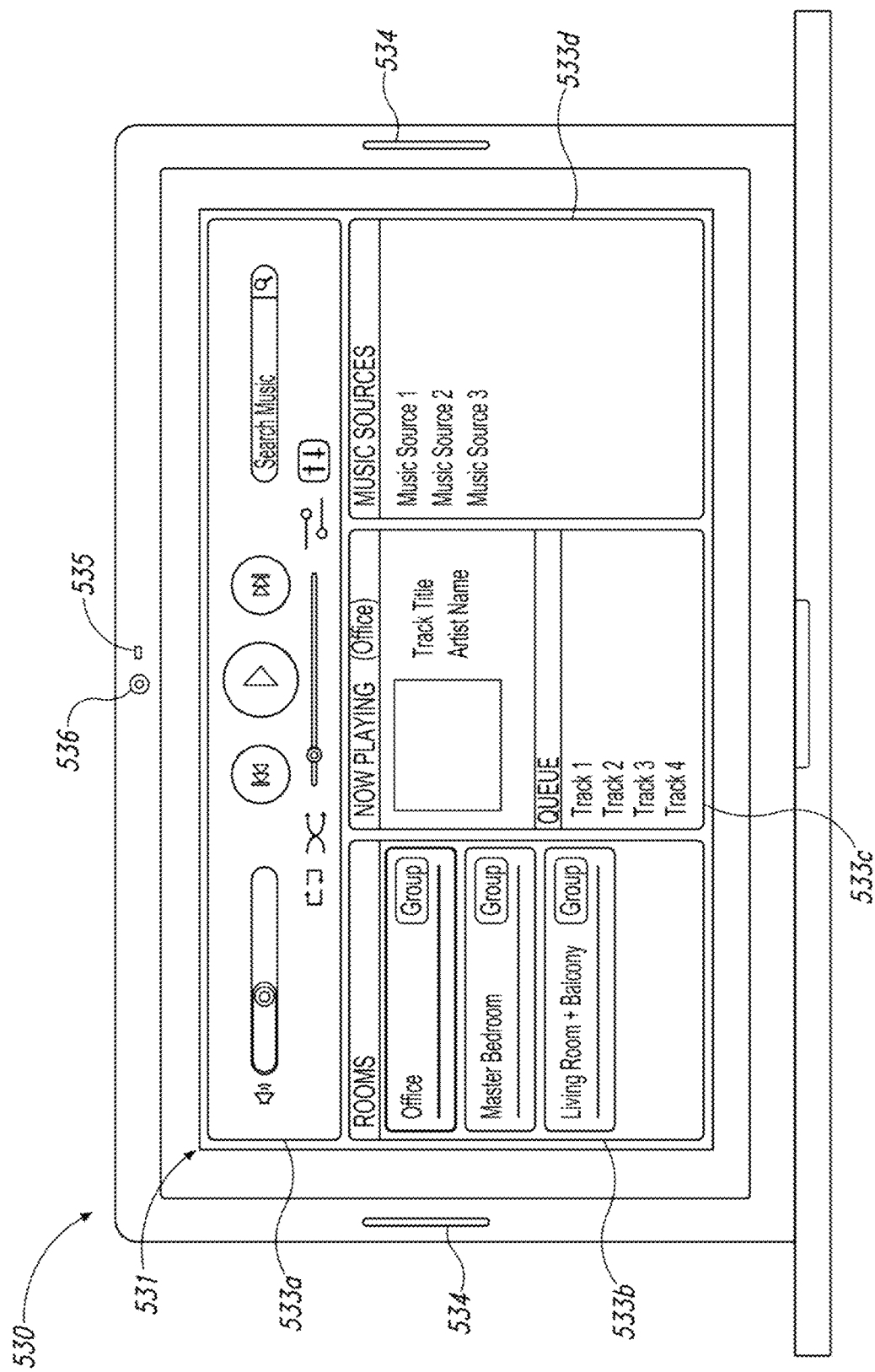
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region includes one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
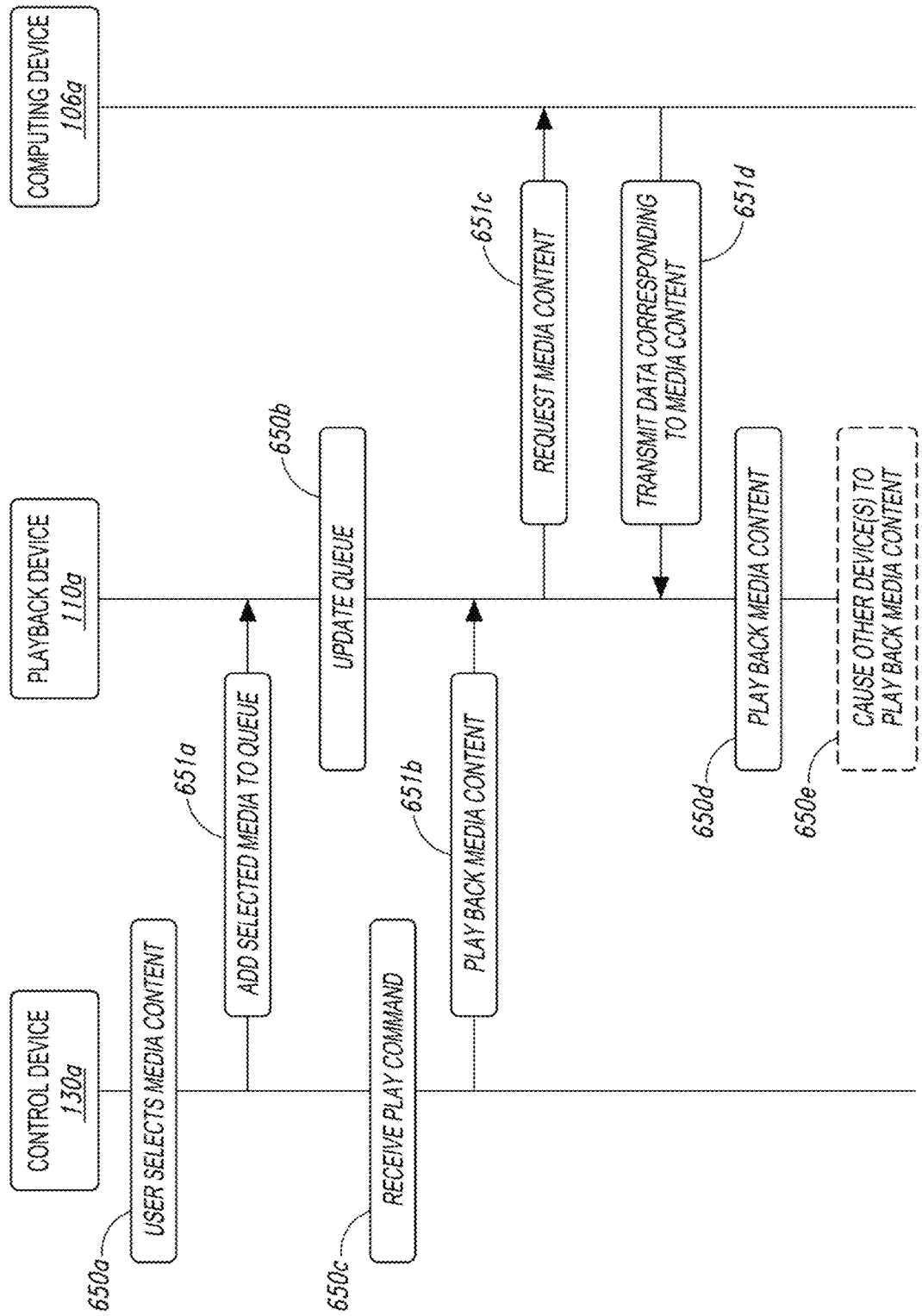
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

III. Example Portable Playback Devices

As noted above, certain playback device implementations may be configured for portable use. These portable playback devices include wearable playback devices such as headphones and earbuds. The portable playback devices can also include playback devices that include transducers to facilitate out-loud audio playback, also referred to herein as a portable speaker or an ultra-portable playback device.

Figure 7A:
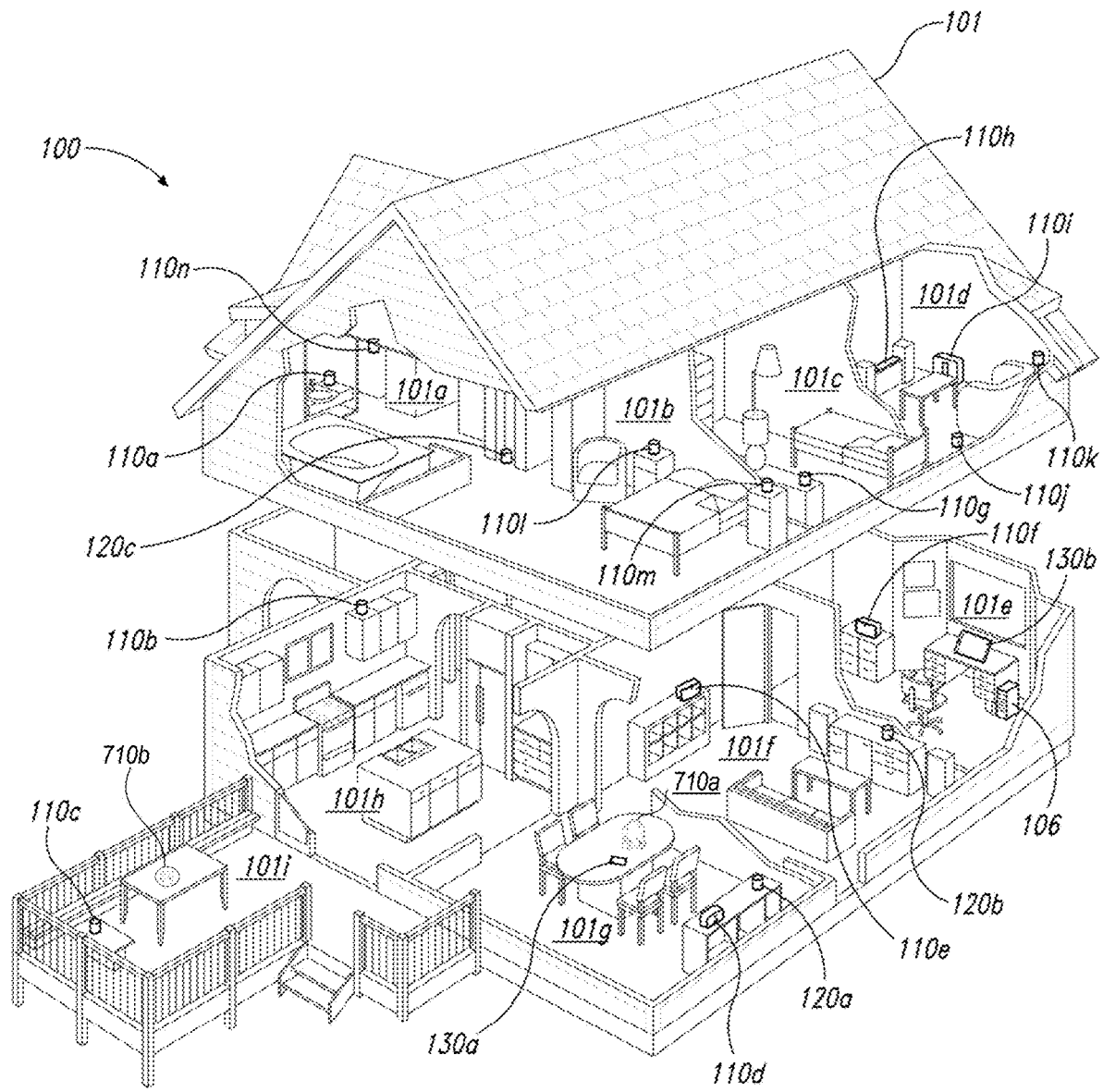
FIG. 7A is a partial cutaway view of an environment having a media playback system configured in accordance with aspects of the disclosed technology.

FIG. 7A is a partial cutaway view of the media playback system 100 with the inclusion of one or more portable playback devices 710 (identified individually as headphones 710a and earbuds 710b). The portable playback devices 710 are similar to the playback devices 110, but are configured for portable use. While they are shown in the home in FIG. 7A, the portable playback devices 710 are configured to play back audio content while in the home and while "on the go." Since the portable playback devices 710 are a specialized type of the playback devices 110, in general, description of the playback devices 110 is intended to apply to the portable playback devices 710 as well.

Figure 7B:
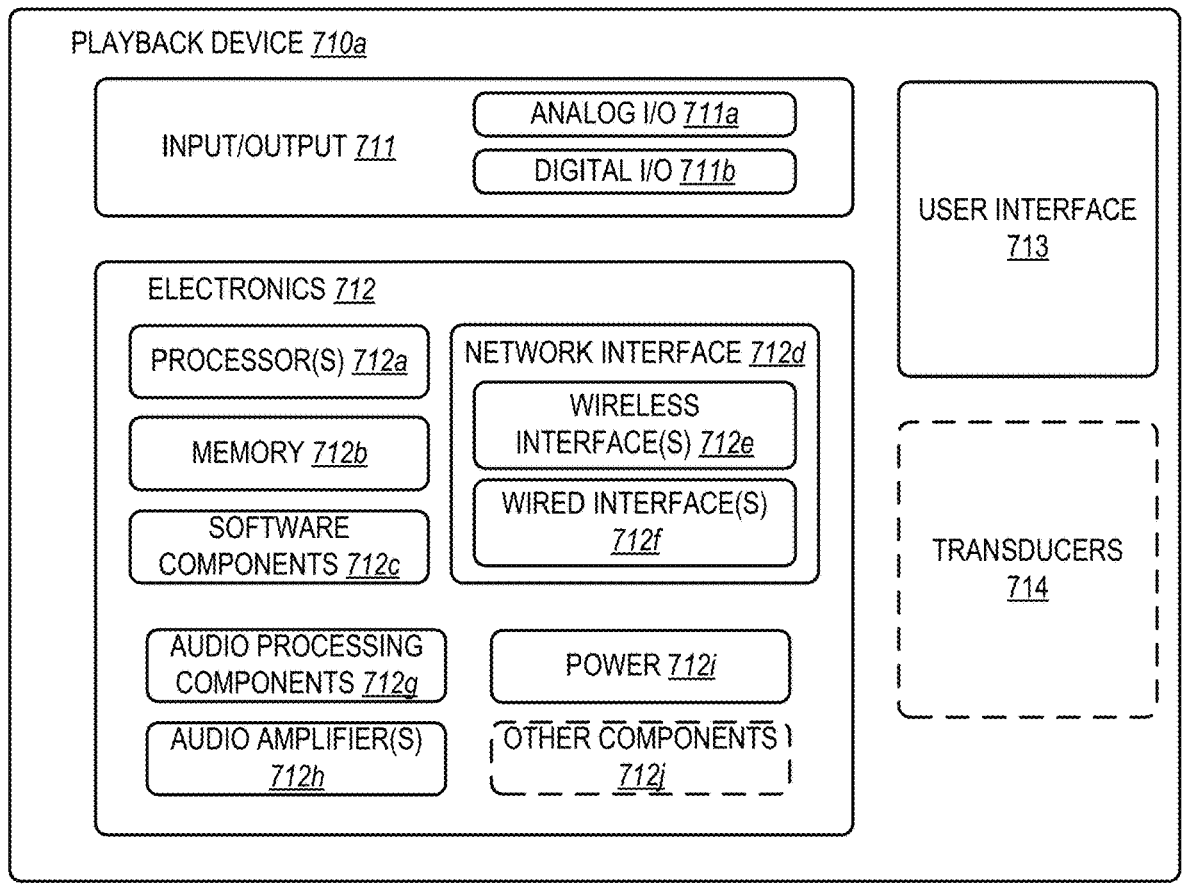
FIG. 7B is a block diagram of a portable playback device configured in accordance with aspects of the disclosed technology.

As shown in the block diagram of FIG. 7B, the headphones 710a include the same or similar components as the playback device 110a. However, to facilitate wearable use, the headphones 710a are implemented in a certain form factor and include one or more batteries in power 712i to provide portable power. The block diagram of FIG. 7B is representative of components included in various types of portable playback devices, including earbuds and portable speakers, as discussed in further detail below.

Referring to FIG. 7B, the headphones 710a include an input/output 711, which can include an analog I/O 711a and/or a digital I/O 711b similar to the components of the playback device 110. The headphones 710a further include electronics 712, a user interface 713 (e.g., one or more buttons, knobs, dials, touch-sensitive surfaces, displays, touchscreens), and one or more transducers 714 (referred to hereinafter as "the transducers 714"). The electronics 712 are configured to receive audio from an audio source via the input/output 711 or one or more of the computing devices 106a-c via the network 104 (FIG. 1B)), amplify the received audio, and output the amplified audio for playback via one or more of the transducers 714.

The headphones 710a further include one or more microphones 715 (e.g., a single microphone, a plurality of microphones, a microphone array) (hereinafter referred to as "the microphones 715"). In certain embodiments, for example, the portable playback devices 710 having one or more of the microphones 715 can operate as an NMD configured to receive voice input from a user and correspondingly perform one or more operations based on the received voice input.

In the illustrated embodiment of FIG. 7B, the electronics 712 include one or more processors 712a (referred to hereinafter as "the processors 112a"), memory 712b, software components 712c, a network interface 712d, one or more audio processing components 712g (referred to hereinafter as "the audio components 712g"), one or more audio amplifiers 712h (referred to hereinafter as "the amplifiers 712h"), and power 712i (e.g., one or more power supplies, power cables, power receptacles, batteries, induction coils, Power-over Ethernet (POE) interfaces, and/or other suitable sources of electric power). In some embodiments, the electronics 712 optionally include one or more other components 712j (e.g., one or more sensors, video displays, touchscreens).

The network interface 712d is configured to facilitate a transmission of data between the headphones 710a and one or more other devices on a data network such as, for example, the links 103 and/or the network 104 (FIG. 1B). The network interface 712d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 712d can parse the digital packet data such that the electronics 712 properly receives and processes the data destined for the playback device 110a.

In the illustrated embodiment of FIG. 7B, the network interface 712d includes one or more wireless interfaces 712e (referred to hereinafter as "the wireless interface 712e"). The wireless interface 712e (e.g., a suitable interface comprising one or more antennae) can be configured to wirelessly communicate with one or more other devices (e.g., one or more of the playback devices 110, NMDs 120, control devices 130, other portable playback devices 710, as well as other devices disclosed herein, such as bridge devices) that are communicatively coupled to the network 104 (FIG. 1B) in accordance with a suitable wireless communication protocol (e.g., Wi-Fi®, Bluetooth®, LTE).

In particular examples, the portable playback device 710a includes two or more wireless interfaces 712e to facilitate alternative or concurrent connections to multiple types of networks. For instance, the portable playback device 710a may include an 802.11-compatible (Wi-Fi®) network interface to facilitate connection to a wireless local area network (e.g., the network 104 (FIG. 1B), an 802.15-compatible (Bluetooth®) network interface to facilitate connection to a personal area network, and/or a cellular modem (to facilitate a connection to a cellular network, such as a 3G, 4G or 5G cellular network among other examples).

In some embodiments, the network interface 712d optionally includes a wired interface 712f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In some instances, the portable playback device 710a may use this wired interface 712f to facilitate power delivery and charging in addition to or as an alternative to data. In some embodiments, the electronics 712 excludes the network interface 712d altogether and transmits and receives media content and/or other data via another communication path (e.g., the input/output 711).

The audio components 712g are configured to process and/or filter data comprising media content received by the electronics 712 (e.g., via the input/output 711 and/or the network interface 712d) to produce output audio signals. In some embodiments, the audio processing components 712g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 712g can comprise one or more subcomponents of the processors 712*a*. In some embodiments, the electronics 712 omits the audio processing components 712*g*. In some aspects, for example, the processors 712*a* execute instructions stored on the memory 712*b* to perform audio processing operations to produce the output audio signals.

The amplifiers 712*h* are configured to receive and amplify the audio output signals produced by the audio processing components 712*g* and/or the processors 712*a*. The amplifiers 7712*h* can comprise electronic devices and/or components configured to amplify audio signals to levels sufficient for driving one or more of the transducers 714. In some embodiments, for example, the amplifiers 712*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 712*h* comprise a suitable combination of two or more of the foregoing types of power amplifiers. Moreover, in some embodiments, individual ones of the amplifiers 712*h* correspond to individual ones of the transducers 714. In other embodiments, however, the electronics 712 includes a single one of the amplifiers 712*h* configured to output amplified audio signals to a plurality of the transducers 714.

The transducers 714 (e.g., one or more speakers and/or speaker drivers) receive the amplified audio signals from the amplifier 712*h* and render or output the amplified audio signals as sound (e.g., audible sound waves having a frequency between about 20 Hertz (Hz) and 20 kilohertz (kHz)). In some embodiments, the transducers 714 can comprise a single transducer. In other embodiments, however, the transducers 714 comprise a plurality of audio transducers. In some embodiments, the transducers 714 comprise more than one type of transducer. For example, the transducers 714 can include one or more low frequency transducers (e.g., subwoofers, woofers), mid-range frequency transducers (e.g., mid-range transducers, mid-woofers), and one or more high frequency transducers (e.g., one or more tweeters).

Figure 7C:
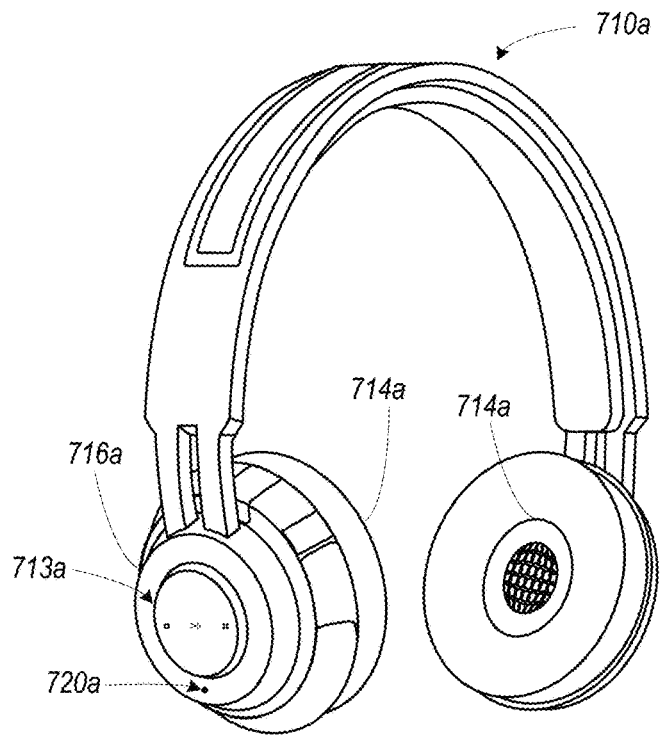
FIG. 7C is a front isometric view of a portable device implemented as headphones configured in accordance with aspects of the disclosed technology.

FIG. 7C is a front isometric view of the headphones 710*a* configured in accordance with aspects of the disclosed technology. As shown in FIG. 7C, the headphones 710*a* are implemented as headphones to facilitate more private playback as compared with the out loud playback of the playback device(s) 110. As shown, the headphones 710*a* include a housing 716*a* to support a pair of transducers 714*a* on or around user's head over the user's ears. The headphones 710*a* also include a user interface 713*a* including a touch-sensitive region to facilitate playback controls such as transport and/or volume controls. In particular, the touch-sensitive region may be configured to detect various gestures corresponding to different inputs.

The headphones 710*a* also include a status LED 720*a*. The status LED 720*a* may indicate (e.g. via different colors) the current connections (e.g., Wi-Fi or Bluetooth). For instance, the status LED 720*a* may appear white when Wi-Fi is connected. If Wi-Fi is not available, then the status light may appear blue. In an example, the LED may remain white when Wi-Fi is available and when streaming over Bluetooth in order to indicate that Wi-Fi is available.

FIG. 7D is a front isometric view of the earbuds 710*b* configured in accordance with aspects of the disclosed technology. As shown in FIG. 7D, the earbuds 710*b* is implemented as earbuds to facilitate more private playback as compared with the out loud playback of the playback device(s) 110, similar to the headphones 710*a*. As shown, the earbuds 710*b* (also referred to as earbuds 710*b*) includes a housing 716*b* to support a pair of transducers 714*b* within a user's ears. The earbuds 710*b* also include a user interface 713*b* with a touch-sensitive region to facilitate playback controls such as transport and/or volume controls, perhaps via gestures. The earbuds 710*b* also include a status LED 720*b*, which may function similarly as the status LED 720*a*. The earbuds 710*b* may include the same or similar components as the representative playback device 710*a* in FIG. 7B.

FIG. 7E is a front isometric view of an ultra-portable playback device 710*c*. As compared with the headphones 710*a* and the earbuds 710*b*, the ultra-portable playback device 710*c* includes one or more larger transducers to facilitate out loud audio content playback. However, relative to the playback device(s) 110, the ultra-portable playback device 710*c* may include less powerful amplifier(s) and/or smaller transducer(s) to balance battery life, sound output capability, and form factor (i.e., size, shape, and weight) of the ultra-portable playback device 710*c*. The ultra-portable playback device 710*c* includes a user interface 713*c* with a touch-sensitive region to facilitate playback controls such as transport and/or volume controls, possibly via gestures. The ultra-portable playback device 710*c* also include a status LED 720*c*, which may function similarly as the status LED 720*a*. The ultra-portable playback device 710*c* may include the same or similar components as the representative playback device 710*a* in FIG. 7B.

FIG. 7F is a front isometric view of another ultra-portable playback device 710*d*. Like the ultra-portable playback device 710*c*, the ultra-portable playback device 710*d* includes one or more larger transducers to facilitate out loud audio content playback. The ultra-portable playback device 710*c* includes a user interface 713*d* with a touch-sensitive region to facilitate playback controls such as transport and/or volume controls, possibly via gestures. The ultra-portable playback device 710*d* also include a status LED 720*d*, which may function similarly as the status LED 720*a*. The ultra-portable playback device 710*c* may include the same or similar internal components as the representative playback device 710*a* in FIG. 7B.

Some ultra-portable playback devices 710 are configured to be placed upon a device base 718. To illustrate, FIG. 7F illustrates the ultra-portable playback device 710*d* being configured to be placed upon a device base 718*a*. The device base 718*a* includes protrusions 719*a* and 719*b*, which align with recesses 717*a* and 717*b* on the portable playback device 710*d*. Such protrusions and recesses may facilitate placing the ultra-portable playback device 710*d* on the device base 718*a* and may improve stability of the playback device 710*d* while it is positioned on the device base 718*a*.

In example implementations, the ultra-portable playback device 710*c* is rotatable about the device base 718*a* to control volume of the ultra-portable playback device 710*c*. For instance, the ultra-portable playback device 710*d* may rotate with respect to the device base 718*a*, which may generate a volume control signal in a sensor of the ultra-portable playback device 710*c* and/or device base 718*a*. In another example, a first portion of the device base 718*a* is rotatable with respect to a second portion of the device base 718*a*. Rotation of these two portions generates a volume control signal in a sensor of the device base 718*a* that controls volume of the ultra-portable playback device 710*c* when the ultra-portable playback device 710*d* is placed upon the device base 718*a*.

The device base 718*a* includes a device charging system. When the ultra-portable playback device 710*c* is placed on device base 718*a*, the ultra-portable playback device 710*d* may draw current from the charging system to charge one or more of its batteries. In some examples, the charging system of the device base 718*a* includes an inductive charging circuit (e.g., a coil that induces a current in a corresponding coil in the ultra-portable playback device 710*d* that wirelessly charges one or more batteries of the ultra-portable playback device 710*c*). Alternatively, the charging system of the device base 718*a* includes conductive terminals by which the ultra-portable playback device 710*d* may draw current from the device base 718.

In some implementations, the device base 718*a* includes a control system. Example control systems of the device base 718*a* include one or more processors and memory. The processor(s) may be clock-driven computing components that process input data according to instructions stored in the memory. Example operations include communicating via a communications interface (e.g., a BLUETOOTH® interface) with ultra-portable playback device 710*d* (e.g., to cause the ultra-portable playback device 710*c* to join an associated zone via one or more instructions) and causing the charging system to supply current to ultra-portable playback device 710*d*, among other examples.

In some example implementations, some playback devices, such as the headphones 710*a* or the earbuds 710*b*, as well the portable playback device 710*c* and/or 710*d*, may interface with the media playback system 100 via a mobile device, such as a smartphone or tablet. FIG. 7F illustrates an example pairing arrangement between the headphones 710*a* and a mobile device configured as a control device 130*a*. As noted above, a mobile device may become a control device 130 via the installation of control application software, which may further provide bridging features to facilitate the control device 130*a* operating as an interface between the headphones 710*a* and the media playback system 100.

The control device 130*a* may include communications interface(s), processing capabilities, and/or other features that are not necessarily implemented in the headphones 710*a*. By "pairing" the headphones 710*a* to the control device 130*a*, the portable playback device 710 is able to utilize some of these features. This arrangement may permit the headphones 710*a* to be smaller and more portable, to draw less power, and/or to be less expensive, among other possible benefits.

For instance, in various implementations, the headphones 710*a* may be implemented with or without a communications interface to connect to the Internet while "on the go" (e.g., a cellular data connection). By pairing the headphones 710*a* to the control device 130*a* via a personal area connection such as Bluetooth® (IEEE 802.15) or a wireless local area network connection (IEEE 802.11), the headphones 710*a* may stream music via an Internet connection of the control device 130*a* and the pairing connection. In embodiments that include a wireless local area network interface, the headphones 710*a* may connect directly to a wireless local area network (e.g., the network 104 (FIG. 1B)) if available.

As noted above, the playback devices 710 may include an integrated (i.e., built-in) network microphone device, which may be configured to process voice inputs locally and/or via a cloud-based voice assistant service. In addition, when paired to a control device 130*a*, a playback devices 710 may also have access (e.g., via Bluetooth) to a native voice assistant on the control device 130*a*. The playback devices 710 may invoke one of the voice assistants based on connection state. Example techniques related to concurrent voice assistants based on connection state are described in U.S. patent application Ser. No. 17/174,753, filed on Feb. 12, 2021, and titled "Portable Playback Devices with Network Operation Modes," which is incorporated by reference herein in its entirety.

IV. Example Virtual Line-In

Example playback devices, such as the playback devices 110 (FIG. 1A) or the portable playback devices 710 (FIGS. 7A-7G) may implement a system that facilitates integration of external audio sources with native audio playback of the playback devices. This system is referred to herein as a "virtual line-in." Similar to how a conventional line-in provides an interface to receive an audio signal, the "virtual line-in" provides an interface to receive audio signals from external audio sources. That is, audio content from external sources (as well as associated signals, such as control signals, timing signals, and/or metadata information) may be received from an external source and integrated into audio playback of the playback devices via the virtual line-in.

Given this functionality, the virtual line-in can also be referred to as a VLI proxy, as the virtual line-in functions as a proxy between the external source and native audio playback on the playback devices. While the term "virtual line-in" is used as a convenience to refer to example systems, those of ordinary skill in the art will recognize that other example systems may implement similar features without being referred to as a virtual line-in. Moreover, these example techniques may be applicable to systems that facilitate integration of external sources in different ways.

Examples of external audio sources include sources that "take control" of audio playback by the playback devices 110 and 710. For instance, a Bluetooth® audio stream from a mobile device may "take control" of audio playback on a playback device 710 such that the playback device 710 plays audio streamed from the mobile device. As another example, a streaming protocol (such as Apple® Airplay® or Spotify® Connect®) may start a session with the portable playback device 710 as a target playback device, which takes control of audio playback on the playback device. In contrast, during native audio playback, the portable playback devices may play back from a playback queue, which may include audio tracks (e.g., by way of a URI) from various network locations.

Figure 7G:
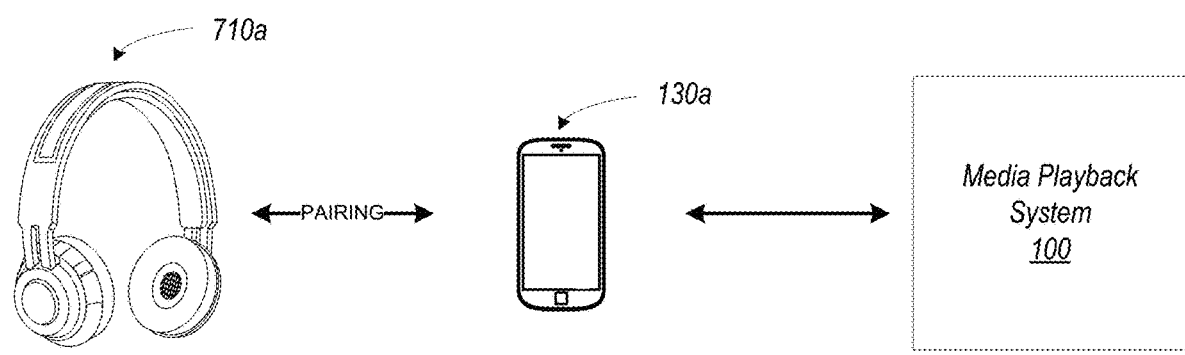
FIG. 7G is a schematic diagram illustrating an example pairing configuration between a portable playback device and a control device in accordance with aspects of the disclosed technology.
Figure 8:
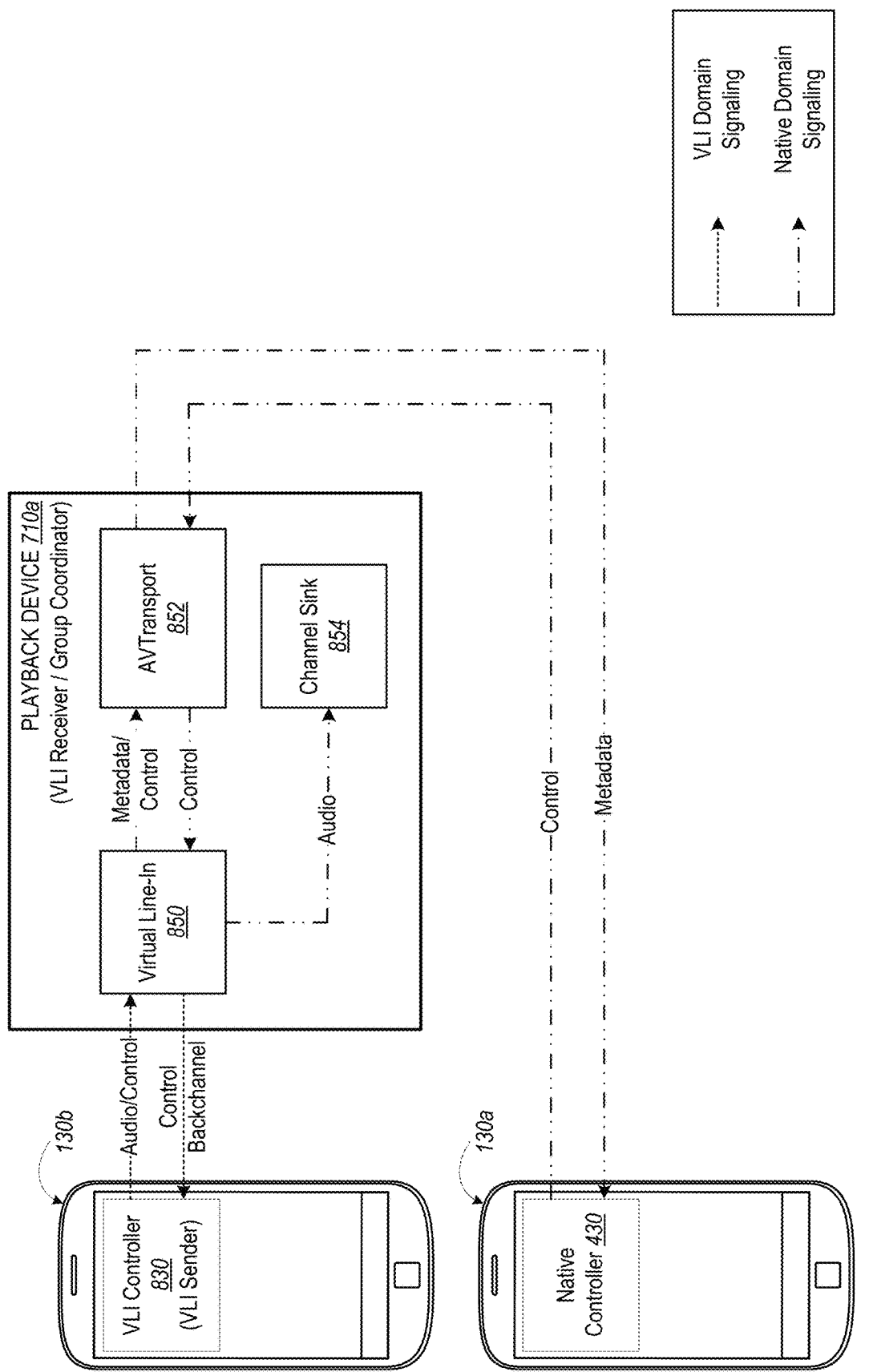
FIG. 8 is a block diagram illustrating an example virtual line-in in accordance with aspects of the disclosed technology.

To illustrate an example virtual line-in, FIG. 8 is a functional block diagram illustrating example control and audio distribution using a virtual line-in 850. In this example, a VLI controller 830 on a VLI device 130*b* operates as a VLI sender, which functions to provide audio to one or more VLI receiver(s), and which in this example is the playback device 710*a*. Examples of VLI senders include computing/mobile devices paired via Bluetooth® to the VLI receiver (e.g., the playback device 710) (FIG. 7G), which may send audio over Bluetooth® from various apps. Other examples of VLI senders include computing/mobile devices configured to operate as a host of a streaming protocol. For instance, Airplay®-compatible devices, such as smartphones, tablets, and network microphone devices, may operate as VLI senders. As another example, app-based streaming protocols such as Spotify® Connect® may operate as VLI senders as well.

As shown in FIG. 8, the VLI sender provides an audio stream to the playback device 710*a* in the VLI domain. This VLI domain signaling is received at the virtual line-in 850, which operates as an interface between a VLI domain of the VLI device 130b and a native domain of the playback device 710a. Generally, the native domain of the playback device 710a includes signaling and devices native to the media playback system 100 (e.g., as illustrated in FIGS. 1A and 1B). The VLI domain includes external, non-native signaling (e.g., via protocols such as Airplay® or Bluetooth®). Generally, the VLI and native domain signaling is transmitted via a network, such as the network 104 (FIG. 1B) or a personal area network (e.g., Bluetooth®).

The virtual line-in block 850 converts the VLI domain audio stream from the VLI sender to a native domain audio stream and passes the native domain audio stream to the channel sink 854. The channel sink 854 decodes the native domain audio stream and passes it to the audio stage (not shown in the FIG. 8 example) for output. The audio stage may include various components to process and amplify an audio signal for output (e.g., the audio processing components 712g and/or the audio amplifiers 712h).

In one aspect, since the channel sink 854 receives the audio stream using native domain signaling, the channel sink 854 can process the audio stream in the same way it would process an audio stream that originated in the native domain. In a related aspect, the conversion performed by the virtual line-in 850 facilitates interoperability between the VLI domain audio stream and the native domain channel sink 854.

Depending on the encoding format of the VLI domain audio stream, the VLI receiver may transcode the VLI domain audio stream into an uncompressed format. For example, if the VLI domain audio stream is encoded in an encoding format that is not supported by the native domain decoder of the channel sink 854, the virtual line-in 850 decodes the audio stream to an uncompressed format (e.g., PCM). This configuration may use more bandwidth in distributing audio to downstream group members (not shown in the FIG. 8 example), but allows for greater compatibility. Conversely, if the VLI domain audio stream is encoded in an encoding format supported by the native domain, then decoding is not performed until the channel sink 854. This configuration may have the advantage of being more bandwidth efficient, as the audio stream uses less bandwidth when distributed in compressed format, especially in configurations that include multiple downstream group members.

The virtual line-in 850 also handles metadata from the VLI sender. In some implementations, the virtual line-in 850 extracts metadata from the audio stream and passes the metadata in the native domain to the AVTransport 852. Alternatively, the VLI sender may send the metadata in a separate data stream using VLI domain control signaling. The playback device 710a in FIG. 8 may be designated a native domain group coordinator as described below. Native domain functions of the native domain group coordinator include distribution of native domain audio and control information (including metadata) to native group members (not shown in FIG. 8), as well as receiving native domain control information from native domain group members and control devices 130. These functions are carried out in the native domain by the AVTransport 852.

Since the AVTransport 852 receives the metadata using native domain signaling, the AVTransport 852 can process the metadata in the same way it would process metadata from an audio stream that originated in the native domain. The native controller 430 (FIGS. 4A-4D) on the control device 130a receives the metadata and updates the playback status region 433 (FIG. 4D) to reflect the audio content currently being played by the VLI group.

The native controller 430 on the control device 130a is also a source of backchannel control. That is, control commands received via the native control controller 430 on the control device 103a (e.g., via the transport controls 433m) are passed back to the AVTransport 852 of the group coordinator using native domain control signaling as shown in FIG. 8. The AVTransport 852 passes these control commands to the virtual line-in 850, which converts the native domain control commands to VLI domain control commands that the VLI sender can understand. For instance, the virtual line-in 850 may convert the native domain control commands to equivalent VLI domain API function calls. The conversion may be done based on a mapping stored in memory between commands in the VLI domain and native domain.

The virtual line-in 850 transmits these VLI domain commands back to the VLI sender. The VLI sender then responds to the commands. For instance, in response to a skip forward command, the VLI sender starts streaming the next song. As another example, in response to a volume increase or decrease command, the VLI sender sends a VLI domain command to increase or decrease volume back to the VLI receivers(s). This VLI domain command is carried out by the virtual line-in 850 and also converted to a native domain command for distribution to native domain group members via the AVTransport 752e. Notably, even though the command may have originated via the native domain control controller 327, the command is not carried out until it is received back from the VLI sender, which is the audio and control group coordinator of the VLI group.

Further example techniques related to the virtual line-in are described in U.S. patent application Ser. No. 16/119,603, filed on Aug. 31, 2018, and titled "Media Playback System with Virtual Line-In Groups," which is incorporated by reference herein in its entirety.

IV. Example Management of Concurrent Audio Streams

Example playback devices, such as the portable playback devices 710 (FIGS. 7A-7G), may concurrently (or at different times) receive audio signals over two or more different types of connections (e.g., two or more of Wi-Fi®, Bluetooth®, and/or cellular network connections) possibly from two or more different audio sources. To manage these incoming signals, in operation, the playback devices 710 may arbitrate between the signals based on one or more policies, which may be based on audio categories. These categories may be assigned relative priorities, which the playback devices 710 may use to determine what to play when two or more signals are received concurrently.

Figure 9A:
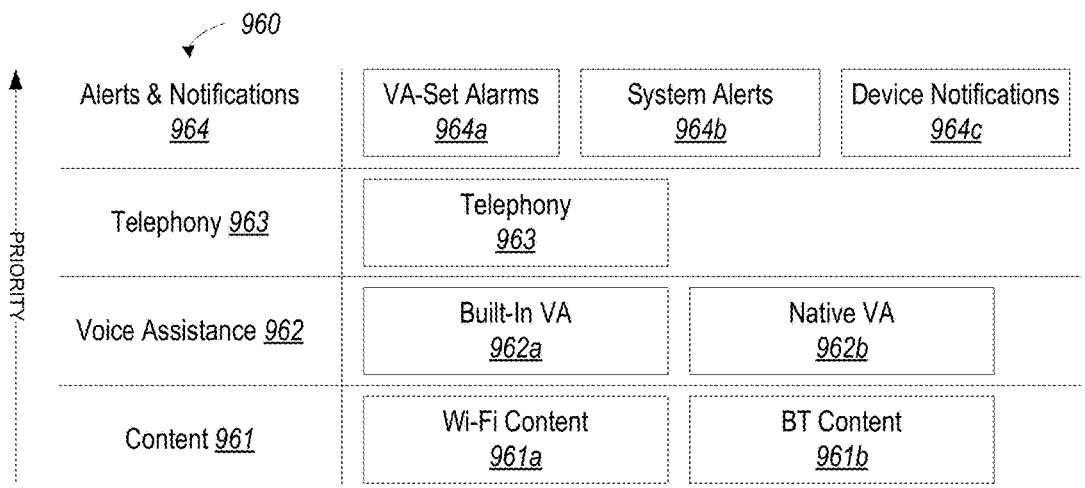
FIG. 9A is a block diagram illustrating an example framework for audio management in accordance with aspects of the disclosed technology.

By way of example, FIG. 9A is a diagram illustrating an example framework for audio prioritization. Under this example framework, audio types are categorized into four categories 960 based on the type of content: alerts and notifications 964, telephony 963, voice assistance 962, and content 961. Under this example framework, certain categories 960 are ranked with a higher priority than others. In particular, alerts & notifications 964 is ranked with the highest priority, telephony 963 has the next highest priority, voice assistance 962 is the next highest after that, and content 961 is the lowest priority, as indicated in FIG. 9A with the priority arrow. The priorities of alerts and notifications 964, telephony 963, voice assistance 962, and content 961 may be referred to as a fourth priority, a third priority, a second priority, and a first priority, respectively, in descending priority level.

Generally, categories of audio signals that should typically receive more immediate attention are given higher priority. In other examples, the categories 960 may be ascribed different relative priority levels. Other examples may include additional or fewer categories, or different categorizations.

The alerts and notifications 964 may include various types of alerts and notifications. For instance, this category may include voice assistant-set alarms 961a, which may be set using a voice assistant to trigger at certain times (e.g., a wake-up alarm or a timer) or upon certain events (e.g., a package is delivered). Further, this category may include system alerts 961b, which are alerts from the playback device 710 itself. Example system alerts 961b include various voice guidance messages and earcons, which may inform a user as to different status or conditions present on the playback device 710, such as connection status alerts, battery level alerts, voice assistant availability alerts, and device faults (e.g., overheating), among other examples. Yet further, the alerts and notification 961 category may include device notifications 961c, which originate from a paired (e.g., via Bluetooth®) control device 130a (FIG. 7G). Examples of device notifications 961c include text message or email notifications and OS notifications, as well as other app notifications.

The telephony 963 category includes various types of telephony 963, such as phone calls and audio (and audio/video) conferences. Examples include calls over cellular networks, Internet based (VOIP) calls, and Wi-Fi calling. Other examples include various types of video-conferencing, such as Zoom®, Facetime®, Skype®, Teams®, and the like.

The voice assistant 962 category may include audio from one or more voice assistants, such as built-in VA audio 962a and/or native VA audio 962b. Example playback devices 710 may implement a built-in voice assistant and also have access to a native voice assistant on a paired control device 130a via a Bluetooth connection. As noted above, example techniques related to concurrent voice assistants are described in U.S. patent application Ser. No. 17/174,753, filed on Feb. 12, 2021, and titled "Portable Playback Devices with Network Operation Modes," which was incorporated by reference in its entirety above.

The content 961 category includes content from various sources, such as Wi-Fi content 961a and Bluetooth content 961b. Examples of audio content include track-based audio content (e.g., songs, chapters in an audiobook, etc) and non-track-based audio content (e.g., Internet radio streams). Other examples of content include any sound that may be directed over a Bluetooth stream, such as operating system earcons and app-audio (e.g., games, streaming service apps, local playback apps, etc.).

As noted above, the playback devices 710 may use the relative priorities of categories 960 to determine what audio signal(s) to play and/or how to play the audio signals when more than one audio signal is received concurrently according to playback policies. In some cases, per such policies, higher priority signals will stop (e.g., pause or silence) playback of lower priority signals so that the higher priority signals can be played (and heard) by listeners. Alternatively, in some cases, lower priority signals are ducked and played back concurrently with the higher priority content. Yet further, in some cases, later received lower priority signals may interrupt certain higher priority signals (e.g., one level higher) but not interrupt other higher priority signals (e.g., two or more levels higher).

Figure 9B:
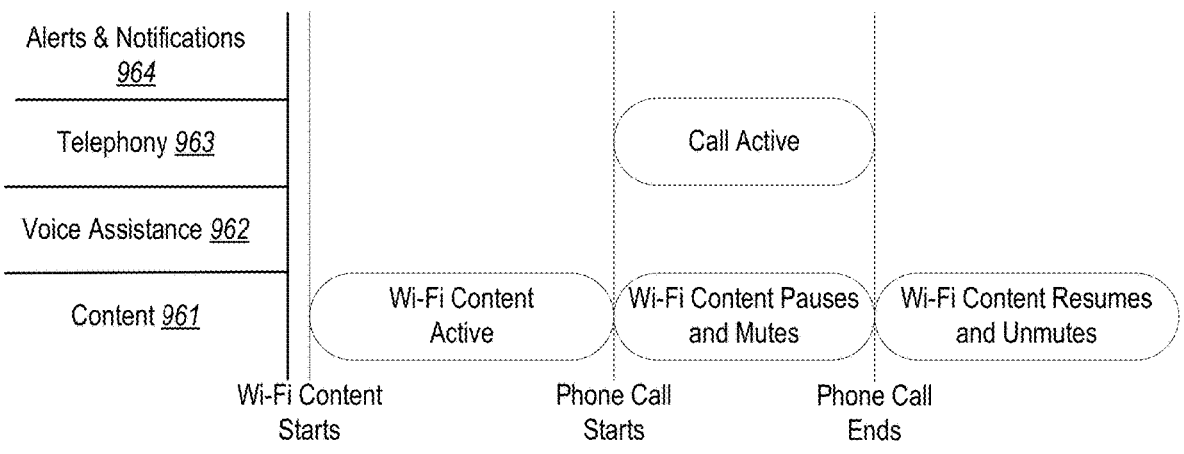
FIG. 9B is a diagram illustrating example management of audio streams in accordance with aspects of the disclosed technology.

To illustrate, FIG. 9B is a diagram illustrating management according to example playback policies. In particular, FIG. 9B illustrates how example playback policies manage audio playback when an audio stream in the telephony 963 category (e.g., a telephone call) interrupts an actively playing Wi-Fi audio stream in the content 961 category. Here, the phone call in the telephony 963 category causes the Wi-Fi audio stream to stop (e.g., by pausing and muting). Then, when the phone call ends, the Wi-Fi audio stream resumes (and unmutes). As noted above, the telephony 963 category has a third priority that is higher than the first priority of the content 961 category. The playback policies cause this behavior based on the relative priorities of the two audio streams.

Note that the example of FIG. 9B is merely illustrative of how content in two different categories 960 is managed. Other types of content in the telephony category (e.g., a video conference) and the content 961 category (e.g., a Bluetooth audio stream) may be managed similarly. Similar principles may apply to the following examples as well.

Figure 9C:
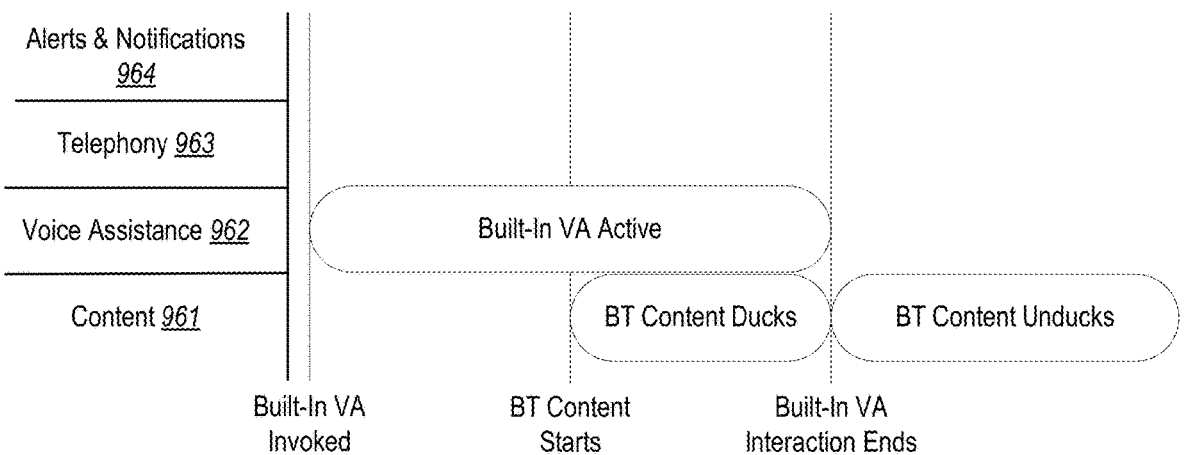
FIG. 9C is a diagram illustrating example management of audio streams in accordance with aspects of the disclosed technology.

As another example, FIG. 9C is a diagram illustrating management according to example playback policies. FIG. 9C illustrates how example playback policies manage audio playback when an audio stream in the content 961 category (e.g., a BT audio stream) interrupts an actively playing VA audio stream in the VA 962 category. In this example, the on-going built-in VA interaction in the VA 962 category causes the BT audio stream in the lower priority content 961 category to duck (lower volume) for the duration of the interaction. Then, when the built-in VA interaction ends, the BT audio stream unducks. Via this management scheme, the user is provided feedback that the BT audio stream is playing (via the ducked playback) while still maintaining the higher priority content as the focus (by playing the VA interaction at regular (non-ducked) volume).

Here, the management is determined based on the second priority of the built-in VA interaction in the VA 962 category and the first priority of the BT audio stream in the content 961 category. Note that other types of content in the VA 962 category and the content 961 category may be similarly managed. For instance, Wi-Fi content may duck during a native VA interaction.

Figure 9D:
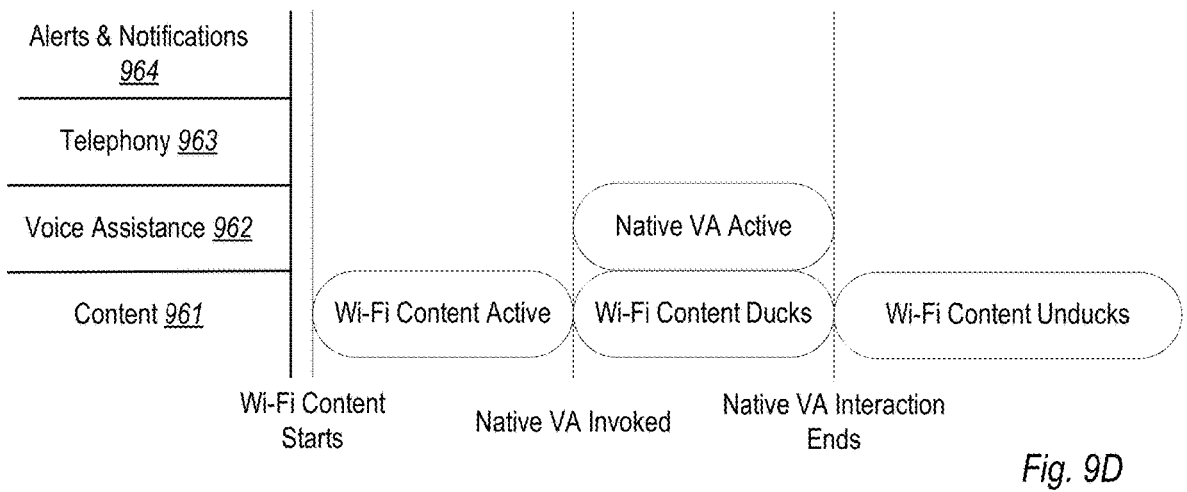
FIG. 9D is a diagram illustrating example management of audio streams in accordance with aspects of the disclosed technology.

In a further example, FIG. 9D is a diagram illustrating management according to example playback policies. FIG. 9D illustrates how example playback policies manage audio playback when a VA audio stream in the VA 962 category interrupts an actively playing audio stream in the content 961 category (e.g., a Wi-Fi audio stream). In this example, the intervening audio stream for a native VA interaction (via Bluetooth) causes the active Wi-Fi content stream to duck. Then, when the native VA interaction ends, the Wi-Fi audio stream unducks. This example is similar to the FIG. 9C example, in that the management is determined based on the second priority and the first priority of the two audio streams.

Figure 9E:
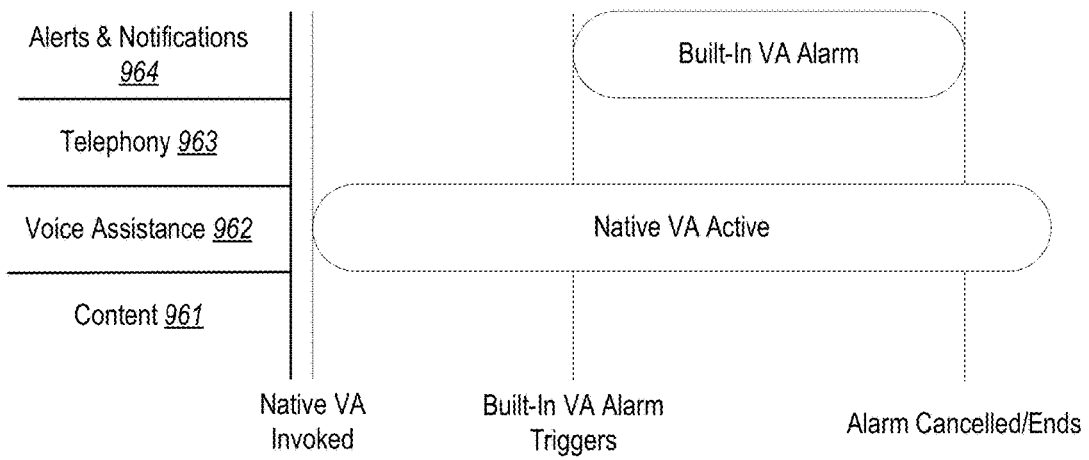
FIG. 9E is a diagram illustrating example management of audio streams in accordance with aspects of the disclosed technology.

As yet another example, FIG. 9E is a diagram illustrating management according to example playback policies. FIG. 9D illustrates how example playback policies manage audio playback when an alarm in the alerts & notifications 964 category interrupts an actively playing VA audio stream in the VA 962 category. In this example, the intervening audio stream for a built-in VA alarm in the alerts and notifications category 964 is played concurrently with the actively playing VA audio stream in the VA 962 category. That is, in this example management scheme, the playback policies cause such behavior in an interaction between an audio stream having the second priority (e.g., the actively playing VA audio stream in the VA 962 category) and an audio stream having the fourth priority.

Figure 9F:
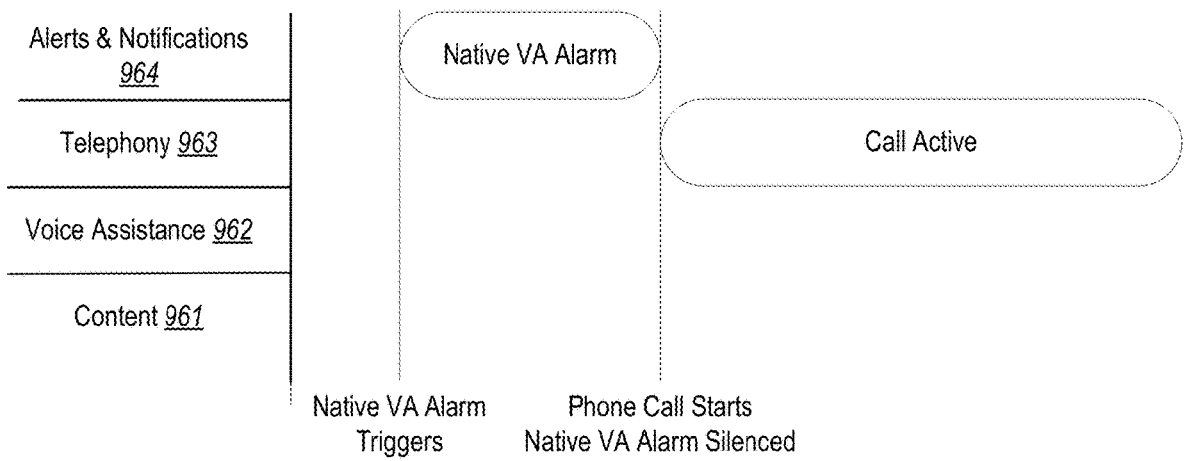
FIG. 9F is a diagram illustrating example management of audio streams in accordance with aspects of the disclosed technology.

FIG. 9F is another diagram illustrating management according to example playback policies. FIG. 9F illustrates how example playback policies manage audio playback when a phone call in the telephony 963 category (having the third priority) interrupts an actively playing native VA alarm in the alerts & notification 964 category (having the fourth priority). In this example, the intervening audio stream for the phone call in the telephony 963 category silences the actively playing VA audio stream in the VA 962 category. That is, in this example management scheme, the playback policies cause such behavior in an interaction between an audio stream having the fourth priority (e.g., the actively playing native VA alarm in the alerts & notification 964 category) and an audio stream having the third priority (e.g., the phone call).

FIG. 9G is a further diagram illustrating management according to example playback policies. FIG. 9G illustrates how example playback policies manage audio playback when a system alert in the alerts & notification 964 category (having the fourth priority) interrupts an actively playing phone call in the telephony 963 category (having the third priority). In this example, the intervening audio stream for the system alert in the alerts and notifications 964 category is played concurrently with the actively playing phone call in the telephony 963 category. That is, in this example management scheme, the playback policies cause such behavior in an interaction between an audio stream having the fourth priority (e.g., the system alert in the alerts & notification 964 category) and an audio stream having the third priority (e.g., the phone call).

Note that the FIG. 9B-9G examples are illustrative of how the playback policies may cause different responses (e.g., ducking, stopping, or concurrent playing, as appropriate) based on the relative priorities of the concurrent audio streams. These examples are intended to be illustrative of a wide variety of interactions that may occur under the example framework of FIG. 9A. Further, as noted above, in different examples, the categories, respective priority levels, and the management taken based on relative priority levels of concurrent audio streams may vary from these illustrative examples.

In some examples, the playback devices 710 may also manage different types of content within the categories 960. For instance, within the content 961 category, the example framework defines Wi-Fi content 961a and BT content 961b as sub-categories. As noted above, the playback devices 710 may receive Wi-Fi content 961a and BT content 961b concurrently. At the same time, playing both types of content concurrently is generally undesirable, as the playback would interfere.

FIG. 9H is a further diagram illustrating management according to example playback policies. FIG. 9H illustrates how example playback policies manage audio playback when a BT audio stream in the content 961 category (having the first priority) interrupts actively playing Wi-Fi content also in the content 961 category (also having the first priority). In this example, the intervening audio stream for the BT audio stream takes over and the Wi-Fi audio stream is stopped. In other words, under example playback policies, the playback devices 710 may utilize a "last-in-wins" policy for determining a "now playing owner." That is, if a second source of audio content interrupts a first source of audio content, the second source becomes the now playing owner. Then, if the first source (or a third source) interrupts the second source, that source becomes the now playing owner. Such a policy may apply to concurrent audio streams in the content 961 category, as well as additional or alternative categories, in various examples.

In operation, a playback device 710 may define one audio signal as a now playing "owner" such that the playback device 710 plays back that audio signal. In particular, within the content 961 category, the playback device 710 may define either the Wi-Fi content 961a or the BT content 961b as the now playing owner. Other audio signals (other than the now playing owner) might not be played back in favor of the now playing owner. At the same time, audio signals in higher priority categories may interrupt or otherwise alter playback by the now playing owner.

Within examples, the now playing owner may be implemented in the playback devices 710 as a state variable indicating the currently playing audio signal. Under certain conditions, the playback device 710 may change the value of this state variable and thereby change the now playing owner. Changing the now playing owner causes the playback device 710 to play back the audio signal now indicated by the now playing state variable (rather than the audio signal previously indicated by the now playing state variable).

In some examples, the now playing "owner" may be defined using a uniform resource identifier (URI). That is, a state variable (referred to as "AVTransportURI") may store a URI indicating the now playing audio signal. As the now playing owner changes, the AVTransportURI state variable is updated to indicate new now playing owners via their corresponding URI.

As discussed in section II, the playback devices 110 may play back audio streams from sources indicated by respective URIs (or URLs). That is, for local (e.g., available on a local area network) and cloud-based audio tracks, URI may indicate the location of the audio track (i.e., the specific file). Similarly, for non-track-based audio content (such as Internet radio stations or other continuous streams), the URI may indication the location of the stream. Further, if the playback device 110 includes a line-in (e.g., a 3.5 mm or RCA input), this line-in may be assigned a particular URI indicating this source, which facilitates assigning the line-in as now playing owner when desired. Accordingly, when playing back audio over Wi-Fi®, the AVTransportURI may indicate the URI of the currently playing audio track or source.

Similar to the physical line-in, external sources received via a virtual line-in (FIG. 8) may likewise be assigned respective URIs. For instance, a Bluetooth® connection (and corresponding audio stream) may be associated with a particular URI (e.g., ./bluetoothXX) such as that assigning this particular URI to the AVTransportURI causes the Bluetooth audio stream to become the now playing owner. Similarly, an Airplay® session may likewise be assigned a particular URI such that assigning this particular URI to the AVTransportURI causes the Airplay® session to become the now playing owner (e.g., ./airplaysessionXXX, where xxx represents one or more identifiers, such as a session identifier and/or a device identifier).

To illustrate, FIG. 9-I is a block diagram illustrating the last-in-wins policy for two content sources (Wi-Fi® and Bluetooth®). In an example, while their headphones 710a are connected to a wireless local area network (e.g., in their home or office) via an 802.11-compatible network interface (e.g., the wireless interface(s) 712e), a user may start playing audio tracks from a streaming audio service. That is, the headphones 710*a* stream the audio tracks via an 802.11-compatible network interface from the computing devices 106*a*.

Such playback assigns Wi-Fi as the now playing owner. More particularly, following the example above, each audio track may be set as the now playing owner during playback of that respective track. Alternatively, in some implementations, the Wi-Fi connection itself may be set as the now playing owner.

Later, a user may start playback via Bluetooth. By starting audio output via Bluetooth®, the Bluetooth® audio output is now the "last-in" and it becomes the now playing owner. That is, the Bluetooth® virtual line-in URI is assigned to the now playing owner (e.g., the AVTransportURI). Assigning the Bluetooth virtual line-in URI in place of a Wi-Fi URI interrupts playback of the audio associated with the Wi-Fi® URI (e.g., by pausing, stopping, or muting the content) and starts playback of the Bluetooth® stream.

In contrast to Wi-Fi, a Bluetooth playback may involve a constant, open, uni-directional connection to the playback device 710 from a paired control device 130*a*. That is, instead of audio being output on the paired control device 130*a*, sound output is instead directed to the Bluetooth connection and outputted on the paired playback device 710. For instance, example Bluetooth connections (e.g., via the wireless interfaces 712*e*) may utilize the A2DP (Advanced Audio Distribution Profile) standard, which supports high quality audio streams. When A2DP is connected, there will be an open AVDTP (Audio/Video Distribution Transport Protocol Stream), which transports audio output on the control device 130*a* to the paired playback device 710 for playback. The audio can include audio from a variety of sources on the paired control devices 130*a*, including operating system sounds as well as app sounds (e.g., streaming audio service apps, podcast apps, Internet radio station apps, games, or any app providing access to a combination of audio types, as well as other apps that include audio playback).

The "always-on" nature of a Bluetooth connection (when established) may complicate a "last-in wins" policy, as it may not be clear whether an established Bluetooth connection is actually playing audio. When actually playing audio, the Bluetooth virtual line-in URI should be considered to be the "last-in" and thus the now playing owner. However, an established Bluetooth stream may transmit silence, or silence with occasional (e.g., intermittent or periodic) audio (e.g., from notifications) while the user is actually attempting to play back audio from Wi-Fi.

Moreover, some Bluetooth audio is pauseable while other Bluetooth audio is not pauseable, which further complicates management of the now playing owner. Apps that support AVRCP (Audio/Video Remote Control Profile) send an AVRCP play event or an AVRCP pause event when the user presses play or pause, respectively, for the media that they are listening to via the app. Data representing this event is transferred via the Bluetooth connection.

These events may help to determine whether the Bluetooth stream should be the now playing owner. In particular, an AVRCP play event affirmatively indicates that that user is intending to start Bluetooth playback. However, this cannot be the sole indicator of whether Bluetooth playback has started, as such events are not required as part of the Bluetooth protocol and some apps with audio playback do not support AVRCP. Moreover, an AVRCP pause event does not necessarily indicate that Bluetooth playback is stopped, as even if an AVRCP compatible app is paused, the control device 130*a* may still mix other audio (e.g., notifications) into the Bluetooth® stream.

At the same time, an AVRCP play event is not a dispositive indicator that playback has started, as an app may generate an AVRCP play event without necessarily passing audio into the Bluetooth stream. An example of such behavior is browsing (e.g., scrolling a feed) in an app that has videos which auto-play muted. Playing such videos may cause an AVRCP play event to be generated without any actual audio being passed through the Bluetooth stream.

Accordingly, in example implementations, the playback devices 710 may utilize silence and non-silence detection on the Bluetooth stream to determine whether the Bluetooth stream is actually playing audio (such that the playback device 710 should assign the Bluetooth stream as the now playing owner). Further, detection of play and pause events (e.g., AVRCP play and pause events) may be used in combination with silence/non-silence detection to determine whether the Bluetooth stream includes content, and should thus be the now playing owner (if playback of that content is "last-in"). In combination, these factors may provide an accurate indication of the Bluetooth state.

Figure 10A:
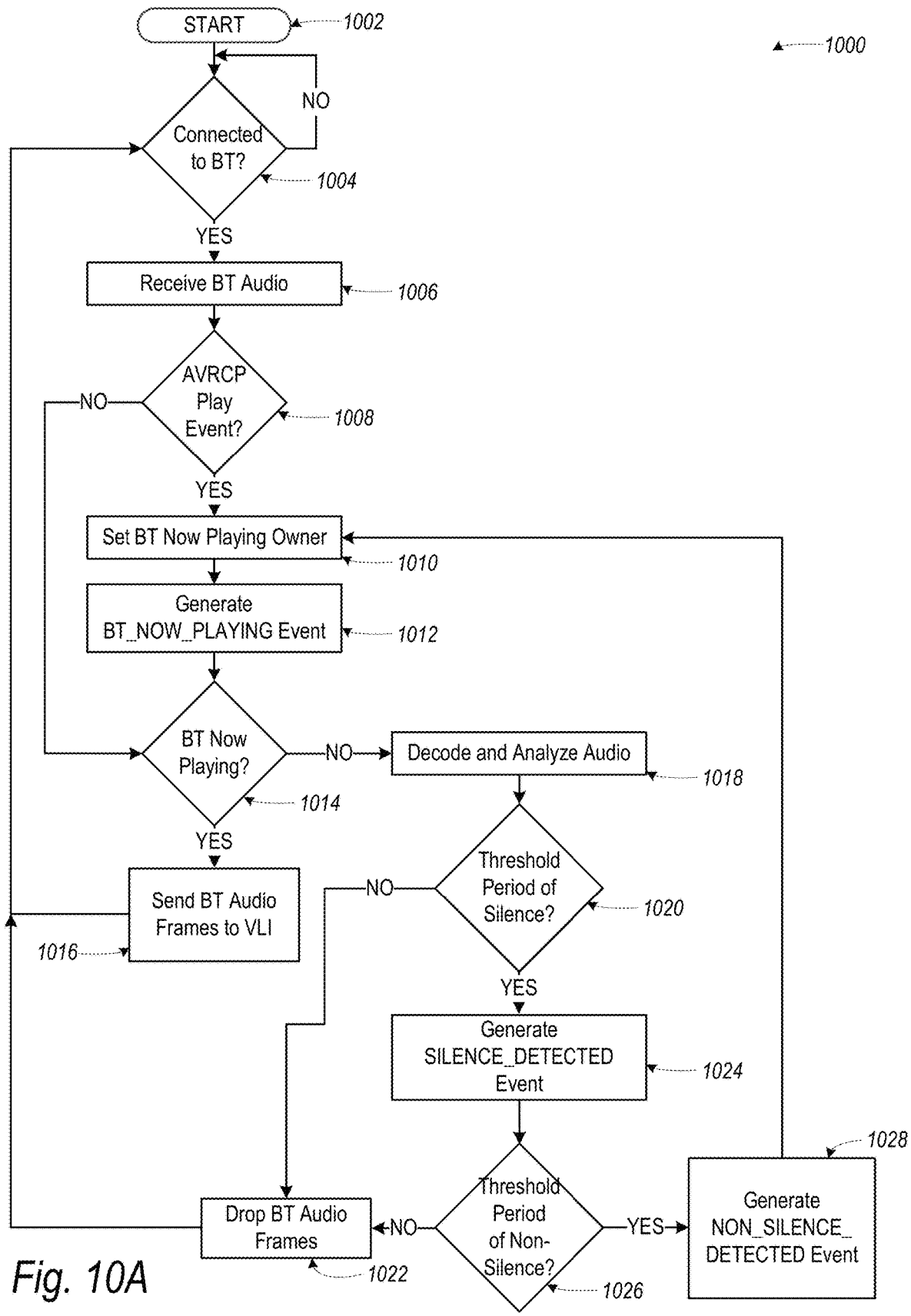
FIG. 10A is a flow diagram of an example method in accordance with aspects of the disclosed technology.

FIG. 10A is a functional block diagram of a method 1000 to determine whether Bluetooth should be the now playing owner. The method 1000, or similar techniques, may be implemented by a playback device 710 to facilitate determining which audio source should be the now playing owner. The method 1000 involves silence/non-silence detection as well as Bluetooth events.

At block 1002, the method 1000 starts and proceeds to block 1004. At block 1004, the playback device 710 determines whether the playback device 710 is connected to a control device 130*a* via Bluetooth. If not, the method 1000 loops back to make the determination again at a later time. While Bluetooth is disconnected, determining whether Bluetooth should be the now playing owner is unnecessary (as the Bluetooth stream is not an option). Wi-Fi is set as the now-playing owner when Bluetooth is disconnected. By disabling silence/non-silence detection when Bluetooth is disconnected, the playback device 710 may consume less power, which may extend battery life.

If Bluetooth is connected, the method 1000 proceeds to block 1006, which involves receiving a Bluetooth audio stream. As noted above, a Bluetooth connection may involve a constant, open, uni-directional stream that includes audio from various sources (e.g., apps) on a paired control device 130*a*. Further, the stream may include silence when the paired control device 130*a* is not playing back any audio to the Bluetooth output.

At block 1008, the method 1000 involves determining whether the received Bluetooth audio stream is accompanied by an AVRCP play event (and followed by audio packets). As noted above, apps that support AVRCP send an AVRCP play event or an AVRCP pause event when the user presses play or pause, respectively, for the media that they are listening to via the app. Such an event may affirmatively indicate that the user is attempting to play back via Bluetooth. As such, when the playback device 710 determines that the received Bluetooth audio stream is accompanied by an AVRCP play event, the playback device 710 can set Bluetooth as the now playing owner at block 1010 (e.g., by setting the AVTransportURI to the Bluetooth virtual line-in URI) and also generate a BT_NOW_PLAYING event at block 1012. However, since not all apps support AVRCP, this event cannot operate as the sole indication of Bluetooth playback, so the method 1000 also involves silence/non-silence detection.

Conversely, when the playback device 710 determines that the received Bluetooth audio stream is not accompanied by an AVRCP play event, the method 1000 proceeds to block 1014. At block 1014, the playback device 710 determines whether Bluetooth is already set as the now playing owner. If so, at block 1016, the method involves sending the BT audio frames to a virtual line-in (e.g., the virtual line-in 850 in FIG. 8). By disabling silence/non-silence detection when Bluetooth is the now playing owner, the playback device 710 may consume less power, which may extend battery life.

If not, the method 1000 involves performing silence/non-silence detection to determine whether the received Bluetooth audio stream includes audio content. In particular, at block 1018, the method 1018 involves decoding and analyzing the Bluetooth audio stream to determine whether the audio signal represented in the stream is content or silence. In particular, determining whether the audio signal represented in the stream is content or silence may involve looking at the samples of the audio signals represent silence or non-silence.

To avoid immediately setting Bluetooth as the now playing owner when Wi-Fi content is paused, the method 1000 may involve looking for a period of silence from the Bluetooth stream before looking for non-silence. In particular, at block 1020, the method 1000 involves determining whether the decoded Bluetooth audio stream includes a threshold period of silence (e.g., a period of X seconds of silence, such as 10 seconds). If not, at block 1022, the method involves dropping BT audio frames (to facilitate Wi-Fi playback) and the method loops back to block 1004.

However, if there is a threshold period of silence, at block 1024, the method 1000 involves generating a SILENCE_DETECTED event. After generating this event, the method 1000, at block 1026, involves determining whether the threshold period of silence is followed by a threshold period of non-silence (e.g., a period of Y seconds of silence, such as 3 seconds). If not, the method 1000 involves dropping BT audio frames (to facilitate Wi-Fi playback) at block 1022 and the method loops back to block 1004.

If there is a threshold period of non-silence followed by a threshold period of silence, at block 1028, the method 1000 involves generating a NON_SILENCE_DETECTED event. The method 1000 then proceeds to set Bluetooth as the now-playing owner at block 1010. Bluetooth playback then proceeds.

In other examples, as an alternative to events, example playback devices 710 may implement a classification function (e.g., BluetoothStreamClassificationo). Calling the classification function may return a classification value indicating whether a portion of the Bluetooth stream includes SILENCE or NON_SILENCE. In such examples, instead of advancing in the method 1000 based on the generation of an event, the playback device 710 may call the classification function and advance in the method 1000 based on the value returned by the function (e.g., SILENCE or NON_SILENCE).

In some examples, the classification function may differentiate between pure silence and silence and/or non-silence and noise. In such examples, a portion of the Bluetooth stream that includes only silent (all zeros) samples may be classified as PURE_ZERO. A portion of the Bluetooth stream with some non-zero samples that have an average power under a threshold is classified as SILENCE. Similarly, a portion of the Bluetooth stream with samples that have an average power over the threshold (or a different threshold) is classified as noise. The actual threshold values may vary by implementation, but in an example, may be set at a value (or values) corresponding to inaudible (or mostly inaudible signals) when under the threshold (e.g., for SILENCE). Further, a portion of the Bluetooth stream including all maximum value signals may be classified as NOISE.

In such examples, the method 1000 may differ to utilize the classification function in lieu of events. For example, at block 1020, the method 1000 may involve calling the classification function to determine if SILENCE OR PURE_ZEROS is returned (e.g., after the threshold period). Similarly, at block 1026, the method 1000 may involve calling the classification function to determine if NON_SILENCE is returned (e.g., after the threshold period). Further, in some cases, the The duration of the threshold periods of silence and/or non-silence may depend on the values returned by the classification function. For instance, at block 1020, after a first threshold period, the method may involve calling the classification function to see if PURE_SILENCE was returned. If so, the method 1000 may advance. If not, the portable playback device 710 may wait until a second threshold period (e.g., a few seconds longer) to see if the stream settles. Then, if SILENCE OR PURE_SILENCE is returned, the method 1000 may advance. Similar operation may occur for determining whether the threshold period of non-silence has elapsed at block 1026. That is, the portable playback device 710 may first look for noise, and if no noise, wait a few seconds longer and look for noise or non-silence.

In some examples, playback via a first source may be preferred (e.g., default). For instance, in some implementations, Wi-Fi may be preferred over Bluetooth, as audio playback over Wi-Fi may provide greater flexibility. Bluetooth playback requires that the paired control device 130*a* remain on and streaming audio to the paired playback device 710.

As such, the playback device 710 may switch the first source to the now playing owner when a second source is the now playing owner and idle. This idle condition may be referred to as a stale session. A session may be considered stale when it has been inactive for a certain period (e.g., 15 minutes or more).

For instance, when Bluetooth is set as the now playing owner, the portable playback device 710 may determine whether a period of inactivity has passed where content was not played back from Bluetooth. If so, the method 1000 may involve setting Wi-Fi as the now playing owner, even if there is not an intervening Wi-Fi audio stream (to be the "last in"). This functionality reflects the Wi-Fi first preference with Bluetooth being a secondary option. At the same time, if the portable playback device 710 is not connected to Wi-Fi, the session may be configured to not go "stale" as there is no primary option.

Further, the portable playback device 710 may temporarily disconnect from the second source when the second source is idle, which may save power. For instance, the playback device 710 may temporarily disconnected from Bluetooth based on determining that the period of inactivity has passed (e.g., that the session has gone stale).

The portable playback device 710 may automatically reconnect to the last paired Bluetooth host when a pairing input is received (e.g., a press-and-hold input on the user interface 713). If the last paired Bluetooth device is not available, the portable playback device 710 cycles through a list of previously paired Bluetooth devices until a connection is made. If the list is empty or no connection is made, the portable playback device 710 may enter a pairing mode to pair a new Bluetooth device to the portable playback device 710.

In some cases, the stale session techniques are implemented only for certain types of portable playback devices and not others. For instance, ultra-portable playback devices, such as the portable playback devices 710c and 710d may implement such techniques while wearable playback devices (e.g., the headphones 710a and earbuds 710b) might not implement such techniques. Such a difference may come from the expected usage patterns of the respective types of devices.

Figure 10B:
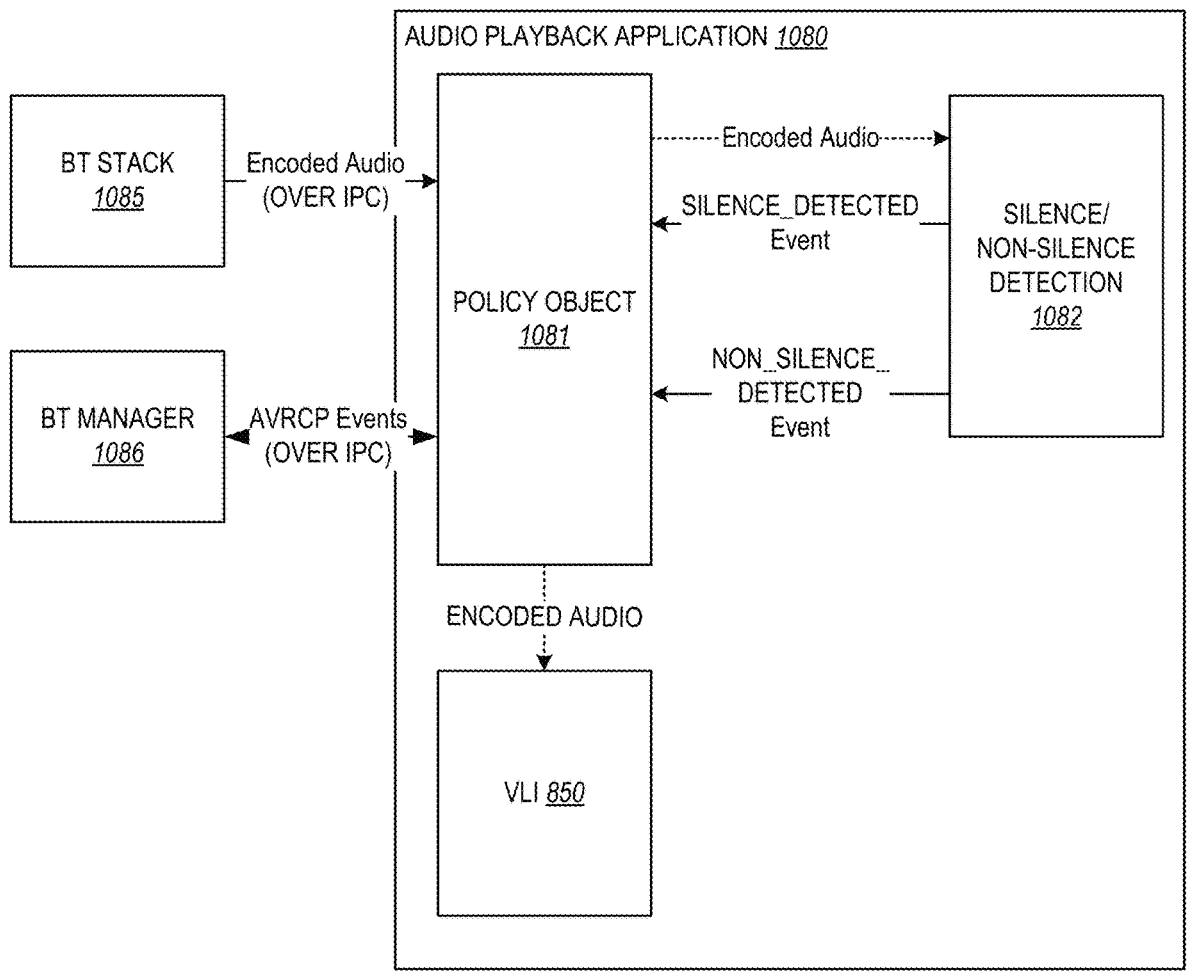
FIG. 10B is a block diagram of illustrating example management of audio streams in accordance with aspects of the disclosed technology.

FIG. 10B is a block diagram illustrating example components of a portable playback device 710, which may facilitate management of multiple audio streams. In operation, the portable playback device 710 may execute an audio playback application 1080, which includes a policy object 1081. The policy object may include instructions configured to manage concurrent audio streams according to various playback policies (FIGS. 9A-9H). Further, the audio playback application 1080 may manage the now playing owner, perhaps by carrying out the method 1000 or aspects thereof.

The policy object 1081 may receive the encoded Bluetooth audio stream over inter-process communications from the Bluetooth stack 1085 and direct the Bluetooth audio stream to either (a) the virtual line-in 850 (FIG. 8) or (b) silence/non-silence detection 1082 based on the now playing owner. That is, when Bluetooth is the now-playing owner, the policy object 1081 directs the Bluetooth audio stream to the virtual line-in 850 for integration into the audio playback system (and ultimately playback of the Bluetooth audio stream).

Conversely, when Bluetooth is the not now-playing owner, the policy object 1081 directs the Bluetooth audio stream to the silence/non-silence detection 1082 to determine whether Bluetooth should be the now-playing owner. As shown in FIG. 10B, the policy object 1081 is notified of silence or non-silence by the SILENCE_DETECTED and NON-SILENCE_DETECTED events, which the policy object 1081 can use to in determining when to set the BT audio stream as the now playing owner (FIG. 10A).

Yet further, the Bluetooth manager 1086 and the audio playback application 1080 exchange AVRCP events over inter-process communication. These events can include AVRCP play and pause events generated by a paired control device 130a. These events can also include AVRCP play and pause events generated locally on the playback device 710 (e.g., via a voice UI or a physical control interface, such as the user interface 713a (FIG. 7B), user interface 713b (FIG. 7C), or user interface 713c (FIG. 7D), among other examples.

V. Example Management of Playback Controls

Along with concurrent audio streams, the portable playback devices 710 may also manage playback controls from multiple sources. These sources include physical controls on the portable playback devices 710 (e.g., the user interface 713 in FIGS. 7A-7F), a control interface on a control device 130a paired via Bluetooth, as well as control interfaces on other control devices 130 in the media playback system 100, which are connected via a local area network (e.g., the networks 104 in FIG. 1B). The control interfaces on the control device 130a paired via Bluetooth and the other control devices 130 may appear similar (e.g., FIG. 4A-4D), but transmit instructions to the portable playback devices 710 using different connections (e.g., Wi-Fi or Bluetooth). In general, management of playback controls involves when receiving a playback control input from one controllers, updating the other controllers to maintain consistency (e.g., state) across all the controllers.

Figure 11A:
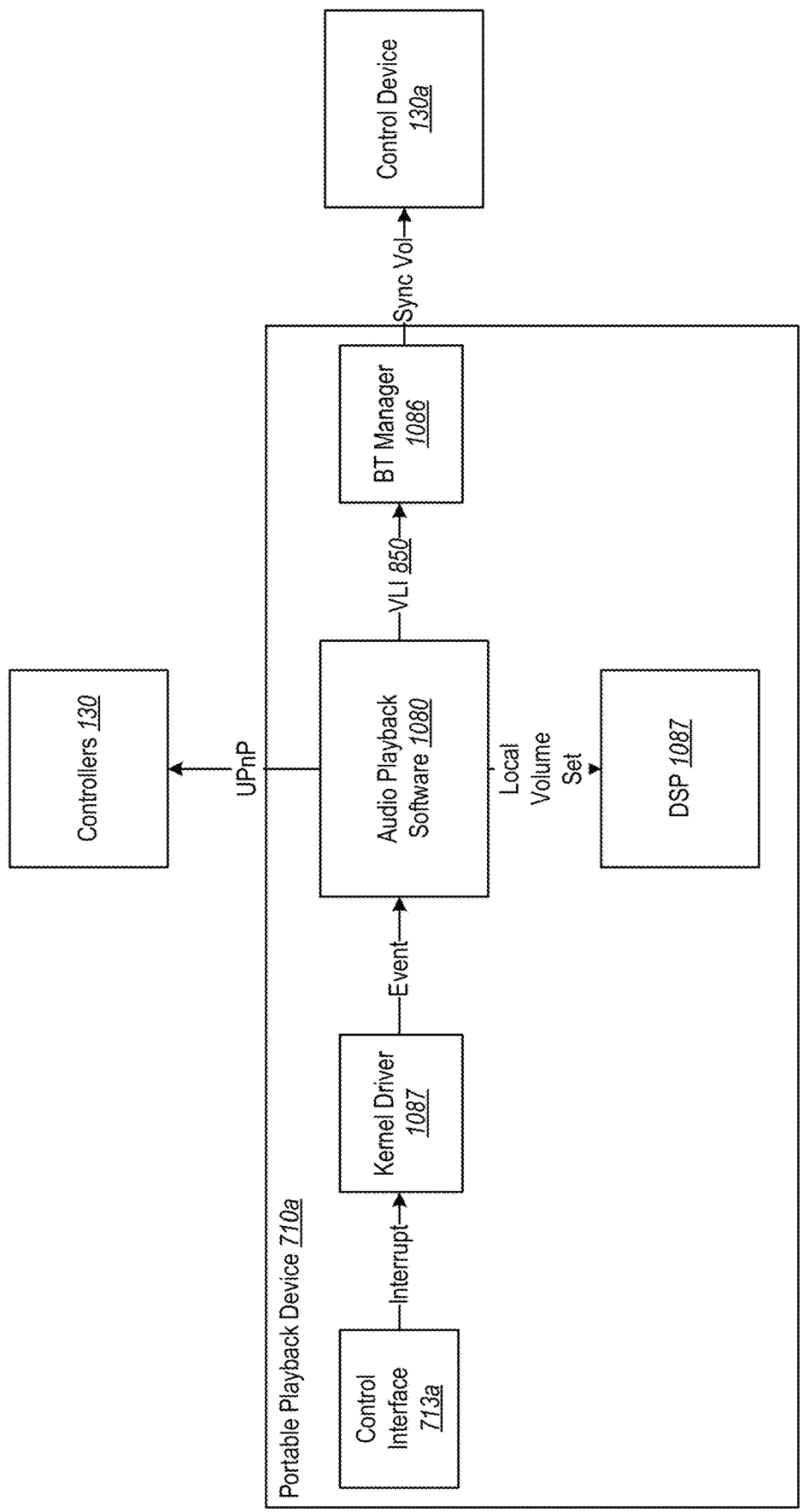
FIG. 11A is a block diagram of illustrating example management of playback controls in accordance with aspects of the disclosed technology.

FIG. 11A is a block diagram illustrating example management of a control input by the portable playback device 710a using the control interface 713a (FIGS. 10A-10B). The control input in this example is a volume up, but this control input is representative of various control inputs for transport controls (e.g., play, pause, skip, etc.) as well as other types of volume controls. Further, while the portable playback device 710a is described for purposes of illustration, other examples of the portable playback devices 710 may utilize similar management.

When the control interface 713a detects a particular input (e.g., a volume up command), the control interface 713a generates an interrupt, which is received by a kernel driver 1087. The kernel driver 1087 generates an event based on the interrupt. The event indicates the volume up command. The event is passed to the audio playback software 1080.

After receiving the event indicating the volume up command, the audio playback software 1080 notifies other controllers of the volume change. That is, the audio playback software 1080 transmits one or more messages (e.g., via universal plug and play (UPnP)) to other controllers on the network 104. These controllers 130 receive the messages, and based on receiving the messages, update their respective control interfaces to indicate the current volume (e.g., see the volume slider in FIG. 4D).

To update the volume on the paired control device 130a, the portable playback device 850 uses the VLI 850. The VLI 850 may proxy between the audio playback software 1080 by converting instructions in the domain of the audio playback software 1080 into commands in the domain of the paired control device 130a (e.g., Bluetooth profile commands). That is, the VLI 850 informs the BT manager 1086 of the volume increase. The BT manager 1086 then passes appropriate BT domain commands (e.g., an AVRCP (Audio/Video Remote Control Profile) request) back to the paired control device 130a over the BT connection (e.g., a personal area network). Based on receiving the BT domain commands, the paired control device 130a updates its control interface to indicate the current volume (e.g., see the volume slider in FIG. 4D).

The audio playback software 1080 sets the local volume. In particular, the audio playback software 1080 instructs the DSP 1087 to set the local volume on the portable playback device 710a. This changes the actual sound pressure level of the audio playback on the portable playback device 710a.

Figure 11B:
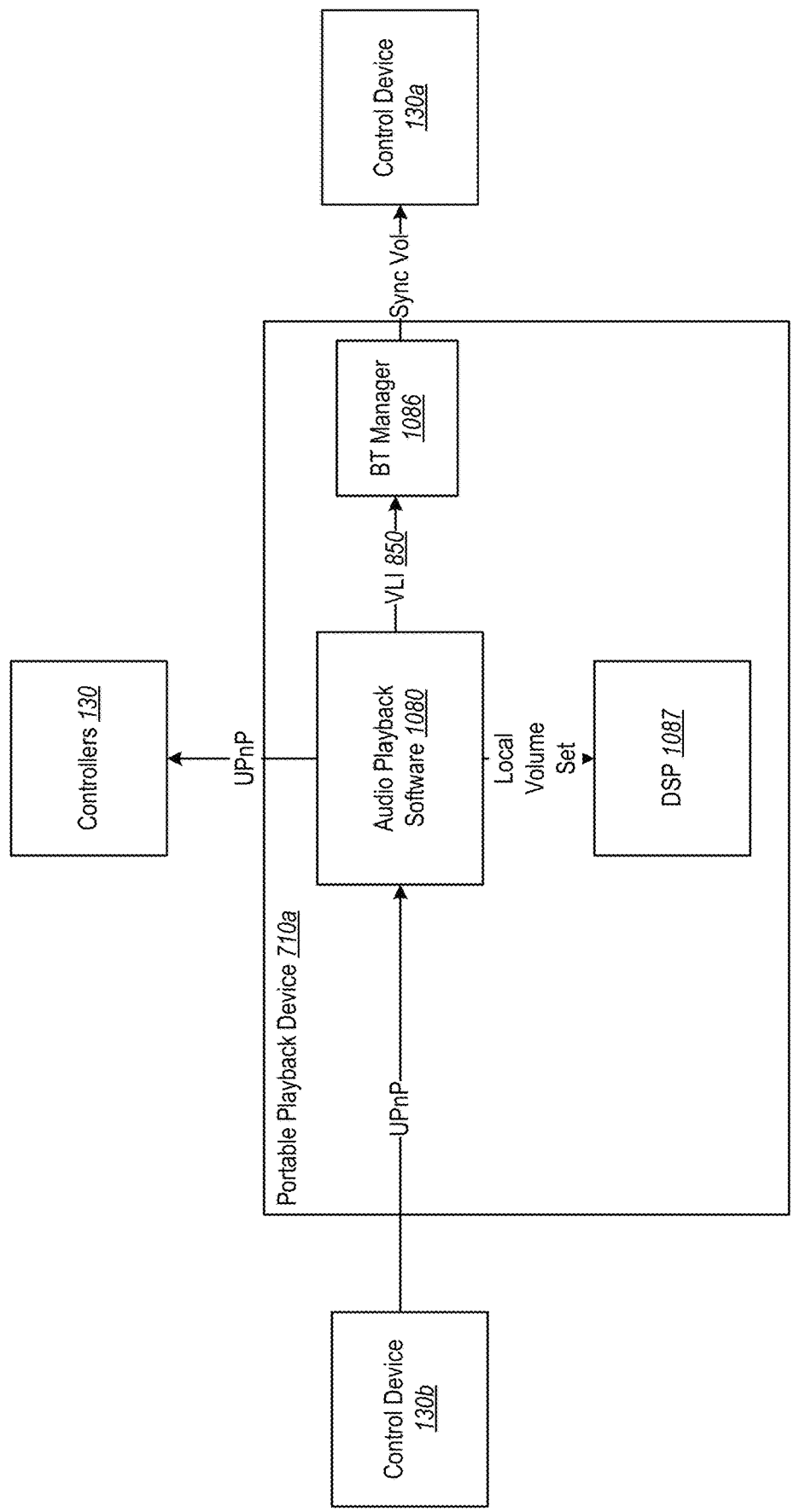
FIG. 11B is a block diagram of illustrating example management of playback controls in accordance with aspects of the disclosed technology.

FIG. 11B is a block diagram illustrating example management by the portable playback device 710a of a control input originating from a control device 130b. The control device is connected to the portable playback device via the networks 104. The control input in this example is again a volume up, but this control input is representative of various control inputs for transport controls (e.g., play, pause, skip, etc.) as well as other types of volume controls. Further, while the portable playback device 710a is described for purposes of illustration, other examples of the portable playback devices 710 may utilize similar management.

When the control device 130b detects an input represent a playback command (e.g., a movement of the volume slider in FIG. 4D), the control device 130b sends one or more messages to the playback device under control (here, the portable playback devices 710a) using a protocol (e.g., UPnP) representing the playback command (e.g., a volume up). The audio playback software receives these messages (e.g., via the network interface 712d) and updates other controllers of the change. That is, similar to FIG. 10A, the audio playback software 1080 transmits one or more messages (e.g., via universal plug and play (UPnP)) to other controllers 130 on the network 104. These controllers 130 receive the messages, and based on receiving the messages, update their respective control interfaces to indicate the current volume (e.g., see the volume slider in FIG. 4D).

Again, to update the volume on the paired control device 130a, the portable playback device 850 uses the VLI 850. That is, the VLI 850 informs the BT manager 1086 of the volume increase and the BT manager 1086 then passes appropriate BT domain commands (e.g., an AVRCP (Audio/Video Remote Control Profile) request) back to the paired control device 130a over the BT connection (e.g., a personal area network). Based on receiving the BT domain commands, the paired control device 130a updates its control interface to indicate the current volume (e.g., see the volume slider in FIG. 4D).

Also similar to FIG. 10A, the audio playback software 1080 sets the local volume. In particular, the audio playback software 1080 instructs the DSP 1087 to set the local volume on the portable playback device 710a. This changes the actual sound pressure level of the audio playback on the portable playback device 710a.

Figure 11C:
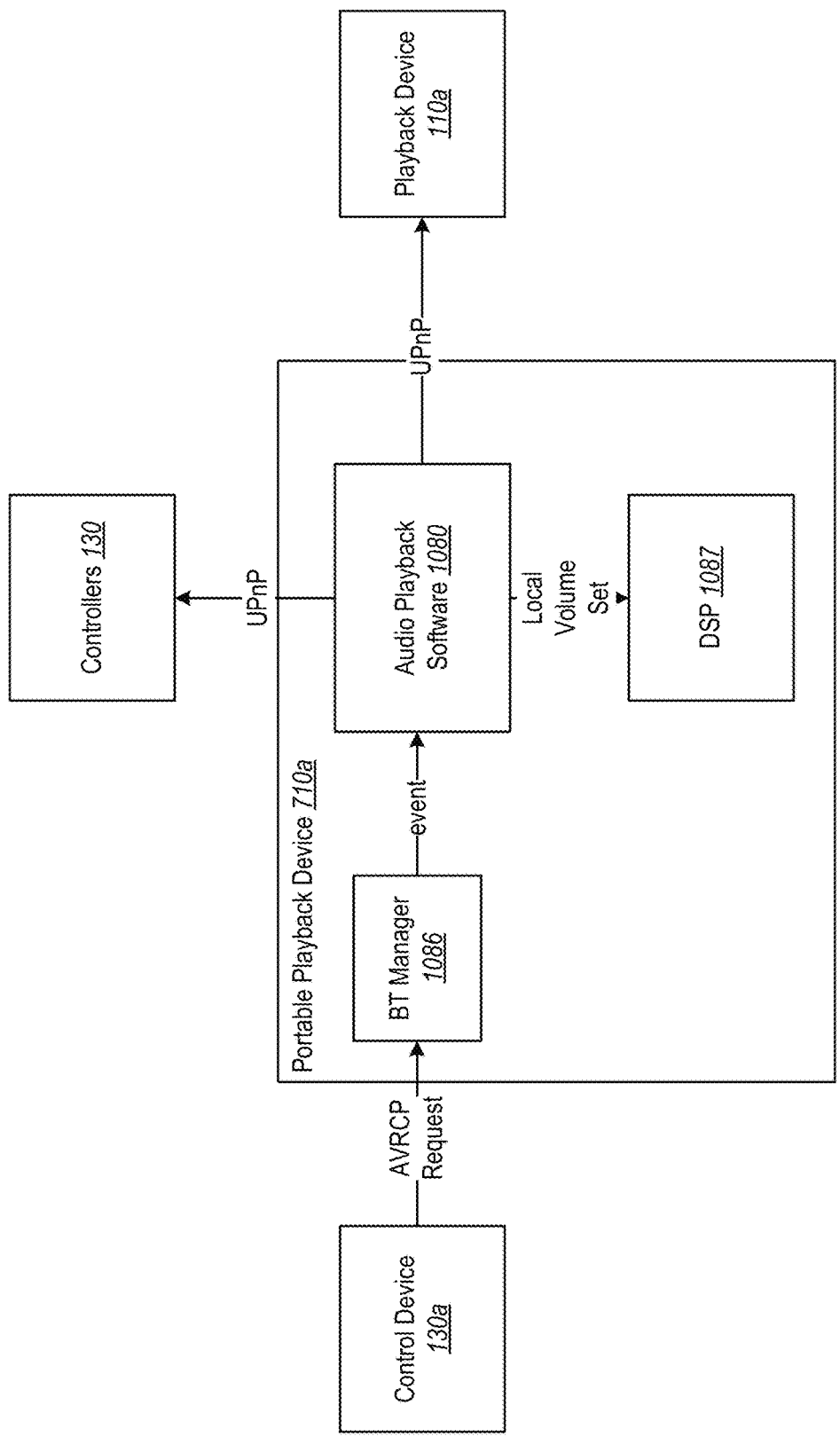
FIG. 11C is a block diagram of illustrating example management of playback controls in accordance with aspects of the disclosed technology.

FIG. 11C is a block diagram illustrating example management by the portable playback device 710a of a control input originating from a paired control device 130a. The paired control device 130a is connected to the portable playback device 130a via Bluetooth. Here, a volume up is used as a representative control input.

When the control device 130a detects an input representing a playback command (e.g., a movement of the volume slider in FIG. 4D) or a press of a volume up button, the control device 130a sends one or more Bluetooth domain messages (e.g., an AVRCP request) to the portable playback device 710. The BT manager 1086 receives these messages and generates an event indicating the volume change.

The audio playback software 1080 receives data representing the event and, based on receiving the event, sets the local volume and updates other controllers. In particular, the audio playback software 1080 transmits one or more messages (e.g., via UPnP) to other controllers 130 on the network 104. These controllers 130 receive the messages, and based on receiving the messages, update their respective control interfaces to indicate the current volume (e.g., see the volume slider in FIG. 4D). To set the local volume, the audio playback software 1080 instructs the DSP 1087 to set the local volume on the portable playback device 710a, similar to FIGS. 10A and 10B.

As described in section II, the playback devices 110 may be grouped together to play audio in synchrony. If the portable playback device 710a is in a group (e.g., with the playback device 110a (FIG. 1A), playback controls received by the portable playback device 710a are carried out not only on the portable playback device 710a, but on other group members. For instance, a volume up command increases volume on all grouped playback devices 110. To effect a corresponding volume increase on group members, the audio playback software 1080 may send one or more messages (e.g., via UPnP) to the group members. Based on receiving such messages, the group members increase their respective volumes.

Audio content via Wi-Fi or Bluetooth may be accompanied by metadata describing the content (e.g., by indicating the title, artist, album, etc.). Like controls, this metadata should be distributed to all controllers so that the metadata can be displayed during playback (e.g. as illustrated in FIGS. 4A-4D). During Wi-Fi playback, the portable playback device 710a is streaming the audio content (and data representing the associated metadata) directly. Since the portable playback device 710a has the metadata from streaming, the portable playback device 710a is configured to send one or more messages representing this metadata to the controllers 130.

Conversely, during Bluetooth playback, the portable playback device 710a is streaming the audio content (and data representing the associated metadata) indirectly via the paired control device 130a. Since the control device 130a has the metadata from streaming, the control device 130a is configured to share the metadata between apps on the control device 130a (e.g., between a streaming service app and the control application for the portable playback device). At the same time, the metadata may also be passed via the Bluetooth connection to the portable playback device 710a, which allows the portable playback device 710a to distribute the metadata to other controllers 130 when the portable playback device 710a is also connected to Wi-Fi (in addition to the Bluetooth connection).

VI. Example Techniques

Figure 12:
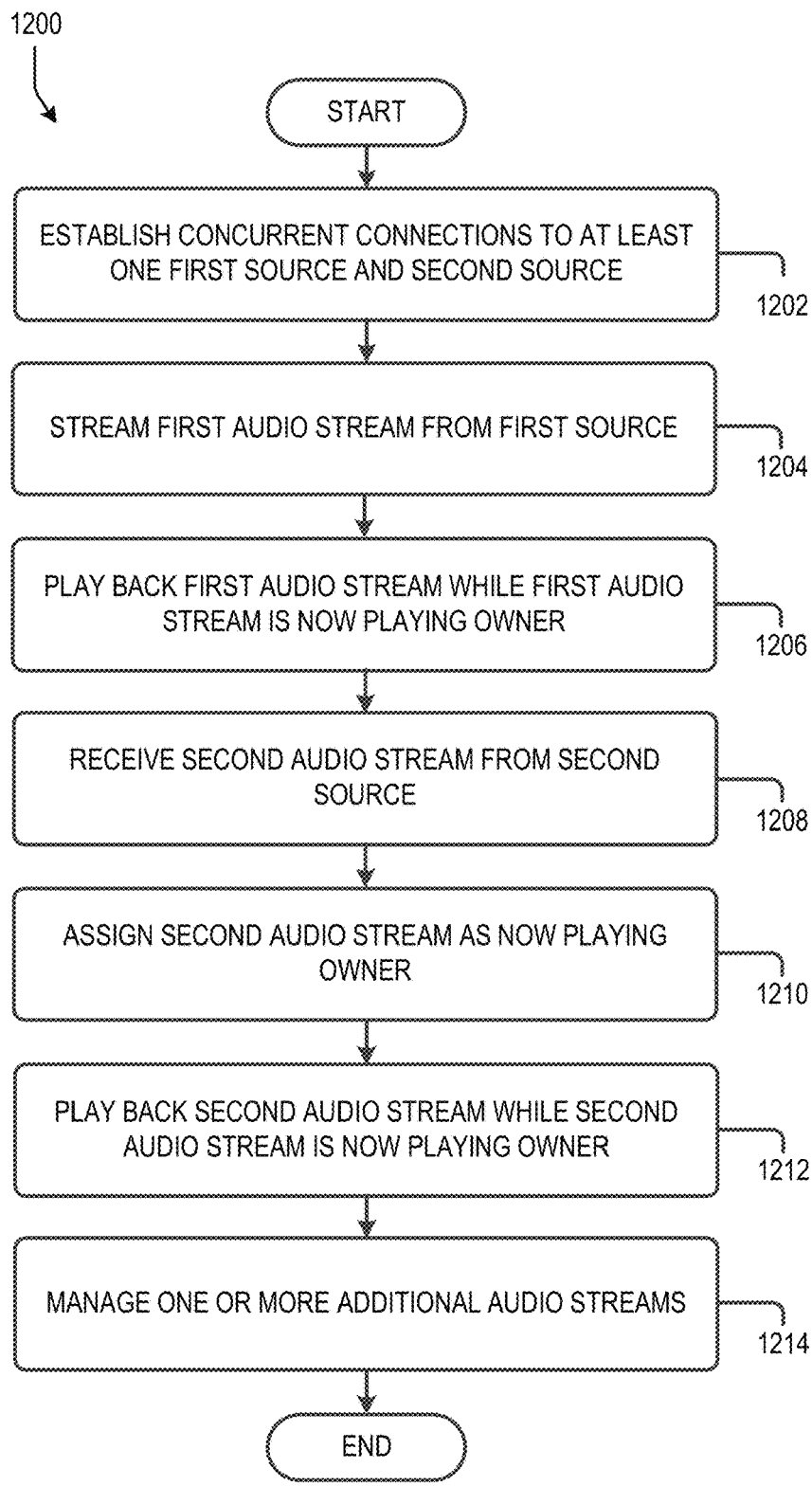
FIG. 12 is a flow diagram of an example method in accordance with aspects of the disclosed technology.

FIG. 12 is a flow diagram showing an example method 1200 to manage multiple audio streams based on one or more playback policies. The method 1000 may be performed by a portable playback device 710. Alternatively, the method 1000 may be performed by any suitable device or by a system of devices, such as the playback devices 110, NMDs 120, control devices 130, portable playback device 1720, or computing devices 106. By way of illustration, certain portions of the method 1000 are described as being performed by a portable playback device 710.

At block 1202, the method 1200 involves establishing concurrent connections to at least one first source and a second source. For example, the portable playback device 710 may establish a connection to at least one first source (e.g., one or more computing devices 106) over a first network (e.g., a Wi-Fi local area network such as the networks 104, and/or one or more wide area networks, such as the networks 102) via a first network interface (e.g., an 802.11-compatible wireless network interface). The portable playback device 710 may also establish a connection to a second source (e.g., the control device 130a) over a second network (e.g., a Bluetooth personal area network) via a second network interface (e.g., an 802.15-compatible network interface).

At block 1204, the method 1200 involves streaming a first audio stream from a first source. For instance, the portable playback device 710 may stream, via Wi-Fi, from a computing device 106, a first audio stream. While streaming the first audio stream, the first audio stream may be assigned as the now playing owner (FIG. 9-I). The first audio stream, as Wi-Fi content 961a, may be categorized as content audio 961 having a first priority (FIG. 9A).

At block 1206, the method 1200 involves playing back the first audio stream. For example, the portable playback device 710 may play back the first audio stream via at least one transducer (e.g., the transducers 714). The portable playback device 710 may play back the first audio stream while the first audio stream is assigned as the now playing owner.

At block 1208, the method 1200 involves receiving a second audio stream from a second source. For instance, the portable playback device 710 may receive, via Bluetooth, from the control device 130a, a second audio stream. The first audio stream, as BT content 961b, may be categorized as content audio 961 having a first priority (FIG. 9A).

At block 1210, the method 1200 involves assigning the second audio stream as the now playing owner. For example, the portable playback device 710 may assign a Bluetooth audio stream as the now playing owner (FIG. 9-I). Assigning the later-received second audio stream as the now playing owner may stop playback of the earlier-received audio stream according to one or more playback policies (FIG. 9H).

At block 1212, the method 1200 involves playing back the second audio stream. For example, the portable playback device 710 may play back the second audio stream via at least one transducer (e.g., the transducers 714). The portable playback device 710 may play back the second audio stream while the second audio stream is assigned as the now playing owner.

At block 1214, the method 1200 may involve managing playback of one or more additional audio streams according to playback policies (FIGS. 9A-9-I). For instance, the method 1200 may involve while playing back the first audio stream via the at least one audio transducer, receiving, from the second source via the second network interface, a third audio stream. The third audio stream may be categorized as voice assistant 962 audio having a second priority that is higher than the first priority of the content audio (FIG. 9A). The method 1200 may further involve modifying playback of the earlier-received first audio stream based on the relative categories of the first and third audio streams. Modifying playback of the earlier-received first audio stream may include ducking the first audio stream when the later-received third audio stream is categorized as voice assistant 962 audio. Based on the third audio stream having a higher priority than the first audio stream, the portable playback device 710 plays back the third audio stream concurrently with the ducked first audio stream via the at least one transducer and after the later-received third audio stream ends, stops ducking of the first audio stream. Examples of such management are described in connection with FIGS. 9C and 9D.

As another example, management of additional audio streams may involve capturing a voice input via the one or more microphones and processing the voice input via a voice assistant. While playing back the second audio stream via the at least one audio transducer, the portable playback device 710 may receive, via the native voice assistant, a fourth audio stream which is categorized as voice assistant 962 audio having the second priority. The portable playback device 710 modifies playback of the earlier-received second audio stream based on the relative categories of the second and fourth audio streams. Modifying playback of the earlier-received second audio stream may include ducking the second audio stream when the later-received fourth audio stream is categorized as voice assistant 962 audio. Based on the third audio stream having a higher priority than the first audio stream, the portable playback device 710 plays back the fourth audio stream concurrently with the ducked second audio stream via the at least one transducer, and after the later-received fourth audio stream ends, stops ducking of the second audio stream. Examples of such management are described in connection with FIGS. 9C and 9D.

In a yet another example, management of additional audio streams may involve while playing back the first audio stream via the at least one audio transducer, receiving, from the second source via the second network interface, a fifth audio stream, which is categorized as telephony audio 963 having a third priority that is higher than the first priority of the content 961 audio. The portable playback device 710 modifies playback of the earlier-received first audio stream based on the relative categories of the first and fifth audio streams. Modifying playback of the earlier-received first audio stream may include pausing the first audio stream when the later-received fifth audio stream is categorized as voice telephony audio. While the first audio stream is paused, the portable playback device 710 plays back the fifth audio stream via the at least one transducer and when the later-received fifth audio stream ends, resumes the first audio stream. Examples of such management are described in connection with FIG. 9B.

In a further example, management of additional audio streams may involve while playing back the fifth audio stream via the at least one audio transducer, receiving a sixth audio stream, which is categorized as alert audio 964 having a fourth priority that is higher than the third priority of the telephony 963 audio. The portable playback device 710 modifies playback of the earlier-received fifth audio stream based on the relative categories of the first and fifth audio streams. Modifying playback of the earlier-received fifth audio stream may include mixing the fifth audio stream with the sixth audio stream when the later-received sixth audio stream is categorized as alert 964 audio. While the fifth audio stream is mixed with the sixth audio stream, the portable playback device 710 plays back the mixed audio streams via the at least one transducer and when the later-received sixth audio stream ends, resumes the fifth audio stream. Examples of such management are described in connection with FIGS. 9E and 9G.

In another example, management of additional audio streams may involve disabling one or more voice assistants while playing back audio streams categorized as telephony audio. For instance, the portable playback device may disable built-in VA 962a audio and/or native VA 962b audio when an audio stream in the telephony 963 category. This disabling may prevent VA audio from interrupting an ongoing phone call or video-conference.

Management of additional audio streams may involve receiving, from the at least one first source via the first network interface, a seventh audio stream, which is categorized as alarm 964 audio having the fourth priority. While playing back the seventh audio stream via the at least one audio transducer, the playback device 710 may receive, from the second source via the second network interface, an eighth audio stream, which is categorized as telephony 963 audio having the third priority. According to one or more playback policies, the playback device 710 may play back the eighth audio stream instead of the seventh audio stream, even though the seventh audio stream is a higher priority. Examples of such management are described in connection with FIG. 9F.

The method 1200 may further involve other additional functions described throughout the disclosure.

Figure 13:
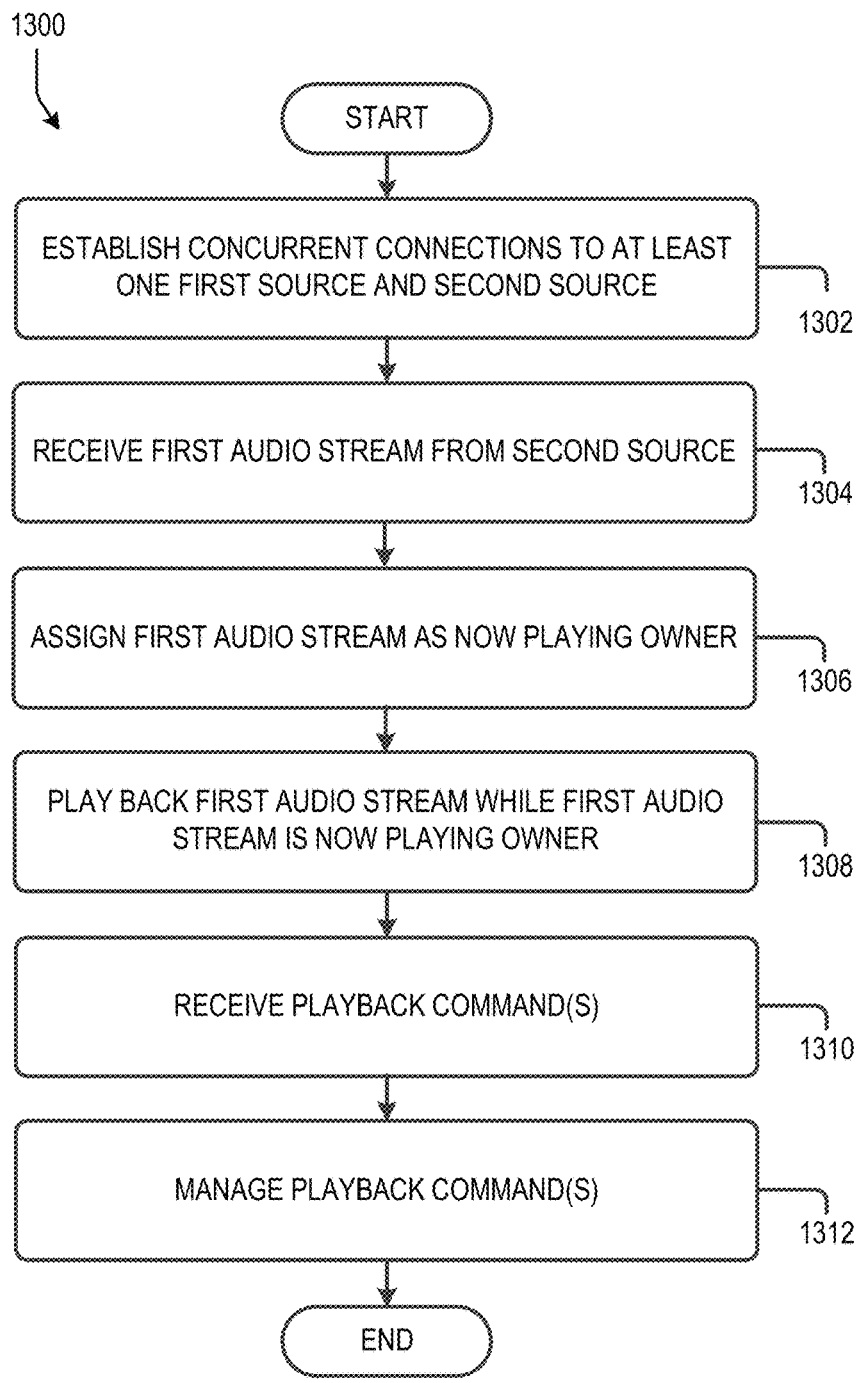
FIG. 13 is a flow diagram of an example method in accordance with aspects of the disclosed technology.

FIG. 13 is a flow diagram showing an example method 1300 to manage playback commands. The method 1300 may be performed by a portable playback device 710. Alternatively, the method 1300 may be performed by any suitable device or by a system of devices, such as the playback devices 110, NMDs 120, control devices 130, portable playback device 1720, or computing devices 106. By way of illustration, certain portions of the method 1100 are described as being performed by a portable playback device 710.

At block 1302, the method 1300 involves establishing concurrent connections to at least one first source and a second source. For example, the portable playback device 710 may establish a connection to at least one first source (e.g., one or more computing devices 106) over a first network (e.g., a Wi-Fi local area network such as the networks 104, and/or one or more wide area networks, such as the networks 102) via a first network interface (e.g., an 802.11-compatible wireless network interface). The portable playback device 710 may also establish a connection to a second source (e.g., the control device 130*a*) over a second network (e.g., a Bluetooth personal area network) via a second network interface (e.g., an 802.15-compatible network interface).

At block 1304, the method 1300 involves receiving a first audio stream from the second source. For instance, the portable playback device 710 may receive a first audio stream via Bluetooth from a control device 130*a*.

At block 1306, the method 1300 involves assigning the first audio stream as the now playing owner. For instance, the portable playback device 710 may assign the Bluetooth audio stream as the now playing owner (FIG. 9-I). The portable playback device 710 may assign the now playing owner via audio playback software (e.g., the audio playback application 1080 in FIGS. 11A-11C).

At block 1308, the method 1300 involves playing back the first audio stream. For example, the portable playback device 710 may play back the Bluetooth audio stream via at least one transducer (e.g., the transducers 714). The portable playback device 710 may play back the Bluetooth audio stream while the Bluetooth audio stream is assigned as the now playing owner.

At block 1310, the method 1300 involves receiving, via a control interface, one or more playback commands. For instance, while playing back the first audio stream, the portable playback device 710 may receive, via the control interface 713 on the portable playback device 710, input data representing a volume adjustment command (FIG. 11A). As another example, the playback device 710 may receive, via a control interface on a controller 130*b*, data representing a volume adjustment command (FIG. 11B).

In a further example, receiving the input data representing a volume adjustment command may involve the portable playback device 710 generating, via a kernel driver (e.g., the kernel drive 1087), an interrupt when a volume up portion of a physical control interface is pressed (e.g., the user interface 713). Based on generating the interrupt, the portable playback device 710 may generate, via the kernel driver, a volume change event, wherein the volume change event is transmitted to the playback software (FIG. 11A).

At block 1312, the method 1300 involves managing the playback commands. Managing the playback commands may involve carrying out the playback command and also notifying one or more controllers of the playback command, possibly via multiple interfaces (e.g., Wi-Fi and Bluetooth). For instance, the portable playback device 710 may cause, via audio playback software, a network interface manager of the second network interface (e.g., the BT manager 1086) to set a volume level associated with the second network interface according to the volume adjustment command (e.g., via an AVRCP request). Further, the portable playback device 710 may set, via the playback software, a local volume level according to the volume adjustment command (e.g., via the DSP 1087).

In another example, the portable playback device 710 may receive, via the network interface manager (e.g., the BT manager 1086) and a second network interface over the second network from the second source, data representing an additional volume adjustment command. For instance, the portable playback device 710 may receive an AVRCP request over Bluetooth from the control device 130*a* (FIG. 11C). Based on receiving the data representing the additional volume adjustment command: the portable playback device 710 sets, via the network interface manager, the volume level associated with the second network interface according to the additional volume adjustment command, and causes the playback software to adjust the local volume setting according to the additional volume adjustment command (FIG. 11C).

The method 1300 may further involve other additional functions described throughout the disclosure.

Figure 14:
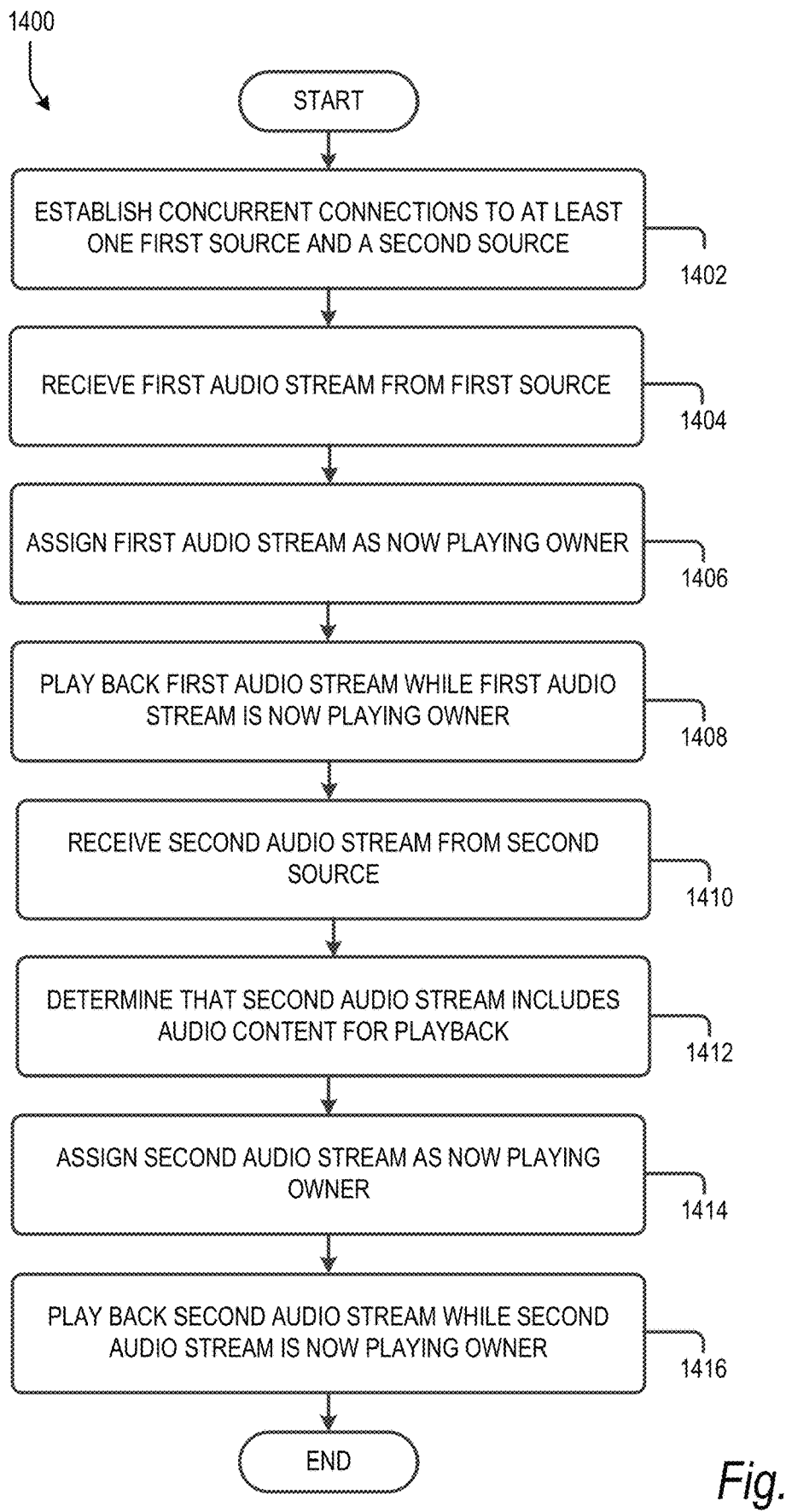
FIG. 14 is a flow diagram of an example method in accordance with aspects of the disclosed technology.

FIG. 14 is a flow diagram showing an example method 1400 to manage concurrent audio streams. The method 1400 may be performed by a portable playback device 710. Alternatively, the method 1400 may be performed by any suitable device or by a system of devices, such as the playback devices 110, NMDs 120, control devices 130, portable playback device 1720, or computing devices 106. By way of illustration, certain portions of the method 1100 are described as being performed by a portable playback device 710.

At block 1402, the method 1400 involves establishing concurrent connections to at least one first source and a second source. For example, the portable playback device 710 may establish a connection to at least one first source (e.g., one or more computing devices 106) over a first network (e.g., a Wi-Fi local area network such as the networks 104, and/or one or more wide area networks, such as the networks 102) via a first network interface (e.g., an 802.11-compatible wireless network interface). The portable playback device 710 may also establish a connection to a second source (e.g., the control device 130*a*) over a second network (e.g., a Bluetooth personal area network) via a second network interface (e.g., an 802.15-compatible network interface).

At block 1404, the method 1400 involves receiving a first audio stream from the first source. For instance, the portable playback device 710 may stream, via Wi-Fi, from a computing device 106, a first audio stream.

At block 1406, the method 1400 involves assigning the first audio stream as the now playing owner. For instance, the portable playback device 710 may assign the Wi-Fi audio stream as the now playing owner (FIG. 9-I).

At block 1408, the method 1400 involves playing back the first audio stream. For example, the portable playback device 710 may play back the Wi-Fi audio stream via at least one transducer (e.g., the transducers 714). The portable playback device 710 may play back the Wi-Fi audio stream while the Wi-Fi audio stream is assigned as the now playing owner.

At block 1410, the method 1400 involves receiving a second audio stream from the second source. For instance, the portable playback device 710 may stream, via Bluetooth from a control device 130*a*, a second audio stream. At least a portion of the second audio stream may be concurrent with the first audio stream.

At block 1412, the method 1400 involves determining that the second audio stream includes audio content for playback. Determining that the second audio stream includes audio content for playback may include monitoring, via a silence detector, the second audio stream, and while monitoring the second audio stream, determining that the second audio stream includes at least a threshold period of non-silence. In some examples, determining that the second audio stream includes audio content for playback may include the method 1000 or aspects thereof (FIG. 10A).

At block 1414, the method 1400 involves assigning the second audio stream as the now playing owner. For instance, the portable playback device 710 may assign the Bluetooth audio stream as the now playing owner (FIG. 9-I).

At block 1416, the method 1400 involves playing back the second audio stream. For example, the portable playback device 710 may play back the Bluetooth audio stream via at least one transducer (e.g., the transducers 714). The portable playback device 710 may play back the Bluetooth audio stream while the Bluetooth audio stream is assigned as the now playing owner.

In further examples, the method 1400 may include one or more aspects of the method 1000 in FIG. 10A. The method 1400 may further involve other additional functions described throughout the disclosure.

VII. Conclusion

The above discussions relating to portable playback devices, playback devices, control devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example 1

A method to be performed by a system comprising a portable playback device, the method comprising: establishing concurrent connections to (i) at least one first source over a first network via a first network interface and (ii) a second source over a second network via a second network interface; streaming, from the at least one first source via the first network interface, a first audio stream, wherein the first audio stream is categorized as content audio having a first priority; while the first audio stream is assigned as a now playing owner, playing back the first audio stream via the at least one transducer; while playing back the first audio stream via the at least one audio transducer, receiving, from the second source via the second network interface, a second audio stream, wherein the second audio stream is categorized as content audio having the first priority; assigning the later-received second audio stream as the now playing owner, wherein assigning the later-received second audio stream stops playback of the earlier-received first audio stream; and while the second audio stream is assigned as the now playing owner, playing back the second audio stream via the at least one transducer.

Example 2

The method of Example 1, further comprising: while playing back the first audio stream via the at least one audio transducer, receiving, from the second source via the second network interface, a third audio stream, wherein the third audio stream is categorized as voice assistant audio having a second priority that is higher than the first priority of the content audio; modifying playback of the earlier-received first audio stream based on the relative categories of the first and third audio streams, wherein modifying playback of the earlier-received first audio stream comprises ducking the first audio stream when the later-received third audio stream is categorized as voice assistant audio; based on the third audio stream having a higher priority than the first audio stream, playing back the third audio stream concurrently with the ducked first audio stream via the at least one transducer; and after the later-received third audio stream ends, stopping ducking of the first audio stream.

Example 3

The method of Example 2, wherein the portable playback device comprises one or more microphones, and wherein the method further comprises: capturing a voice input via the one or more microphones; processing the voice input via a native voice assistant; while playing back the second audio stream via the at least one audio transducer, receiving, via the native voice assistant, a fourth audio stream, wherein the fourth audio stream is categorized as voice assistant audio having the second priority; modifying playback of the earlier-received second audio stream based on the relative categories of the second and fourth audio streams, wherein modifying playback of the earlier-received second audio stream comprises ducking the second audio stream when the later-received fourth audio stream is categorized as voice assistant audio; based on the third audio stream having a higher priority than the first audio stream, playing back the fourth audio stream concurrently with the ducked second audio stream via the at least one transducer; and after the later-received fourth audio stream ends, stopping ducking of the second audio stream.

Example 4

The method of any of Examples 1-3, further comprising: while playing back the first audio stream via the at least one audio transducer, receiving, from the second source via the second network interface, a fifth audio stream, wherein the fifth audio stream is categorized as telephony audio having a third priority that is higher than the first priority of the content audio; modifying playback of the earlier-received first audio stream based on the relative categories of the first and fifth audio streams, wherein modifying playback of the earlier-received first audio stream comprises pausing the first audio stream when the later-received fifth audio stream is categorized as voice telephony audio; while the first audio stream is paused, playing back the fifth audio stream via the at least one transducer; and when the later-received fifth audio stream ends, resuming the first audio stream.

Example 5

The method of Example 4, further comprising: while playing back the fifth audio stream via the at least one audio transducer, receiving a sixth audio stream, wherein the sixth audio stream is categorized as alert audio having a fourth priority that is higher than the third priority of the telephony audio; modifying playback of the earlier-received fifth audio stream based on the relative categories of the first and fifth audio streams, wherein modifying playback of the earlier-received fifth audio stream comprises mixing the fifth audio stream with the sixth audio stream when the later-received sixth audio stream is categorized as alert audio; while the fifth audio stream is mixed with the sixth audio stream, playing back the mixed audio streams via the at least one transducer; and when the later-received sixth audio stream ends, resuming the fifth audio stream.

Example 6

The method of Example 4, further comprising: disabling one or more voice assistants while playing back audio streams categorized as telephony audio.

Example 7

The method of any of Examples 1-6, further comprising: receiving, from the at least one first source via the first network interface, a seventh audio stream, wherein the seventh audio stream is categorized as alarm audio having the fourth priority; while the seventh audio stream is assigned to the now playing owner, playing back the seventh audio stream via the at least one transducer; while playing back the seventh audio stream via the at least one audio transducer, receiving, from the second source via the second network interface, an eighth audio stream, wherein the eighth audio stream is categorized as telephony audio having the third priority; assigning the later-received eighth audio stream to the now playing owner, wherein assigning the later-received eighth audio stream stops playback of the earlier-received seventh audio stream; and while the eighth audio stream is assigned to the now playing owner, playing back the eighth audio stream via the at least one transducer.

Example 8

The method of any of Examples 1-7, further comprising: while the second audio stream is assigned to the now playing owner, detecting a period of inactivity where audio is not played back from the second source; and based on detecting the period of inactivity, assigning the first audio stream to the now playing owner and disconnecting from the second source.

Example 9

The method of Example 8, wherein the second source is a mobile device, and wherein the functions further comprise: while disconnected from the mobile device, detecting, via a control interface, input data representing a command to resume playback; and based on detecting the input data representing a command to resume playback, re-establishing the connection to the mobile device.

Example 10

The method of any of Examples 1-9, further comprising: detecting, via a control interface, input data representing one or more playback commands; and applying the one or more playback commands to the currently-assigned audio stream in the now playing owner.

Example 11

The method of Example 10, wherein the system further comprises at least one additional playback device, and wherein the method further comprises: while the portable playback device is in a synchrony group with the at least one additional playback device, detecting, via a control interface, input data representing a volume adjustment; applying the volume adjustment to the portable playback device; and causing, via the first network interface, the at least one additional playback device to apply the volume adjustment.

Example 12

The method of Example 10, wherein the first network interface comprises an 802.11-compatible wireless network interface and the first network is a wireless local area network, and wherein the second network interface comprises an 802.15-compatible wireless network interface and the second network comprises a personal area network.

Example 13

A system configured to perform the methods of any of Examples 1-12.

Example 14

A tangible, non-transitory, computer-readable medium having instructions stored thereon that are executable by one or more processors to cause a system to perform the methods of any one of Examples 1-12.

Example 15

A device configured to perform the methods of any of Examples 1-12.

Example 16

A method to be performed by a system comprising a portable playback device, the method comprising: establishing concurrent connections to (i) a first source over a first network via the first network interface and (ii) a second source over a second network via the second network interface; receiving, from the second source via second first network interface, a first audio stream; assigning, via playback software, the first audio stream as a now playing owner; while the first audio stream is assigned as the now playing owner, playing back the first audio stream via the playback software and the at least one transducer; while playing back the first audio stream, receiving, via a control interface, an input representing a volume adjustment command; and based on receiving the input representing a volume adjustment command, (i) causing, via the playback software, a network interface manager of the second network interface to set a volume level associated with the second network interface according to the volume adjustment command and (ii) setting, via the playback software, a local volume level according to the volume adjustment command.

Example 17

The method of Example 16, further comprising: receiving, via the network interface manager and the second network interface over the second network from the second source, data representing an additional volume adjustment command; and based on receiving the data representing the additional volume adjustment command: (i) setting, via the network interface manager, the volume level associated with the second network interface according to the additional volume adjustment command, and (ii) causes the playback software to adjust the local volume setting according to the additional volume adjustment command.

Example 18

The method of any of Examples 16-17, wherein the control interface comprises a physical control interface carried by a housing of the portable playback device, and wherein receiving the input representing the volume adjustment command comprises: generating, via a kernel driver, an interrupt when a volume up portion of the physical control interface is pressed; and based on generating the interrupt, generating, via the kernel driver, a volume change event, wherein the volume change event is transmitted to the playback software.

Example 19

The method of any of Examples 16-18, wherein receiving the input representing the volume adjustment command comprises: receiving, via the first network interface over the first network from a control device, data representing the volume adjustment command, wherein the control device comprises a control application comprising volume adjustment controls.

Example 20

The method of any of Examples 16-19, further comprising: based on setting the local volume level according to the volume adjustment command, sending, via the first network interface over the first network to one or more control devices, data representing a volume change event, wherein the volume change event causes the one or more control devices to update respective control interfaces to indicate an adjusted volume level.

Example 21

The method of any of Examples 16-20, further comprising: while the first audio stream is assigned as the now playing owner, receiving, via the second network interface over the second network, data representing metadata corresponding to one or more audio tracks in the first audio stream; and sending the metadata into a virtual line-in, wherein sending the metadata into the virtual line-in causes one or more control devices to update respective control interfaces to indicate the metadata.

Example 22

A system configured to perform the methods of any of Examples 16-21.

Example 23

A tangible, non-transitory, computer-readable medium having instructions stored thereon that are executable by one or more processors to cause a system to perform the methods of any one of Examples 16-21.

Example 24

A device configured to perform the methods of any of Examples 16-21.

Example 25

A method to be performed by a system comprising a portable playback device, the method comprising: establishing concurrent connections to (i) a first source over a first network via a first network interface and (ii) a second source over a second network via a second network interface; receiving, from the first source via the first network interface, a first audio stream; assigning the first audio stream as a now playing owner; while the first audio stream is assigned as the now playing owner, playing back the first audio stream via at least one transducer; while the first audio stream is assigned as the now playing owner, receiving, from the second source via the second network interface, a second audio stream; determining that the second audio stream includes audio content for playback, wherein determining that the second audio stream includes audio content for playback comprises: monitoring, via a silence detector, the second audio stream; and while monitoring the second audio stream, determining that the second audio stream includes at least a threshold period of non-silence; based on determining that the second audio stream includes audio content for playback, assigning the second audio stream as the now playing owner; and while the second audio stream is assigned as the now playing owner, playing back the second audio stream via the at least one transducer.

Example 26

The method of Example 25, further comprising: while monitoring the second audio stream, generating, via the silence detector, a silence-detected event when at least a threshold period of silence is detected in the second audio stream.

Example 27

The method of Example 26, wherein determining that the second audio stream includes at least the threshold period of non-silence comprises: after generating the silence-detected event, generating, via the silence detector, a non-silence-detected event when at least the threshold period of non-silence is detected in the second audio stream following the silence-detected event, and wherein assigning the second audio stream as the now playing owner comprises assigning the second audio stream as the now playing owner when the non-silence-detected event is generated.

Example 28

The method of Example 27, further comprising: after receiving the second audio stream, preventing playback of the second audio stream until the non-silence-detected event is detected, wherein preventing playback of the second audio stream comprises at least one of (a) dropping frames of the second audio stream and (b) muting the second audio stream.

Example 29

The method of Example 27, further comprising: while monitoring the second audio stream, generating, via the silence detector, an additional silence-detected event when at least the threshold period of silence is detected in the second audio stream; and after generating the additional silence-detected event, preventing playback of the second audio stream when the threshold period of non-silence is not detected in the second audio stream following the additional silence-detected event, wherein preventing playback of the second audio stream comprises at least one of (a) dropping frames of the second audio stream and (b) muting the second audio stream.

Example 30

The method of any of Examples 25-29, further comprising: after receiving the second audio stream, assigning the second audio stream to the silence detector, wherein the silence detector receives the second audio stream while the second audio stream is assigned to the silence detector.

Example 31

The method of any of Examples 25-30, further comprising: while the first audio stream is assigned to the as the now playing owner, receiving, from the second source via the second network interface, a third audio stream; detecting a play event corresponding to the third audio stream; and based on detecting the play event: (i) assigning the third audio stream as the now playing owner and (ii) foregoing determining that the second audio stream includes audio content for playback.

Example 32

The method of any of Examples 25-31, further comprising: while the first audio stream is assigned as the now playing owner, receiving, from the second source via the second network interface, a fourth audio stream; determining that the fourth audio stream does not include audio content for playback, wherein determining that the fourth audio stream does not include audio content for playback comprises: monitoring, via the silence detector, the fourth audio stream and while monitoring the second audio stream, determining that the second audio stream includes at least the threshold period of silence; and based on determining that the fourth audio stream does not include audio content for playback: (i) foregoing assigning the fourth audio stream as the now playing owner and (ii) preventing playback of the fourth audio stream.

Example 33

The method of any of Examples 25-32, further comprising: while the second audio stream is assigned as the now playing owner, detecting a period of inactivity; and based on detecting the period of inactivity, disconnecting the connection to the second source over the second network via the second network interface.

Example 34

The method of Example 33, further comprising: detecting, via a control interface, a particular input representing a command to re-establish a connection via the second network interface; and based on detecting the particular input, attempting to re-establish a connection to a last-connected source over the second network via the second network interface, wherein the second source is the last-connected source.

Example 35

The method of Example 34, further comprising: when the attempt to re-establish the connection to the second source over the second network via the second network interface is unsuccessful, attempting to re-establish a connection to one or more additional sources in a list of previously-connected sources over the second network via the second network interface until a connection attempt is successful.

Example 36

The method of Example 35, further comprising: attempting to re-establish the connection to one or more additional sources in the list of previously-connected sources are unsuccessful, entering a pairing mode to connected another source to the playback device via the second network interface.

Example 37

A system configured to perform the methods of any of Examples 25-36.

Example 38

A tangible, non-transitory, computer-readable medium having instructions stored thereon that are executable by one or more processors to cause a system to perform the methods of any one of Examples 25-36.

Example 39

A device configured to perform the methods of any of Examples 25-36.

We claim:

1. A system comprising a portable playback device, the portable playback device comprising:
   at least one audio transducer;
   at least one battery;
   a first network interface comprising at least one first antenna;
   a second network interface comprising at least one second antenna;
   at least one processor;
   data storage; and
   program instructions stored on the data storage that, when executed by the at least one processor, cause the portable playback device to perform functions comprising:
      establishing concurrent connections to (i) at least one first source over a first network via the first network interface and (ii) a second source over a second network via the second network interface;
      streaming, from the at least one first source via the first network interface, a first audio stream, wherein the first audio stream is categorized as content audio having a first priority;
      while the first audio stream is assigned as a now playing owner, playing back the first audio stream via the at least one audio transducer;
      while playing back the first audio stream via the at least one audio transducer, receiving, from the second source via the second network interface, a second audio stream, wherein the second audio stream is categorized as content audio having the first priority;
      assigning the later-received second audio stream as the now playing owner, wherein assigning the later-received second audio stream stops playback of the earlier-received first audio stream;
      while the second audio stream is assigned as the now playing owner, playing back the second audio stream via the at least one audio transducer;
      while the second audio stream is assigned as the now playing owner, detecting a period of inactivity where audio is not played back from the second source; and
      based on detecting the period of inactivity, assigning the first audio stream to the now playing owner and disconnecting from the second source.

2. The system of claim 1, wherein the functions further comprise:
   while playing back the first audio stream via the at least one audio transducer, receiving, from the second source via the second network interface, a third audio stream, wherein the third audio stream is categorized as voice assistant audio having a second priority that is higher than the first priority of the content audio;
   modifying playback of the earlier-received first audio stream based on the relative categories of the first and third audio streams, wherein modifying playback of the earlier-received first audio stream comprises ducking the first audio stream when the later-received third audio stream is categorized as voice assistant audio;
   based on the third audio stream having a higher priority than the first audio stream, playing back the third audio stream concurrently with the ducked first audio stream via the at least one audio transducer; and
   after the later-received third audio stream ends, stopping ducking of the first audio stream.

3. The system of claim 2, wherein the portable playback device comprises one or more microphones, and wherein the functions further comprise:
   capturing a voice input via the one or more microphones;
   processing the voice input via a native voice assistant;
   while playing back the second audio stream via the at least one audio transducer, receiving, via the native voice assistant, a fourth audio stream, wherein the fourth audio stream is categorized as voice assistant audio having the second priority;
   modifying playback of the earlier-received second audio stream based on the relative categories of the second and fourth audio streams, wherein modifying playback of the earlier-received second audio stream comprises ducking the second audio stream when the later-received fourth audio stream is categorized as voice assistant audio;
   based on the third audio stream having a higher priority than the first audio stream, playing back the fourth audio stream concurrently with the ducked second audio stream via the at least one audio transducer; and
   after the later-received fourth audio stream ends, stopping ducking of the second audio stream.

4. The system of claim 1, wherein the functions further comprise:
   while playing back the first audio stream via the at least one audio transducer, receiving, from the second source via the second network interface, a fifth audio stream, wherein the fifth audio stream is categorized as telephony audio having a third priority that is higher than the first priority of the content audio;
   modifying playback of the earlier-received first audio stream based on the relative categories of the first and fifth audio streams, wherein modifying playback of the earlier-received first audio stream comprises pausing the first audio stream when the later-received fifth audio stream is categorized as voice telephony audio;
   while the first audio stream is paused, playing back the fifth audio stream via the at least one audio transducer; and
   when the later-received fifth audio stream ends, resuming the first audio stream.

5. The system of claim 4, wherein the functions further comprise:
   while playing back the fifth audio stream via the at least one audio transducer, receiving a sixth audio stream, wherein the sixth audio stream is categorized as alert audio having a fourth priority that is higher than the third priority of the telephony audio;
   modifying playback of the earlier-received fifth audio stream based on the relative categories of the first and fifth audio streams, wherein modifying playback of the earlier-received fifth audio stream comprises mixing the fifth audio stream with the sixth audio stream when the later-received sixth audio stream is categorized as alert audio;
   while the fifth audio stream is mixed with the sixth audio stream, playing back the mixed audio streams via the at least one audio transducer; and
   when the later-received sixth audio stream ends, resuming the fifth audio stream.

6. The system of claim 4, wherein the functions further comprise:
   disabling one or more voice assistants while playing back audio streams categorized as telephony audio.

7. The system of claim 5, wherein the functions further comprise:
   receiving, from the at least one first source via the first network interface, a seventh audio stream, wherein the seventh audio stream is categorized as alarm audio having the fourth priority;
   while the seventh audio stream is assigned to the now playing owner, playing back the seventh audio stream via the at least one audio transducer;
   while playing back the seventh audio stream via the at least one audio transducer, receiving, from the second source via the second network interface, an eighth audio stream, wherein the eighth audio stream is categorized as telephony audio having the third priority;
   assigning the later-received eighth audio stream to the now playing owner, wherein assigning the later-received eighth audio stream stops playback of the earlier-received seventh audio stream; and
   while the eighth audio stream is assigned to the now playing owner, playing back the eighth audio stream via the at least one audio transducer.

8. The system of claim 1, wherein the second source is a mobile device, and wherein the functions further comprise:
   while disconnected from the mobile device, detecting, via a control interface, input data representing a command to resume playback; and
   based on detecting the input data representing a command to resume playback, re-establishing the connection to the mobile device.

9. The system of claim 1, wherein the functions further comprise:
   detecting, via a control interface, input data representing one or more playback commands; and
   applying the one or more playback commands to the currently-assigned audio stream in the now playing owner.

10. The system of claim 1, wherein the system further comprises at least one additional playback device, and wherein the functions further comprise:
    while the portable playback device is in a synchrony group with the at least one additional playback device, detecting, via a control interface, input data representing a volume adjustment;
    applying the volume adjustment to the portable playback device; and
    causing, via the first network interface, the at least one additional playback device to apply the volume adjustment.

11. The system of claim 1, wherein the first network interface comprises an 802.11-compatible wireless network interface and the first network is a wireless local area network, and wherein the second network interface comprises an 802.15-compatible wireless network interface and the second network comprises a personal area network.

12. A portable playback device comprising:
    at least one audio transducer;
    at least one battery;
    a first network interface comprising at least one first antenna;
    a second network interface comprising at least one second antenna;
    at least one processor;
    data storage including instructions that are executable by the at least one processor such that the portable playback device is configured to:
    establish concurrent connections to (i) at least one first source over a first network via the first network interface and (ii) a second source over a second network via the second network interface;
    stream, from the at least one first source via the first network interface, a first audio stream, wherein the first audio stream is categorized as content audio having a first priority;
    while the first audio stream is assigned as a now playing owner, play back the first audio stream via the at least one audio transducer;
    during playback of the first audio stream via the at least one audio transducer, receive, from the second source via the second network interface, a second audio stream, wherein the second audio stream is categorized as content audio having the first priority;
    assign the later-received second audio stream as the now playing owner, wherein assignment of the later-received second audio stream stops playback of the earlier-received first audio stream;
    while the second audio stream is assigned as the now playing owner, play back the second audio stream via the at least one audio transducer;
    while the second audio stream is assigned to the now playing owner, detect a period of inactivity where audio is not played back from the second source; and
    based on detection of the period of inactivity, assign the first audio stream to the now playing owner and disconnect from the second source.

13. The portable playback device of claim 12, wherein the data storage further comprises instructions that are executable by the at least one processor such that the portable playback device is configured to:
    while playing back the first audio stream via the at least one audio transducer, receive, from the second source via the second network interface, a third audio stream, wherein the third audio stream is categorized as voice assistant audio having a second priority that is higher than the first priority of the content audio;
    modify playback of the earlier-received first audio stream based on the relative categories of the first and third audio streams, wherein the instructions that are executable by the at least one processor such that the portable playback device is configured to modify playback of the earlier-received first audio stream comprise instructions that are executable by the at least one processor such that the portable playback device is configured to duck the first audio stream when the later-received third audio stream is categorized as voice assistant audio;
    based on the third audio stream having a higher priority than the first audio stream, play back the third audio stream concurrently with the ducked first audio stream via the at least one audio transducer; and
    after the later-received third audio stream ends, stop ducking of the first audio stream.

14. The portable playback device of claim 13, wherein the portable playback device comprises one or more microphones, and wherein the data storage further comprises instructions that are executable by the at least one processor such that the portable playback device is configured to:
    capture a voice input via the one or more microphones;
    process the voice input via a native voice assistant;
    during playback of the second audio stream via the at least one audio transducer, receive, via the native voice assistant, a fourth audio stream, wherein the fourth audio stream is categorized as voice assistant audio having the second priority;
    modify playback of the earlier-received second audio stream based on the relative categories of the second and fourth audio streams, wherein the instructions that are executable by the at least one processor such that the portable playback device is configured to modify playback of the earlier-received first audio stream comprise instructions that are executable by the at least one processor such that the portable playback device is configured to duck the second audio stream when the later-received fourth audio stream is categorized as voice assistant audio;

based on the third audio stream having a higher priority than the first audio stream, play back the fourth audio stream concurrently with the ducked second audio stream via the at least one audio transducer; and after the later-received fourth audio stream ends, stop ducking of the second audio stream.

15. The portable playback device of claim 12, wherein the data storage further comprises instructions that are executable by the at least one processor such that the portable playback device is configured to:

during playback of the first audio stream via the at least one audio transducer, receive, from the second source via the second network interface, a fifth audio stream, wherein the fifth audio stream is categorized as telephony audio having a third priority that is higher than the first priority of the content audio;

modify playback of the earlier-received first audio stream based on the relative categories of the first and fifth audio streams, wherein the instructions that are executable by the at least one processor such that the portable playback device is configured to modify playback of the earlier-received first audio stream comprise instructions that are executable by the at least one processor such that the portable playback device is configured to pause the first audio stream when the later-received fifth audio stream is categorized as voice telephony audio;

while the first audio stream is paused, play back the fifth audio stream via the at least one audio transducer; and when the later-received fifth audio stream ends, resume the first audio stream.

16. The portable playback device of claim 15, wherein the data storage further comprises instructions that are executable by the at least one processor such that the portable playback device is configured to:

during playback of the fifth audio stream via the at least one audio transducer, receive a sixth audio stream, wherein the sixth audio stream is categorized as alert audio having a fourth priority that is higher than the third priority of the telephony audio;

modify playback of the earlier-received fifth audio stream based on the relative categories of the first and fifth audio streams, wherein the instructions that are executable by the at least one processor such that the portable playback device is configured to modify playback of the earlier-received fifth audio stream comprise instructions that are executable by the at least one processor such that the portable playback device is configured to mix the fifth audio stream with the sixth audio stream when the later-received sixth audio stream is categorized as alert audio;

while the fifth audio stream is mixed with the sixth audio stream, play back the mixed audio streams via the at least one audio transducer; and when the later-received sixth audio stream ends, resume the fifth audio stream.

17. The portable playback device of claim 16, wherein the data storage further comprises instructions that are executable by the at least one processor such that the portable playback device is configured to:

receive, from the at least one first source via the first network interface, a seventh audio stream, wherein the seventh audio stream is categorized as alarm audio having the fourth priority;

while the seventh audio stream is assigned to the now playing owner, play back the seventh audio stream via the at least one audio transducer;

during playback of the seventh audio stream via the at least one audio transducer, receive, from the second source via the second network interface, an eighth audio stream, wherein the eighth audio stream is categorized as telephony audio having the third priority;

assign the later-received eighth audio stream to the now playing owner, wherein assignment of the later-received eighth audio stream stops playback of the earlier-received seventh audio stream; and while the eighth audio stream is assigned to the now playing owner, play back the eighth audio stream via the at least one audio transducer.

18. The portable playback device of claim 12, wherein the second source is a mobile device, and wherein the data storage further comprises instructions that are executable by the at least one processor such that the portable playback device is configured to:

while disconnected from the mobile device, detecting, via a control interface, input data representing a command to resume playback; and based on detecting the input data representing a command to resume playback, re-establishing the connection to the mobile device.

19. The portable playback device of claim 12, wherein the first network interface comprises an 802.11-compatible wireless network interface and the first network is a wireless local area network, and wherein the second network interface comprises an 802.15-compatible wireless network interface and the second network comprises a personal area network.

20. A tangible, non-transitory computer-readable medium having stored thereon instructions that are executable by at least one processor of a portable playback device such that the portable playback device is configured to:

establish concurrent connections to (i) at least one first source over a first network via a first network interface and (ii) a second source over a second network via a second network interface;

stream, from the at least one first source via the first network interface, a first audio stream, wherein the first audio stream is categorized as content audio having a first priority;

while the first audio stream is assigned as a now playing owner, play back the first audio stream via at least one audio transducer;

during playback of the first audio stream via the at least one audio transducer, receive, from the second source via the second network interface, a second audio stream, wherein the second audio stream is categorized as content audio having the first priority;

assign the later-received second audio stream as the now playing owner, wherein assignment of the later-received second audio stream stops playback of the earlier-received first audio stream;

while the second audio stream is assigned as the now playing owner, play back the second audio stream via the at least one audio transducer;

while the second audio stream is assigned to the now playing owner, detect a period of inactivity where audio is not played back from the second source; and based on detection of the period of inactivity, assign the first audio stream to the now playing owner and disconnect from the second source.

* * * * *

UNITED STATES PATENT AND TRADEMARK OFFICE
CERTIFICATE OF CORRECTION

PATENT NO. : 11,870,475 B2
APPLICATION NO. : 17/486424
DATED : January 9, 2024
INVENTOR(S) : Vautrin et al.

It is certified that error appears in the above-identified patent and that said Letters Patent is hereby corrected as shown below:

In the Claims

In Column 57, in Claim 1, Line 39, after "assigned" delete "as" and insert -- to --, therefor.

Signed and Sealed this
Fifth Day of March, 2024

Katherine Kelly Vidal
*Director of the United States Patent and Trademark Office*